(12) United States Patent
Kissell

(10) Patent No.: US 7,418,585 B2
(45) Date of Patent: Aug. 26, 2008

(54) SYMMETRIC MULTIPROCESSOR OPERATING SYSTEM FOR EXECUTION ON NON-INDEPENDENT LIGHTWEIGHT THREAD CONTEXTS

(75) Inventor: Kevin D Kissell, Le Bar sur Loup (FR)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 11/330,914

(22) Filed: Jan. 11, 2006

(65) Prior Publication Data

US 2006/0195683 A1 Aug. 31, 2006
US 2007/0043935 A2 Feb. 22, 2007

Related U.S. Application Data

(63) Continuation-in-part of application No. 11/313,296, filed on Dec. 20, 2005, and a continuation-in-part of application No. 11/313,272, filed on Dec. 20, 2005, which is a continuation-in-part of application No. 10/929,097, filed on Aug. 27, 2004, which is a continuation-in-part of application No. 10/684,350, filed on Oct. 10, 2003, now Pat. No. 7,376,954, and a continuation-in-part of application No. 10/684,348, filed on Oct. 10, 2003.

(60) Provisional application No. 60/502,359, filed on Sep. 12, 2003, provisional application No. 60/502,358, filed on Sep. 12, 2003, provisional application No. 60/499,180, filed on Aug. 28, 2003.

(51) Int. Cl.
*G06F 7/38* (2006.01)
*G06F 9/00* (2006.01)
*G06F 9/44* (2006.01)
*G06F 15/00* (2006.01)

(52) U.S. Cl. ....................... 712/244; 712/228

(58) Field of Classification Search .................. 712/228
See application file for complete search history.

(56) References Cited

U.S. PATENT DOCUMENTS 4,817,051 A 3/1989 Chang (Continued)

FOREIGN PATENT DOCUMENTS

EP 0725334 A1 8/1996

(Continued)

OTHER PUBLICATIONS

Patterson & Hennessy; Computer Organization & Design: The Hardware/Software Interface; 1998; Morgan Kaufmann Publishers, Inc.; Second Edition; pp. 592-593.*

(Continued)

*Primary Examiner*—Eddie P Chan
*Assistant Examiner*—Corey S Faherty
(74) *Attorney, Agent, or Firm*—Sterne Kessler Goldstein Fox PLLC

(57) ABSTRACT

A multiprocessing system is disclosed. The system includes a multithreading microprocessor including a plurality of thread contexts (TCs), each having a program counter and a general purpose register set for executing a thread. The microprocessor also includes a shared privileged resource, shared by the plurality of TCs rather than being replicated for each of the plurality of TCs, and privileged to be managed only by operating system-privileged threads rather than by user-privileged threads. The system also includes a multiprocessor operating system (OS), configured to manage the shared privileged resource, and to schedule execution of both the operating system-privileged threads and the user-privileged threads on the plurality of TCs.

44 Claims, 34 Drawing Sheets

U.S. PATENT DOCUMENTS

| | | | |
|---|---|---|---|
| 4,860,190 A | | 8/1989 | Kaneda et al. |
| 5,159,686 A | | 10/1992 | Chastain et al. |
| 5,499,349 A | | 3/1996 | Nikhil et al. |
| 5,511,192 A | | 4/1996 | Shirakihara |
| 5,515,538 A | * | 5/1996 | Kleiman .................... 710/260 |
| 5,659,786 A | | 8/1997 | George et al. |
| 5,758,142 A | | 5/1998 | McFarling et al. |
| 5,812,811 A | | 9/1998 | Dubey et al. |
| 5,867,704 A | | 2/1999 | Tanaka et al. |
| 5,892,934 A | | 4/1999 | Yard |
| 5,933,627 A | | 8/1999 | Parady |
| 5,944,816 A | * | 8/1999 | Dutton et al. ............... 712/215 |
| 5,949,994 A | | 9/1999 | Dupree et al. |
| 5,961,584 A | | 10/1999 | Wolf |
| 6,061,710 A | * | 5/2000 | Eickemeyer et al. ........ 718/107 |
| 6,088,787 A | | 7/2000 | Predko |
| 6,175,916 B1 | * | 1/2001 | Ginsberg et al. ............ 712/228 |
| 6,189,093 B1 | * | 2/2001 | Ekner et al. ................. 712/244 |
| 6,223,228 B1 | | 4/2001 | Ryan et al. |
| 6,330,656 B1 | | 12/2001 | Bealkowski et al. |
| 6,330,661 B1 | | 12/2001 | Torii |
| 6,401,155 B1 | * | 6/2002 | Saville et al. ............... 710/266 |
| 6,591,379 B1 | | 7/2003 | LeVine et al. |
| 6,675,192 B2 | | 1/2004 | Emer et al. |
| 6,687,812 B1 | | 2/2004 | Shimada |
| 6,697,935 B1 | * | 2/2004 | Borkenhagen et al. ...... 712/228 |
| 6,877,083 B2 | | 4/2005 | Arimilli et al. |
| 6,889,319 B1 | | 5/2005 | Rodgers et al. |
| 6,920,634 B1 | | 7/2005 | Tudor |
| 6,922,745 B2 | | 7/2005 | Kumar et al. |
| 6,971,103 B2 | | 11/2005 | Hokenek et al. |
| 6,986,140 B2 | | 1/2006 | Brenner et al. |
| 6,993,598 B2 | | 1/2006 | Pafumi et al. |
| 7,069,421 B1 | | 6/2006 | Yates, Jr. et al. |
| 7,127,561 B2 | | 10/2006 | Hill et al. |
| 7,134,124 B2 | | 11/2006 | Ohsawa et al. |
| 7,185,185 B2 | | 2/2007 | Joy et al. |
| 2002/0083278 A1 | | 6/2002 | Noyes |
| 2002/0103847 A1 | | 8/2002 | Potash |
| 2002/0147760 A1 | | 10/2002 | Torii |
| 2003/0014471 A1 | | 1/2003 | Ohsawa et al. |
| 2003/0074545 A1 | | 4/2003 | Uhler |
| 2003/0079094 A1 | | 4/2003 | Rajwar et al. |
| 2003/0115245 A1 | | 6/2003 | Fujisawa |
| 2003/0126416 A1 | | 7/2003 | Marr et al. |
| 2004/0015684 A1 | | 1/2004 | Peterson |
| 2005/0050305 A1 | | 3/2005 | Kissell |
| 2005/0050395 A1 | | 3/2005 | Kissell |
| 2005/0120194 A1 | | 6/2005 | Kissell |
| 2005/0125629 A1 | | 6/2005 | Kissell |
| 2005/0125795 A1 | | 6/2005 | Kissell |
| 2005/0240936 A1 | | 10/2005 | Jones et al. |
| 2005/0251613 A1 | | 11/2005 | Kissell |
| 2005/0251639 A1 | | 11/2005 | Vishin et al. |
| 2007/0106887 A1 | | 5/2007 | Kissell |
| 2007/0106988 A1 | | 5/2007 | Kissell |
| 2007/0106989 A1 | | 5/2007 | Kissell |
| 2007/0106990 A1 | | 5/2007 | Kissell |
| 2007/0186028 A2 | | 8/2007 | Kissell |

FOREIGN PATENT DOCUMENTS

| | | |
|---|---|---|
| EP | 0917057 A2 | 5/1999 |
| EP | 1089173 A2 | 4/2001 |
| WO | WO0153935 A1 | 7/2001 |

OTHER PUBLICATIONS

Silberschatz & Galvin; Operating Systems Concepts; 1994; Addison-Wesley Publishing Company; Fourth Edition; pp. 267-269,271-272,275.*

Zilles et al; The Use Of Multithreading for Exception Handling; IEEE 2001.*

Dorai et al; Transparent Threads: Resource Sharing in SMT Processors for High Single-Thread Performance; IEEE 2002.*

Ungerer et al. A Survey of Processors with Explicit Multithreading. ACM Computing Surveys, vol. 35, No. 1. Mar. 2003, pp. 29-63.

Fotland, David. A Multithreaded Wireless Network Processor with Software I/O. Embedded Processor Forum. Jun. 18, 2003. In-State MDR;www.MDRonline.com.

Alverson et al., "Tera Hardware-Software Cooperation," Tera Computer Corporation—Proceedings of the IEEE/ACM SC97 Conference—Nov. 15-21, 1997 San Jose, CA.

Carter et al., "Performance and Programming Experience on the Tera MTA," Tera Computer Corporation—SIAM Conference on Parallel Processing—Mar. 1999.

Marr et al. Hyper-Threading Technology. Intel Technology Journal, Feb. 14, 2002, vol. 6, No. 1, Intel Corporation, USA.

Sunsoft. Multithreaded Programming Guide. 1995. Sunsoft, A Sun Microsystems, Inc. Business. Mountainview, CA.

Engelschall, R.S., "pth GNU Portable Threads," Pth Manual, Online! Feb. 17, 2003, pp. 1-31, XP002315713.

Ishihara et al., "A Comparison of Concurrent Programming and Cooperative Multithreading," EURO-PAR 2000 Parallel Processing. 6th International EURO-PAR Conference. Proceedings (Lecture Notes in Computer Science vol. 1900) Springer-Verlag Berlin, Germany, Sep. 1, 2000, pp. 729-738, XP002315714, ISBN: 3-540-67956-1.

Frees, W., "Teilzeitarbeit Im Prozessor," Electronik, Franzis Verlag GMBH. Munche, DE, vol. 45, No. 9, Apr. 30, 1996, pp. 100-106, XP000595386, ISSN: 0013-5658 (English-language version of the search report or action which indicates the degree of relevance found by the foreign office is appended.).

Scheidhauer, Ralf, "Design, Implementierung und Evaluierung einer virtuellen Maschine fur Oz," Online!, Dec. 1998, Dissertation, Saarbrucken, (English-language version of the search report or action which indicates the degree of relevance found by the foreign office is appended.).

Mehl et al., "An Abstract Machine for Oz," Research Report RR-95-08, Online!, Jun. 1995, pp. 1-23, Kaiserslautern Saarbrucken, ISSN 0946-008.

Ungerer et al., "Utilising Parallel Resources By Speculation," Parallel and Distributed Processing, 1999. PDP '99. Proceedings of the Seventh Euromicro Workshop on Funchal, Portugal Feb. 3-5,1999, Los Alamitos, CA, USA, IEEE Computing Society, Feb. 3, 1999, pp. 339-343.

Tsai et al: "The Superthreaded Architecture: Thread Pipelining with Run-Time Data Dependence Checking and Control Speculation," Parallel Architectures and Compiliation Techniques, 1996, Proceedings of the 1996 Conference in Boston, MA, USA, Oct. 20-23, 1996, Los Alamitos, CA, USA, IEEE Comput. Soc., Oct. 20, 1996, pp. 35-46.

Popov, Konstantin: "A Parallel Abstract Machine for the Thread-Based Concurrent Language Oz," Workshop on Parallism and Implementation of Technology for Constraint Logic Programming Languages, Sep. 1997, pp. 1-25.

Ubicom, Inc. A Next Generation Packet Processor for Wireless Networking. Apr. 15, 2003. Ubicom, Inc. Mountain View, CA, USA.

Bolychevsky et al. "Dynamic Scheduling in RISC Architectures," IEEE Proceedings Computers and Digital Techniques, vol. 143, No. 5. Sep. 24, 1996. pp. 309-317.

Kissell, Kevin D. "Microprocessor Forum (MPF) Conference Program Presentation: Architectural Extensions to the MIPS Architecture for High-Performance Embedded Systems," Oct. 15, 2003.

(webpage) Cray MTA-2 Historical Technical Papers, http://www.cray.com/products/programs/mta_2/resources.html. (Mar. 12, 2005), (formerly http://www.cray.com/products/systems/mta/psdocs.html (Jul. 2, 2004)).

Zaslavsky, Leonid et al. "A Scalable Approach for Solving Irregular Sparse Linear Systems on the Tera MTA Multithreaded Parallel Shared-Memory." Ninth SIAM Conference on Parallel Processing for Scientific Computing, San Antonio, TX. Mar. 1999.

Smith, Burton. "From Here to Petaflops." Keynote Address, Petaflops-systems Operations Working Review, (POWR), Bodega Bay, California, Jun. 1998.

Briggs, Preston. "Tuning the BLAS for the Tera." Workshop on Multithreaded Execution, Architecture and Compilation. (MTEAC 98), Jan. 1998.

Alverson, Gail et al., "Scheduling on the Tera MTA." IPPS '95 Workshop on Job Scheduling Strategies for Parallel Processing, Santa Barbara, CA, Apr. 1995, and in D.G.Feitelson and L. Rudolph, editors, Job Scheduling Strategies for Parallel Processing, Lecture Notes in Computer Science vol. 949, pp. 19-44, Springer-Vertag 1995.

Smith, Burton. "Folklore and Reality in High Performance Computing Slide Presentation." 1995.

Smith, Burton. "The Quest for General-Purpose Parallel Computing." 1994.

Alverson, Gail et al. "Exploiting Heterogeneous Parallelism on a Multithreaded Multiprocessor." 6th ACM International Conference on Supercomputing, Washington DC, Jul. 1992.

Callahan, David. "Recognizing and Parallelizing Bounded Recurrences." Fourth Workshop on Languages and Compilers for Parallel Computing. pp. 169-184. Aug. 1991.

Callahan, David et al. "Register Allocation via Hierarchical Graph Coloring." ACM Sigplan '91 Conference on Programming Language Design and Implementation, Jun. 1991.

Alverson, Robert. "Integer Division Using Reciprocals." 10th IEEE Symposium on Computer Arithmetic, Jun. 1991.

Callahan, David et al. "Improving Register Allocation for Subscripted Variables." ACM Sigplan Conference on Programming Language Design and Implementation, Jun. 1990.

Alverson, Robert et al. "The Tera Computer System." ACM International Conference on Supercomputing, pp. 1-6, Jun. 1990.

Smith, Burton. "The End of Architecture." Keynote Address, 17th Annual Symposium on Computer Architecture, Seattle, Washington, May 1990.

Alverson, Gail et al. "A Future-Based Parallel Language for a General Purpose Highly Parallel Computer." Languages and Compilers for Parallel Computing. pp. 95-113, MIT Press, Cambridge, Massachusetts, 1990.

"MIT Alewife Project: Home Page." retrieved from URL: http://catfish.csail.mit.edu/alewife/ on Jul. 2, 2004.

Arvind and R.A. Innaucci. "Two Fundamental Issues in Multiprocessing." In Proc. Of DFVLF-Conf. 1987 on Par.Proc.in Science and Eng., Bonn-Bad Godesberg, W. Germany, Jun. 1987.

Heuring, Vincent P. and Jordan, Harry F. "Computer Systems and Architecture." Reading, Mass.: Addison Wesley Longman, Inc., © 1997. pp. 35-37.

Sunsoft, Multithreaded Programming Guide. 1995. Sunsoft, A Sun Microsystems, Inc. Business. Mountainview, CA.

Sunsoft, Multithreaded Programming Guide. 1994. Sunsoft, A Sun Microsystems, Inc. Business. Mountainview, CA. pp. 6, 12-13, 22-34 and 87.

Hennessy, John L. et al. "Computer Architecture A Quantitative Approach." Second Edition. San Francisco, CA: Morgan Kaufmann Publishers, Inc. 1996. pp. 70-73 and 87-89.

MIPS32™ Architecture For Programmers vol. II The MIPS32™ Instruction Set. Revision 2.00. pp. 231 & 311. Document No. MD00086. Jun. 9, 2003. MIPS Technologies, Inc.

* cited by examiner

MFTR Instruction

Fig. 3B

MFTR Instruction

⟵ 350

Source Register Selection Table

| u Value | sel Value | Register Selected | |
|---|---|---|---|
| 0 | n | Coprocessor 0 Register number rt, sel = sel | |
| 1 | 0 | GPR[rt] | |
| 1 | 1 | rt Value | Selection |
| | | 0 | Lo Register / Lo component of DSP Accumulator 0 |
| | | 1 | Hi Register / Hi component of DSP Accumulator 0 |
| | | 2 | ACX Register / ACX component of Accumulator 0 |
| | | 4 | Lo component of DSP Accumulator 1 |
| | | 5 | Hi component of DSP Accumulator 1 |
| | | 6 | ACX component of DSP Accumulator 1 |
| | | 8 | Lo component of DSP Accumulator 2 |
| | | 9 | Hi component of DSP Accumulator 2 |
| | | 10 | ACX component of DSP Accumulator 2 |
| | | 12 | Lo component of DSP Accumulator 3 |
| | | 13 | Hi component of DSP Accumulator 3 |
| | | 14 | ACX component of DSP Accumulator 3 |
| | | 16 | DSPControl register of DSP Accumulator |
| | | Other Values of rt, Reserved, Unpredictable | |
| 1 | 2 | FPR[rt] | |
| 1 | 3 | FPCR[rt] | |
| 1 | 4 | Cop2 Data[n], where n is composed by concatenating rx with rt, with rx providing the most significant bits. | |
| 1 | 5 | Cop2 Control[n], where n is composed by concatenating rx with rt, with rx providing the most significant bits. | |
| 1 | >5 | Reserved, Unpredictable | |

MTTR Instruction

MTTR rt, rd, u, sel, h

Fig. 4B

MTTR Instruction
450

Destination Register Selection Table

| u Value | sel Value | Register Selected | |
|---|---|---|---|
| 0 | n | Coprocessor 0 Register number rd, sel = sel | |
| 1 | 0 | GPR[rd] | |
| 1 | 1 | rd Value | Selection |
| | | 0 | Lo Register / Lo component of DSP Accumulator 0 |
| | | 1 | Hi Register / Hi component of DSP Accumulator 0 |
| | | 2 | ACX Register / ACX component of Accumulator 0 |
| | | 4 | Lo component of DSP Accumulator 1 |
| | | 5 | Hi component of DSP Accumulator 1 |
| | | 6 | ACX component of DSP Accumulator 1 |
| | | 8 | Lo component of DSP Accumulator 2 |
| | | 9 | Hi component of DSP Accumulator 2 |
| | | 10 | ACX component of DSP Accumulator 2 |
| | | 12 | Lo component of DSP Accumulator 3 |
| | | 13 | Hi component of DSP Accumulator 3 |
| | | 14 | ACX component of DSP Accumulator 3 |
| | | 16 | DSPControl register of DSP Accumulator |
| | | Other Values of rd, Reserved, Unpredictable | |
| 1 | 2 | FPR[rd] | |
| 1 | 3 | FPCR[rd] | |
| 1 | 4 | Cop2 Data[n], where n is composed by concatenating rx with rd, with rx providing the most significant bits. | |
| 1 | 5 | Cop2 Control[n], where n is composed by concatenating rx with rd, with rx providing the most significant bits. | |
| 1 | >5 | Reserved, Unpredictable | |

Fig. 5A

Multithreading-Related Registers

500

Register Table

| Register Name | CP0 Register Number (rt/rd) | Register Select Number (sel) | Description |
|---|---|---|---|
| MVPControl 501 (Fig. 5B) | 0 | 1 | Per-Processor register containing global multithreading configuration data |
| MVPConf0 502 (Fig. 5C) | 0 | 2 | Per-Processor multi-VPE dynamic configuration information |
| MVPConf1 503 (Fig. 5D) | 0 | 3 | Per-Processor multi-VPE dynamic configuration information |
| VPEControl 504 (Fig. 5E) | 1 | 1 | Per-VPE register containing thread configuration data |
| VPEConf0 505 (Fig. 5F) | 1 | 2 | Per-VPE multi-thread configuration information |
| VPEConf1 506 (Fig. 5G) | 1 | 3 | Per-VPE multi-thread configuration information |
| YQMask 591 (Fig. 5H) | 1 | 4 | Per-VPE register defining which YIELD qualifier bits may be used without generating an exception |
| VPESchedule 592 (Fig. 5H) | 1 | 5 | Per-VPE register to manage scheduling of a VPE within a processor |
| VPEScheFBack 593 (Fig. 5H) | 1 | 6 | Per-VPE register to provide scheduling feedback to software |
| TCStatus 508 (Fig. 5J) | 4 | 1 | Per-TC status information |
| TCBind 556 (Fig. 5K) | 4 | 2 | Per-TC information about TC ID and VPE binding |
| TCRestart 594 (Fig. 5K) | 4 | 3 | Per-TC value of restart program counter for the associated thread of execution |
| TCHalt 509 (Fig. 5K) | 4 | 4 | Per-TC register controlling Halt state of TC |
| TCContext 595 (Fig. 5L) | 4 | 5 | Per-TC Read/Write Storage for OS use |
| TCSchedule 596 (Fig. 5L) | 4 | 6 | Per-TC register to manage scheduling of a TC |
| TCScheFBack 597 (Fig. 5L) | 4 | 7 | Per-TC register to provide scheduling feedback to software |
| EPC 598 (Fig. 5L) | 14 | 0 | Per-VPE error program counter register |
| Status 571 (Fig. 5M) | 12 | 0 | Per-VPE status information |
| EntryHi 526 (Fig. 5N) | 10 | 0 | Per-VPE high order portion of TLB entry |
| Context 527 (Fig. 5N) | 4 | 0 | Per-VPE pointer to page table entry in memory |
| Cause 536 (Fig. 5P) | 13 | 0 | Per-VPE cause of last general exception |

Fig. 5B

MVPControl Register

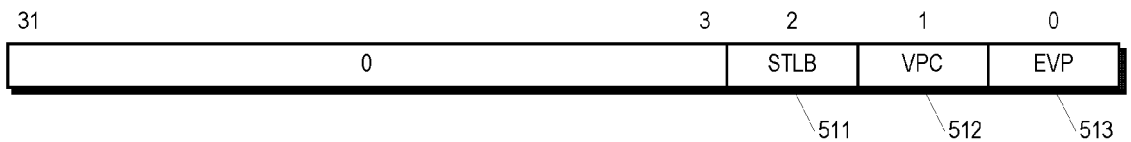

| Fields | | Description | Read/Write | Reset State |
|---|---|---|---|---|
| Name | Bits | | | |
| STLB | 2 | Share TLBs. Modifiable only if the VPC bit was set prior to the write to the register of a new value. When set, the full compliment of TLBs of a processor is shared by all VPEs on the processor, regardless of the programming of the Config1.MMU_Size register fields.<br><br>When STLB is set:<br>• The virtual address and ASID spaces are unified across all VPEs sharing the TLB.<br>• The TLB logic must ensure that a TLBWR instruction can never write to a TLB entry which corresponds to the valid Index register value of any VPE sharing the TLB.<br>• The creation of duplicate TLB entries is silently suppressed instead of generating a Machine Check exception.<br>• TLBWRs may have UNPREDICTABLE results if there are fewer total unwired TLB entries than there are operational VPEs sharing the TLB.<br>• TLBWRs may have UNPREDICTABLE results if the Wired register values are not identical across all VPEs sharing the TLB.<br><br>For correct software operation, it is recommended that all MMU_Size fields be set to the size of the shared TLB when STLB is set. When not in use for TLB maintenance, software should leave the Index register of each VPE set to an invalid value, with the P bit set. | R if VPC = 0, R/W if VPC = 1 | 0 |
| VPC | 1 | Indicates that Processor is in a VPE Configuration State. When VPC is set, some normally "Preset" configuration register fields become writable, to allow for dynamic configuration of processor resources.<br><br>Settable by software only if the VPEConf0.MVP bit is also set for the VPE issuing the modifying instruction, the VPC bit may be cleared regardless of the MVP state, allowing the processor to de-configure its own MVP capability.<br><br>Processor behavior is UNDEFINED if VPC and EVP are both in a set state at the same time. | R/RW | 0 |
| EVP | 0 | Enable Virtual Processors. Modifiable only if the VPEConf0.MVP bit is set for the VPE issuing the modifying instruction. Set by EVPE instruction and cleared by DVPE instruction. If set, all activated VPEs on a processor fetch and execute independently. If cleared, only a single instruction stream on a single VPE can run. | R/RW | Preset |
| 0 | 31:3 | Must be written as zero; return zero on read. | 0 | 0 |

Fig. 5C

MVPConf0 Register

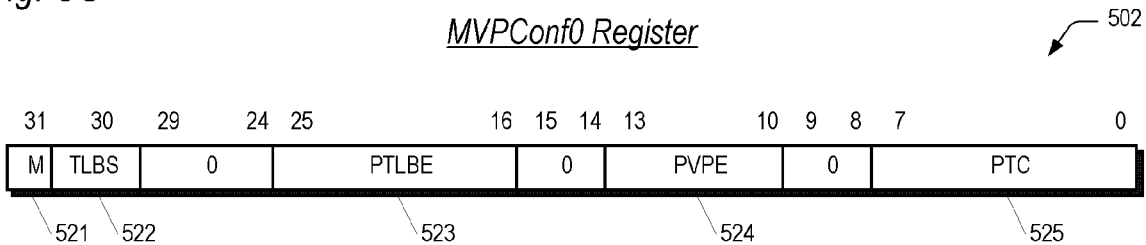

| Fields | | Description | Read/ Write | Reset State |
|---|---|---|---|---|
| Name | Bits | | | |
| M | 31 | This bit is reserved to indicate that a *MVPConf1* register is present. If the *MVPConf1* register is not implemented, this bit should read as a 0. If the *MVPConf1* register is implemented, this bit should read as a 1. | R | Preset |
| TLBS | 29 | TLB Sharable. Indicates that TLB sharing amongst all VPEs of a VMP is possible. TLB sharing is enabled by the *STLB* bit of the *MVPControl* register. | R | Preset |
| PTLBE | 25:16 | Total processor compliment of allocatable TLB entry pairs. | R | Preset |
| PVPE | 13:10 | Total processor compliment of VPE contexts - 1 | R | Preset |
| PTC | 7:0 | Total processor compliment of TCs - 1 | R | Preset |
| 0 | 29:24, 15:14, 9:8 | Reserved. Reads as zero, must be written as zero. | R | 0 |

Fig. 5E

VPEControl Register 504

| 31 29 28 | 26 25 | 19 18 | 16 15 14 | 8 7 | 0 |
|---|---|---|---|---|---|
| 0 | 0 | EXCPT | TE | 0 | TargTC |

541  543  332

| Fields | | Description | | | Read/ Write | Reset State |
|---|---|---|---|---|---|---|
| Name | Bits | | | | | |
| EXCPT | 18:16 | Exception code of most recently dispatched Thread exception | Value | Meaning | R | 0 |
| | | | 0 | Thread Underflow | | |
| | | | 1 | Thread Overflow | | |
| | | | 2 | Invalid YIELD Qualifier | | |
| | | | 3 | Gating Storage Exception | | |
| | | | 4 | YIELD Sched. Exception | | |
| | | | 5 | GS Scheduler Exception | | |
| | | | 6-7 | Reserved | | |
| TE | 15 | Threads Enabled. Set by EMT instruction, cleared by DMT instruction. If set, multiple TCs may be simultaneously active. If cleared, only one thread may execute on the VPE. | | | R/W | 0 |
| TargTC | 7:0 | TC number to be used on MTTR and MFTR instructions. | | | R/W | Undefined |
| 0 | 31:22, 19, 14:18 | Must be written as zero; return zero on read. | | | 0 | 0 |

Fig. 5F

VPEConf0 Register

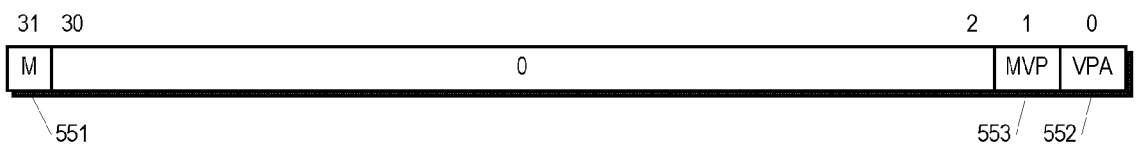

551         553  552

| Fields | | Description | Read/ Write | Reset State |
|---|---|---|---|---|
| Name | Bits | | | |
| M | 31 | This bit is reserved to indicate that a VPEConf1 register is present. If the VPEConf1 register is not implemented, this bit should read as a 0. If the VPEConf1 register is implemented, this bit should read as a 1. | R | Preset |
| MVP | 1 | Master Virtual Processor. If set, the VPE can access the registers of other VPEs of the same VMP, using MTTR/MFTR, and can modify the contents of the MVPControl register, thus acquiring the capability to manipulate and configure other VPEs sharing the same processor. | R | Preset |
| VPA | 0 | Virtual Processor Activated. If set, the VPE will schedule threads and execute instructions so long as the EVP bit of the MVPControl register enables multi-VPE execution. | R | Preset |
| 0 | 30:29, 20, 15:2 | Reserved. Reads as zero, must be written as zero. | R | 0 |

VPEConf1 Register

506

| 31 | 28 | 27 | 20 | 19 | 18 | 17 | 10 | 9 | 8 | 7 | 0 |
|---|---|---|---|---|---|---|---|---|---|---|---|
| 0 | | NCX | | 0 | | NCP2 | | 0 | | NCP1 | |

561    562    563

| Fields | | Description | Read/ Write | Reset State |
|---|---|---|---|---|
| Name | Bits | | | |
| NCX | 27:20 | Number of CorExtend(tm) UDI state instantiations available, for UDI blocks with persistent state. | R | Preset |
| NCP2 | 17:10 | Number of Coprocessor 2 contexts available. | R | Preset |
| NCP1 | 7:0 | Number of Coprocessor 1 contexts available | R | Preset |
| 0 | 31:28, 19:18, 9:8 | Reserved. Reads as zero, must be written as zero. | R | 0 |

VPESchedule Register — 592

VPEScheFBack Register — 593

Fig. 5J

TCStatus Register → 508

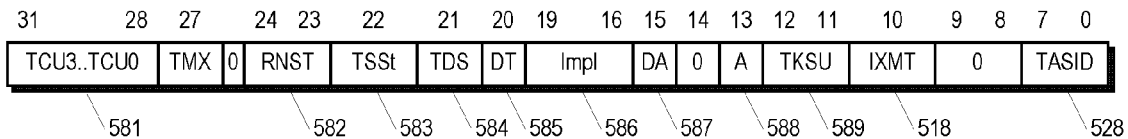

| Fields | | Description | Read/Write | Reset State |
|---|---|---|---|---|
| Name | Bits | | | |
| TCU3..TCU0 | 31:28 | Controls access of a TC to coprocessors 3,2,1, and 0 respectively. | R/W | Undefined |
| TMX | 27 | Controls access of a TC to extended media processing state, such as MDMX and DSP ASE accumulators. | R/W | 0 |
| RNST | 24:23 | Run State of TC. Indicates the Running vs. Blocked state of the TC and the reason for blockage. Value is stable only if TC is Halted and examined by another TC using an MFTR operation. <br><br> Val / Meaning <br> 0 / Running <br> 1 / Blocked on WAIT <br> 2 / Blocked on YIELD <br> 3 / Blocked on Gating Storage | R | 0 |
| TDS | 21 | Thread stopped in branch Delay Slot. If a TC is Halted such that the next instruction to issue would be an instruction in a branch delay slot, the TCRestart register will contain the address of the branch instruction, and the TDS bit will be set. | R | 0 |
| DT | 20 | Dirty TC. This bit is set by hardware whenever any software-visible register value of the associated TC is written, including writes of GPR *rd* operands of FORK instructions. | R/W | 1 |
| Impl | 19:16 | These bits are implementation dependent | ImplDep | ImplDep |
| DA | 15 | Dynamic Allocation enable. If set, TC may be allocated/deallocated/scheduled by the FORK and YIELD instructions. | R/W | 0 |
| A | 13 | Thread Activated. Set automatically when a FORK instruction allocates the TC, and cleared automatically when a YIELD $0 instruction deallocates it. | R/W | 1 for default/ reset TC, 0 for others |
| TKSU | 12:11 | This is the per-TC Kernel/Supervisor/User state. | R/W | Undefined |
| IXMT | 10 | Interrupt Exempt. If set, the associated TC will not be used by asynchronous exception handlers such as interrupts. | R/W | 0 |
| TASID | 7:0 | This is the per-TC ASID value. | R/W | Undefined |
| 0 | 26:25, 22, 14, 9:8 | Must be written as zero; return zero on read. | 0 | 0 |

*Fig. 5K*

TCRestart Register — 594

549

TCHalt Register — 509

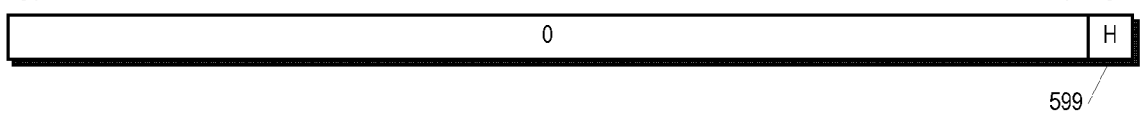

599

| Fields | | Description | Read/ Write | Reset State |
|---|---|---|---|---|
| Name | Bits | | | |
| H | 0 | Thread Halted. When set, the associated thread has been halted and cannot be allocated, activated, or scheduled. | R/W | 0 |
| 0 | 31:1 | Must be written as zero; return zero on read. | 0 | 0 |

TCBind Register — 556

557                                                                            558

| Fields | | Description | Read/ Write | Reset State |
|---|---|---|---|---|
| Name | Bits | | | |
| CurTC | 28:21 | Indicates the number (index) of the TC. | R | TC# |
| A0 | 20:18 | Architecturally zero-valued field providing least-significant bits when a TCBind value is shifted right to be used as a scaled index into arrays of 32 or 64-bit values. | R | 0 |
| TBE | 17 | TC Bus Error. Set by hardware when a transaction causing a bus error is identified as resulting from a load or store issued by the TC. | R/W | 0 |
| CurVPE | 3:0 | Indicates and controls the binding of the TC to a VPE. Field is optionally Read/Write only when the VPC bit of the MVPControl register is set. | R or R/W | 0 for TC 0, preset for all others |
| 0 | 31:29, 16:4 | Must be written as zero; return zero on read. | 0 | 0 |

TCContext Register — 595

TCSchedule Register — 596

TCScheFBack Register — 597

Coprocessor 0 EPC Register — 598

*Fig. 5M*

Coprocessor 0 Status Register

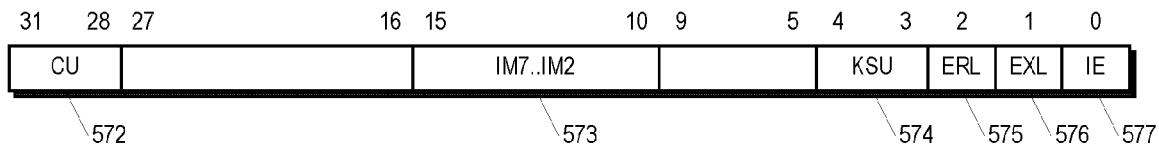

| Fields | | Description | Read/Write |
|---|---|---|---|
| Name | Bits | | |
| CU (CU3..CU0) | 31..28 | Controls access to coprocessors 3, 2, 1, and 0, respectively: 0 = access not allowed; 1 = access allowed. Coprocessor 0 is always usable when the processor is running in Kernel Mode or Debug Mode, independent of the state of the CU0 bit. | R/W |
| IM | 15..10 | Interrupt Mask. Controls the enabling of each of the hardware interrupts. | R/W |
| KSU | 4..3 | If Supervisor Mode is implemented, the encoding of this field denotes the base operating mode of the processor. The encoding of this field is:<br><br>\| Encoding \| Meaning \|<br>\|---\|---\|<br>\| 0b00 \| Base mode is Kernel Mode \|<br>\| 0b01 \| Base mode is Supervisor Mode \|<br>\| 0b10 \| Base mode is User Mode \|<br>\| 0b11 \| Reserved. \| | R/W |
| ERL | 2 | Error Level; Set by the processor when a Reset, Soft Reset, NMI or Cache Error exception are taken.<br><br>\| Encoding \| Meaning \|<br>\|---\|---\|<br>\| 0 \| Normal Level \|<br>\| 1 \| Error Level \|<br><br>When ERL is set:<br>• The processor is running in kernel mode<br>• Hardware and software interrupts are disabled<br>• The ERET instruction will use the return address held in ErrorEPC instead of EPC | R/W |
| EXL | 1 | Exception Level; Set by the processor when any exception other than Reset, Soft Reset, NMI or Cache Error exception are taken.<br><br>\| Encoding \| Meaning \|<br>\|---\|---\|<br>\| 0 \| Normal Level \|<br>\| 1 \| Error Level \|<br><br>When EXL is set:<br>• The processor is running in Kernel Mode<br>• Hardware and software interrupts are disabled.<br>• TLB Refill exceptions use the general exception vector instead of the TLB Refill vector.<br>• EPC, CauseBD and SRSCtl will not be updated if another exception is taken | R/W |
| IE | 0 | Interrupt Enable: Acts as the master enable for software and hardware interrupts:<br><br>\| Encoding \| Meaning \|<br>\|---\|---\|<br>\| 0 \| Interrupts are disabled \|<br>\| 1 \| Interrupts are enabled \| | R/W |

Fig. 5N

Coprocessor 0 EntryHi Register — 526

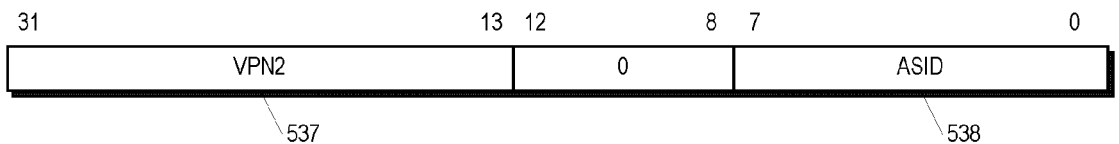

| Fields | | Description | Read/Write |
|---|---|---|---|
| Name | Bits | | |
| VPN2 | 31..13 | VA31..13 of the virtual address (virtual page number / 2). This field is written by hardware on a TLB exception or on a TLB read, and is written by software before a TLB write. | R/W |
| 0 | 12..8 | Must be written as zero; returns zero on read. | 0 |
| ASID | 12..11 | Address space identifier. This field is written by hardware on a TLB read and by software to establish the current ASID value for TLB write and against which TLB references match each entry's TLB ASID field. | R/W |

Coprocessor 0 Context Register — 527

| Fields | | Description | Read/Write |
|---|---|---|---|
| Name | Bits | | |
| PTE Base | 31..23 | This field is for use by the operating system and is normally written with a value that allows the operating system to use the *Context* Register as a pointer into the current PTE array in memory. | R/W |
| Bad VPN2 | 22..4 | This field is written by hardware on a TLB exception. It contains bits VA31..13 of the virtual address that caused the exception. | R |
| 0 | 12..8 | Must be written as zero; returns zero on read. | 0 |

Fig. 5P

Coprocessor 0 Cause Register  ← 536

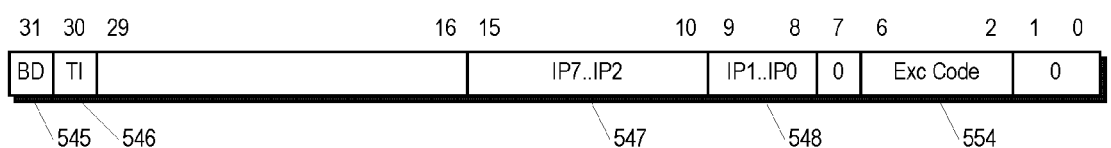

| 31 | 30 | 29 | 16 | 15 | 10 | 9 | 8 | 7 | 6 | 2 | 1 | 0 |
|----|----|----|----|----|----|---|---|---|---|---|---|---|
| BD | TI |    |    | IP7..IP2 |  | IP1..IP0 |  | 0 | Exc Code |  | 0 |  |

545  546  547  548  554

| Fields | | Description | Read/Write |
|---|---|---|---|
| Name | Bits | | |
| BD | 31 | Indicates whether the last exception taken occurred in a branch delay slot:<br>    0 Not in delay slot<br>    1 In delay slot<br><br>The processor updates BD only if Status.EXL was zero when the exception occurred. | R |
| TI | 30 | Timer Interrupt.<br>    0 No timer interrupt is pending.<br>    1 Timer interrupt is pending. | R |
| IP7<br>..<br>IP2 | 15..10 | Indicates an interrupt is pending:<br><br>\| Bit \| Name \| Meaning \|<br>\|---\|---\|---\|<br>\| 15 \| IP7 \| Hardware interrupt 5 \|<br>\| 14 \| IP6 \| Hardware interrupt 4 \|<br>\| 13 \| IP5 \| Hardware interrupt 3 \|<br>\| 12 \| IP4 \| Hardware interrupt 2 \|<br>\| 11 \| IP3 \| Hardware interrupt 1 \|<br>\| 10 \| IP2 \| Hardware interrupt 0 \| | R |
| IP1<br>..<br>IP0 | 9..8 | Controls the request for software interrupts:<br><br>\| Bit \| Name \| Meaning \|<br>\|---\|---\|---\|<br>\| 1 \| IP1 \| Request software interrupt 1 \|<br>\| 0 \| IP0 \| Request software interrupt 0 \| | R/W |
| Exc Code | 6..2 | Exception Code | R |

Fig. 6 MFTR Data Paths

MTTR Data Paths

MTTR Instruction Operation 1408 cpu_data array entry

SYMMETRIC MULTIPROCESSOR OPERATING SYSTEM FOR EXECUTION ON NON-INDEPENDENT LIGHTWEIGHT THREAD CONTEXTS

CROSS REFERENCE TO RELATED APPLICATIONS

This application is a continuation-in-part (CIP) of the following co-pending Non-Provisional U.S. Patent Applications, which are hereby incorporated by reference in their entirety for all purposes:

| Ser. No. (Docket No.) | Filing Date | Title |
| --- | --- | --- |
| 11/313,272 (MIPS.0214-00-US) | Dec. 20, 2005 | SOFTWARE EMULATION OF DIRECTED EXCEPTIONS IN A MULTITHREADING PROCESSOR |
| 11/313,296 (MIPS.0214-01-US) | Dec. 20, 2005 | PREEMPTIVE MULTITASKING EMPLOYING SOFTWARE EMULATION OF DIRECTED EXCEPTIONS IN A MULTITHREADING PROCESSOR |

Each of the two above co-pending Non-Provisional U.S. Patent Applications is a continuation-in-part (CIP) of the following co-pending Non-Provisional U.S. Patent Application, which is hereby incorporated by reference in its entirety for all purposes:

| Ser. No. (Docket No.) | Filing Date | Title |
| --- | --- | --- |
| 10/929,097 (MIPS.0194-00-US) | Aug. 27, 2004 | APPARATUS, METHOD, AND INSTRUCTION FOR SOFTWARE MANAGEMENT OF MULTIPLE COMPUTATIONAL CONTEXTS IN A MULTITHREADED MICROPROCESSOR |

Co-pending Non-Provisional U.S. patent application Ser. No. 10/929,097 (MIPS.0194-00-US) is a continuation-in-part (CIP) of the following co-pending Non-Provisional U.S. Patent Applications, which are hereby incorporated by reference in their entirety for all purposes:

| Ser. No. (Docket No.) | Filing Date | Title |
| --- | --- | --- |
| 10/684,350 (MIPS.0188-01-US) | Oct. 10, 2003 | MECHANISMS FOR ASSURING QUALITY OF SERVICE FOR PROGRAMS EXECUTING ON A MULTITHREADED PROCESSOR |
| 10/684,348 (MIPS.0189-00-US) | Oct. 10, 2003 | INTEGRATED MECHANISM FOR SUSPENSION AND DEALLOCATION OF COMPUTATIONAL THREADS OF EXECUTION IN A PROCESSOR |

Each of co-pending Non-Provisional U.S. patent applications Ser. No. 10/684,350 (MIPS.0188-01-US) and Ser. No. 10/684,348 (MIPS.0189-00-US) claims the benefit of the following expired U.S. Provisional Applications, which are hereby incorporated by reference in their entirety for all purposes:

| Ser. No. (Docket No.) | Filing Date | Title |
| --- | --- | --- |
| 60/499,180 (MIPS.0188-00-US) | Aug. 28, 2003 | MULTITHREADING APPLICATION SPECIFIC EXTENSION |
| 60/502,358 (MIPS.0188-02-US) | Sep. 12, 2003 | MULTITHREADING APPLICATION SPECIFIC EXTENSION TO A PROCESSOR ARCHITECTURE |
| 60/502,359 (MIPS.0188-03-US) | Sep. 12, 2003 | MULTITHREADING APPLICATION SPECIFIC EXTENSION TO A PROCESSOR ARCHITECTURE |

A computer program listing appendix, which is hereby incorporated by reference in its entirety for all purposes, is submitted via the USPTO electronic filing system (EFS) in a text file named cpl-mips-0214-02-US.txt that contains a 665 line computer program listing of C language and assembly language source code.

FIELD OF THE INVENTION

The present invention relates in general to the field of multithreaded microprocessors, and particularly to execution of multiprocessor operating systems thereon.

BACKGROUND OF THE INVENTION

Microprocessor designers employ many techniques to increase microprocessor performance. Most microprocessors operate using a clock signal running at a fixed frequency. Each clock cycle the circuits of the microprocessor perform their respective functions. According to Hennessy and Patterson (see *Computer Architecture: A Quantitative Approach*, 3rd Edition), the true measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs. Semiconductor scientists and engineers are continually making it possible for microprocessors to run at faster clock frequencies, chiefly by reducing transistor size, resulting in faster switching times. The number of instructions executed is largely fixed by the task to be performed by the program, although it is also affected by the instruction set architecture of the microprocessor. Large performance increases have been realized by architectural and organizational notions that improve the instructions per clock cycle, in particular by notions of parallelism.

One notion of parallelism that has improved the clock frequency of microprocessors is pipelining, which overlaps execution of multiple instructions within pipeline stages of the microprocessor. In an ideal situation, each clock cycle one instruction moves down the pipeline to a new stage, which performs a different function on the instruction. Thus, although each individual instruction takes multiple clock cycles to complete, the multiple cycles of the individual instructions overlap. Because the circuitry of each individual pipeline stage is only required to perform a small function relative to the sum of the functions required to be performed by a non-pipelined processor, the clock cycle of the pipelined processor may be reduced. The performance improvements of pipelining may be realized to the extent that the instructions in the program permit it, namely to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution per clock cycle. These microprocessors are commonly referred to as superscalar microprocessors.

What has been discussed above pertains to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams of instructions, commonly referred to as thread-level parallelism. A thread is simply a sequence, or stream, of program instructions. A multithreaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of resources, or contexts, for storing the unique state of each thread, such as multiple program counters and general purpose register sets, to facilitate the ability to quickly switch between threads to fetch and issue instructions. In other words, because each thread context has its own program counter and general purpose register set, the multithreading microprocessor does not have to save and restore these resources when switching between threads, thereby potentially reducing the average number of clock cycles per instruction.

One example of a performance-constraining issue addressed by multithreading microprocessors is the fact that accesses to memory outside the microprocessor that must be performed due to a cache miss typically have a relatively long latency. It is common for the memory access time of a contemporary microprocessor-based computer system to be between one and two orders of magnitude greater than the cache hit access time. Instructions dependent upon the data missing in the cache are stalled in the pipeline waiting for the data to come from memory. Consequently, some or all of the pipeline stages of a single-threaded microprocessor may be idle performing no useful work for many clock cycles. Multithreaded microprocessors may solve this problem by issuing instructions from other threads during the memory fetch latency, thereby enabling the pipeline stages to make forward progress performing useful work, somewhat analogously to, but at a finer level of granularity than, an operating system performing a task switch on a page fault. Other examples of performance-constraining issues addressed by multithreading microprocessors are pipeline stalls and their accompanying idle cycles due to a data dependence; or due to a long latency instruction such as a divide instruction, floating-point instruction, or the like; or due to a limited hardware resource conflict. Again, the ability of a multithreaded microprocessor to issue instructions from independent threads to pipeline stages that would otherwise be idle may significantly reduce the time required to execute the program or collection of programs comprising the threads.

Multiprocessing is a technique related to multithreading that exploits thread-level parallelism, albeit at a higher system level, to execute a program or collection of programs faster. In a conventional multiprocessor system, multiple processors, or CPUs, share a memory system and I/O devices. A multiprocessor (MP) operating system facilitates the simultaneous execution of a program or collection of programs on the multiprocessor system. For example, the system may include multiple Pentium IV processors all sharing a memory and I/O subsystem running an MP operating system—such as Linux SMP, an MP-capable version of Windows, Sun Solaris, etc., and executing one or more application programs concurrently.

Multithreading microprocessors exploit thread-level parallelism at an even lower level than multiprocessor systems by sharing instruction fetch, issue, and execution resources, as described above, in addition to sharing a memory system and I/O devices. An MP operating system may run on a multithreading microprocessor if the multithreading microprocessor presents multiple processors, or CPUs, in an architected manner recognized by the MP operating system. Perhaps the most highly publicized example is the Hyper-Threading (HT) Technology employed in the Intel® Xeon® multithreading microprocessor. An HT Xeon includes effectively the same execution resources (e.g., caches, execution units, branch predictors) as a non-HT Xeon processor, but replicates the architectural state to present multiple distinct logical processors to an MP OS. That is, the MP operating system recognizes each logical processor as a separate processor, or CPU, each presenting the architecture of a single processor. The cost of replicating the architectural state for the additional logical processor in the Xeon in terms of additional chip size and power consumption is almost 5%.

One aspect of the architecture presented by each of the multiple processors to the MP operating system is the ability to handle a list of architected exceptions. Generally speaking, an exception is an error or other unusual condition or event that occurs during the execution of a program. In response to an exception, the processor saves the state of the currently executing program and begins fetching and executing instructions at a predefined address, thereby transferring execution to an alternate program, commonly referred to as an exception handler located at the predefined address. The predefined address may be common to all exceptions in the list of architected exception types or may be unique to some or all of the exception types. The exception handler, when appropriate, may restore the state and resume execution of the previously executing program. Examples of common exceptions include a page fault, a divide by zero, a faulty address generated by the program, a bus error encountered by the processor when attempting to read a memory location, or an invalid instruction exception caused by an invalid instruction opcode or invalid instruction operand.

Another common exception type is an interrupt, or interrupt request. Interrupts are typically grouped as hardware interrupts and software interrupts. A software interrupt is generated when the currently executing program executes an architected software interrupt instruction, which causes an exception that transfers control to the architected interrupt vector associated with the software interrupt to invoke an interrupt service routine, or handler. A hardware interrupt is a signal received by the processor from a device to request service by the processor. Examples of interrupting devices are disk drives, direct memory access controllers, and timers. In response to the interrupt request, the processor transfers control to an architected interrupt vector associated with the interrupt request to invoke an interrupt service routine, or handler.

One function which MP operating systems need to be able to perform is for one processor, or CPU, to interrupt the operation of another specific one of the processors, and in some cases to interrupt all the processors in the system. These operations are sometimes referred to as inter-processor interrupts (IPIs). Commonly in a multiprocessor system, each processor includes an interrupt controller, which enables each processor to direct an interrupt specifically to each of the other processors. The HT Xeon processors, for example, include a replicated Advanced Programmable Interrupt Controller (APIC) for each logical processor, which enables each logical processor to send a hardware interrupt specifically to each of the other logical processors.

An example of the use of an IPI is in preemptive time-sharing operating systems, which receive periodic timer interrupts, in response to which the operating system may perform a task switch on one or more of the processors to schedule a different task or process to execute on the processors. In Linux SMP, for example, the timer handling routine running on the processor that receives the timer interrupt not only schedules the tasks on its own processor, but also directs an interrupt to each of the other processors to cause them to schedule their tasks. Each processor has an architected interrupt mechanism, which the timer interrupt-receiving processor uses to direct an IPI to each of the other processors in the multiprocessor system.

Another multithreading microprocessor core architecture which takes a somewhat different approach than, for example, the Intel HT architecture is the MIPS® Multithreading (MT) Application-Specific Extension (ASE) of the MIPS Instruction Set Architecture (ISA) and MIPS Privileged Resource Architecture (PRA). The MIPS MT ASE allows two distinct, but not mutually-exclusive, multithreading capabilities. A single MIPS MT ASE microprocessor core comprises one or more Virtual Processing Elements (VPEs), and each VPE comprises one or more thread contexts (TCs). This architecture is described in the document MIPS32® Architecture for Programmers Volume IV-f: The MIPS® MT Application-Specific Extension (ASE) to the MIPS32® Architecture, Document Number: MD00378, Revision 1.00, Sep. 28, 2005, available from MIPS Technologies, 1225 Charleston Road, Mountain View, Calif. 94043-1353, which is hereby incorporated by reference in its entirety for all purposes. Embodiments of the architecture are also described in the above-referenced U.S. Patent Applications.

In the MIPS MT ASE architecture, an N-VPE processor core presents to an SMP operating system an N-way symmetric multiprocessor. In particular, it presents to the SMP operating system N MIPS32® Architecture processors. Thus, SMP operating systems configured to run on a conventional multiprocessor system having N MIPS32 processors without the MT ASE capability will run on a single MIPS32 core with the MT ASE capabilities with little or no modifications to the SMP operating system. In particular, each VPE presents an architected exception domain to the SMP operating system including an architected list of exceptions that the VPE will handle. The list includes interrupts that one VPE may direct to another specific VPE in the multithreading microprocessor, somewhat similar to the HT Xeon approach.

As mentioned above, each VPE comprises at least one thread context, and may comprise multiple thread contexts. A thread context in the MIPS MT ASE comprises a program counter representation, a set of general purpose registers, a set of multiplier result registers, and some of the MIPS PRA Coprocessor 0 state, such as state describing the execution privilege level and address space identifier (ASID) of each thread context. The thread contexts are relatively lightweight compared to VPEs with respect to storage elements required to store state and are therefore less expensive than VPEs in terms of chip area and power consumption. Advantageously, the lightweight feature of MIPS MT ASE thread contexts makes them inherently more scalable than VPEs, and potentially than Intel HT logical processors, for example.

In particular, in the interest of providing lightweight thread contexts and the concomitant advantages, such as improved scalability, within the MIPS MT ASE, the domain for exception handling is at the VPE level, not the thread context level. In particular, a VPE handles asynchronous exceptions, such as interrupts, opportunistically. That is, when an asynchronous exception is raised to the VPE, the VPE selects one of the eligible (i.e., not marked as exempt from servicing asynchronous exceptions) thread contexts to execute the exception handler. Thus, although there is an architected means for a thread context to direct an asynchronous exception to a VPE, the thread context cannot specify to the VPE which thread context should handle the exception within the VPE in a MIPS MT ASE processor, i.e., the exception architecture does not provide an explicit way for the thread context to direct an asynchronous exception to a specific other thread context. This is a problem, particularly with MP operating systems, such as Linux SMP, that rely on the ability of one CPU to direct an inter-processor interrupt to another CPU in response to a timer interrupt request in order to accomplish preemptive multitasked process scheduling.

In accordance with the goal of providing high scalability of MIPS MT thread contexts, not only is the interrupt controller not replicated for each thread context, i.e., the exception domain is at the VPE level rather than at the thread context level, but other resources in a MIPS MT processor core also may not be replicated for each thread context. For example, each thread context may not have its own translation lookaside buffer (TLB) or floating point coprocessor.

Various MP operating systems have been developed to run on multiprocessor systems in which the multiple processors are MIPS architecture processors. As mentioned above, an SMP operating system running on a conventional multiprocessor system having N non-MT MIPS processors that views the system as having N CPUs will likewise view a single MIPS32 MT N-VPE microprocessor core as having N CPUs and run with little or no modifications to the SMP operating system. However, the existing MP operating systems do not have knowledge of the MIPS MT VPE/TC hierarchy, and in particular because a MIPS MT thread context is much more lightweight than a MIPS MT VPE and does not provide all the architectural state of a VPE, the existing MP operating systems do not view a MIPS MT core having M thread contexts as an M CPU system. However, it would be advantageous to enable the MP operating systems to view a MIPS MT core having M thread contexts as an M CPU system, particularly due to the highly scalable nature of MIPS MT thread contexts to a relatively large number of threads.

Therefore, what is needed is a means to have each lightweight thread context—to which is replicated less than the full architected CPU state anticipated by an existing MP operating system, such as a MIPS MT ASE thread context—appear as an architected CPU to the MP operating system, such as Linux SMP or other MP derivatives of UNIX-style operating systems.

BRIEF SUMMARY OF INVENTION

The present invention describes modifications to existing SMP operating systems that makes highly scalable, lightweight thread contexts within a multithreaded processor that would normally by themselves be unable to run an image, or instance, of the operating system, to function as a physical CPU for the purposes of the operating system resource management.

In one aspect, the present invention provides a multiprocessing system. The system includes a multithreading microprocessor including a plurality of thread contexts (TCs), each having a program counter and a general purpose register set for executing a thread. The microprocessor also includes a shared privileged resource, shared by the plurality of TCs rather than being replicated for each of the plurality of TCs, and privileged to be managed only by operating system-privileged threads rather than by user-privileged threads. The system also includes a multiprocessor operating system (OS), configured to manage the shared privileged resource, and to schedule execution of both the operating system-privileged threads and the user-privileged threads on the plurality of TCs.

In another aspect, the present invention provides a method for a multiprocessor operating system (OS) to run on a multiprocessing system having a multithreading microprocessor including a plurality of thread contexts (TCs) each having a program counter and a general purpose register set for executing a thread, and a shared privileged resource shared by the plurality of TCs rather than being replicated for each of the plurality of TCs. The method includes managing the shared privileged resource only by operating system-privileged threads of the OS executing on all of the plurality of TCs rather than by user-privileged threads executing on each of the plurality of TCs, and scheduling execution of both the operating system-privileged threads and the user-privileged threads on the plurality of TCs.

In another aspect, the present invention provides a computer program product for use with a computing device, the computer program product including a computer usable medium, having computer readable program code embodied in the medium, for causing a method for a multiprocessor operating system (OS) to run on a multiprocessing system having a multithreading microprocessor including a plurality of thread contexts (TCs) each having a program counter and a general purpose register set for executing a thread, and a shared privileged resource shared by the plurality of TCs rather than being replicated for each of the plurality of TCs. The computer readable program code includes first program code for providing a step of managing the shared privileged resource only by operating system-privileged threads of the OS executing on all of the plurality of TCs rather than by user-privileged threads executing on each of the plurality of TCs. The computer readable program code also includes second program code for providing a step of scheduling execution of both the operating system-privileged threads and the user-privileged threads on the plurality of TCs.

In another aspect, the present invention provides a method for providing operating system software for running on a multiprocessing system having a multithreading microprocessor including a plurality of thread contexts (TCs) each having a program counter and a general purpose register set for executing a thread, and a shared privileged resource shared by the plurality of TCs rather than being replicated for each of the plurality of TCs. The method includes providing computer-readable program code describing the operating system software. The program code includes first program code for providing a step of managing the shared privileged resource only by operating system-privileged threads of the OS executing on all of the plurality of TCs rather than by user-privileged threads executing on each of the plurality of TCs. The program code also includes second program code for providing a step of scheduling execution of both the operating system-privileged threads and the user-privileged threads on the plurality of TCs. The method also includes transmitting the computer-readable program code as a computer data signal on a network.

An advantage of the present invention is that it allows an SMP operating system, configured as if it were running on a relatively large number of symmetric CPUs, to run on a multithreaded processor, because each "CPU" is associated with a thread context that is very lightweight in terms of chip area and power consumption and therefore highly scalable. The thread contexts are lightweight because they do not each comprise the entire architectural state associated with an independent symmetric CPU; rather, the thread contexts have some architectural state replicated to each of them (such as a program counter and general purpose register set), but also share much of the architectural state between them (such as a TLB and interrupt control logic), which requires modifications to the SMP operating system to enable the number of operating system CPUs be equal to the number of thread contexts. Consequently, an existing body of coarse-grain multithreading technology embodied in SMP operating systems, such as multithreading telematics, robotics, or multimedia applications, may be exploited on such a highly scalable processor core.

DETAILED DESCRIPTION

For a better understanding of exception processing, translation lookaside buffer (TLB) operation, and floating point unit (FPU) coprocessor operation on MIPS architecture processors in general, the reader is referred to *MIPS RISC Architecture*, by Gerry Kane and Joe Heinrich, published by Prentice Hall, and to *See MIPS Run*, by Dominic Sweetman, published by Morgan Kaufman Publishers.

Embodiments of the present invention are described herein in the context of a processor core that includes the MIPS® MT Application-Specific Extension (ASE) to the MIPS32® Architecture; however, the present invention is not limited to a processor core with said architecture. Rather, the present invention may be implemented in any processor system which includes a plurality of thread contexts for concurrently executing a corresponding plurality of threads, but which does not include an interrupt input for each of the plurality of thread contexts that would allow one thread context to direct an inter-processor interrupt specifically to another thread context.

Figure 1:
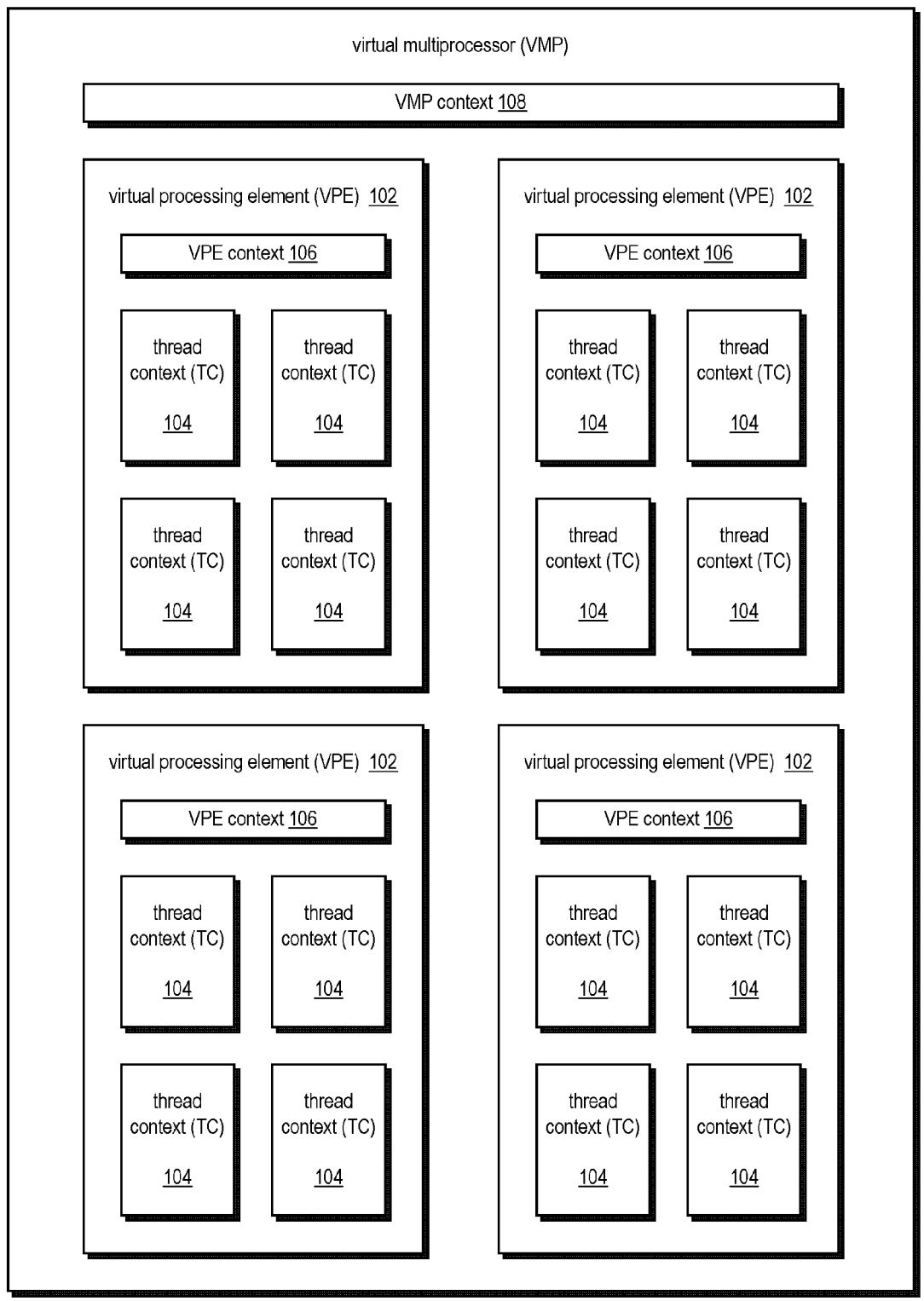
FIG. 1 is a block diagram illustrating a microprocessor according to the present invention.
Figure 5D:
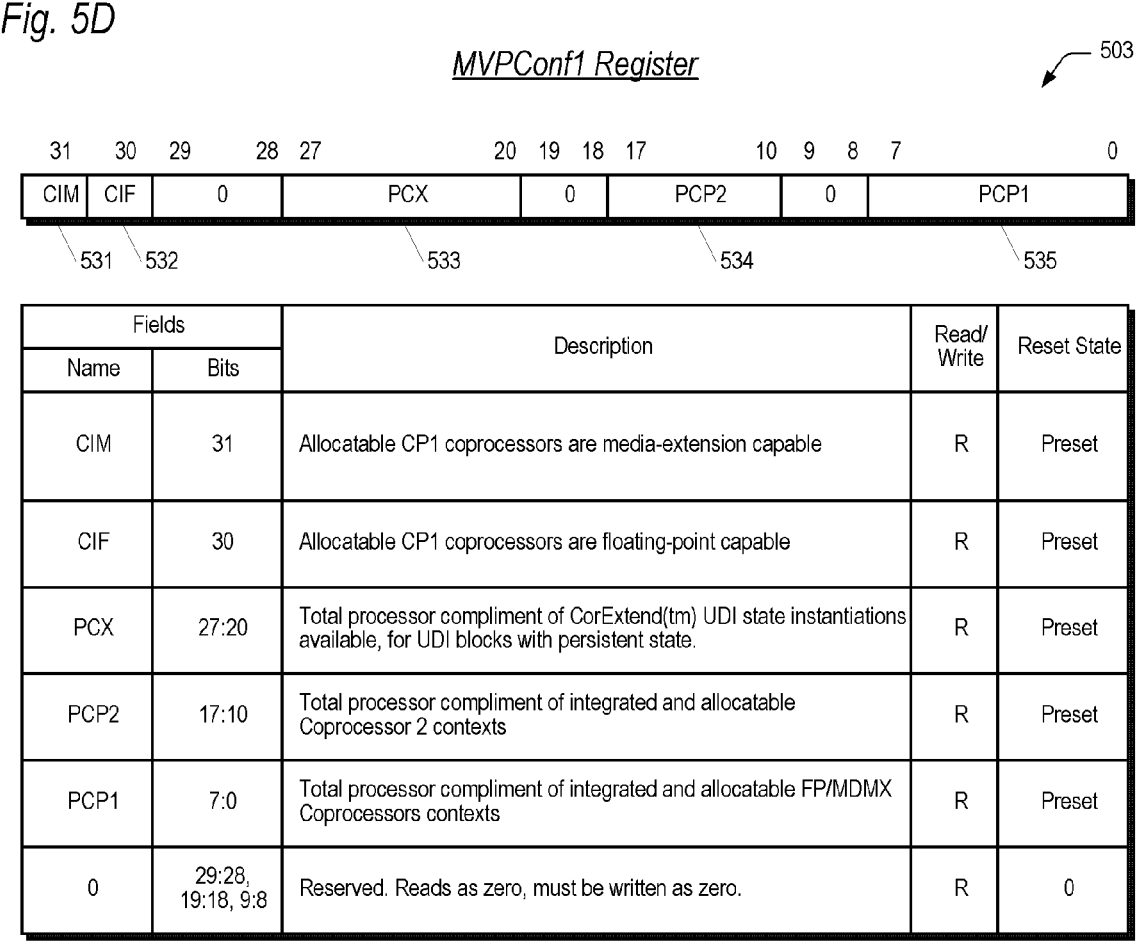
FIG. 5 is a series of block diagrams illustrating various multithreading-related registers of the microprocessor of FIG. 1 according to one embodiment of the present invention.
Figure 5G:
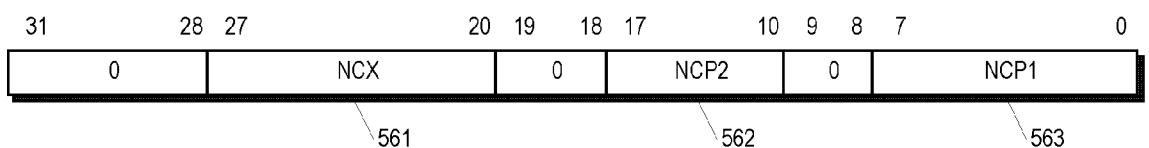
Figure 5H:
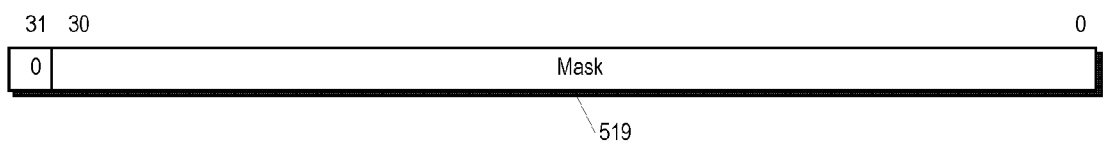
Figure 5H:
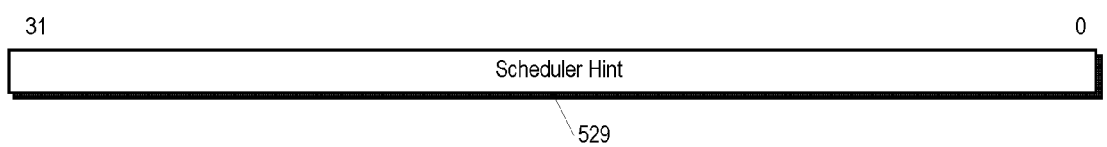
Figure 5H:
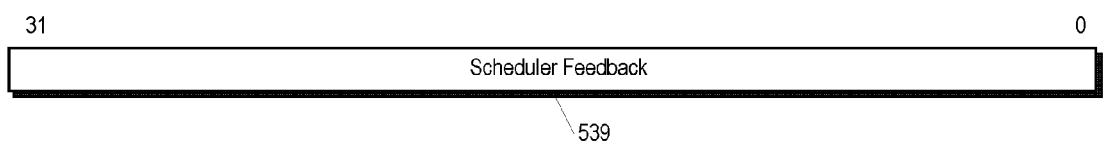

Referring now to FIG. 1, a block diagram illustrating a microprocessor 100 according to the present invention is shown. The microprocessor 100 includes a virtual multiprocessor (VMP) context 108 and a plurality of virtual processing elements (VPEs) 102. Each VPE 102 includes a VPE context 106 and at least one thread context (TC) 104. The VMP context 108 comprises a collection of storage elements, such as registers or latches, and/or bits in the storage elements of the microprocessor 100 that describe the state of execution of the microprocessor 100. In particular, the VMP context 108 stores state related to global resources of the microprocessor 100 that are shared among the VPEs 102, such as the instruction cache 202, instruction fetcher 204, instruction decoder 206, instruction issuer 208, instruction scheduler 216, execution units 212, and data cache 242 of FIG. 2, or other shared elements of the microprocessor 100 pipeline described below. In one embodiment, the VMP context 108 includes the MVPControl Register 501, MVPConf0 Register 502, and MVPCon1 Register 503 of FIGS. 5B-5D described below.

A thread context 104 comprises a collection of storage elements, such as registers or latches, and/or bits in the storage elements of the microprocessor 100 that describe the state of execution of a thread, and which enable an operating system to manage the resources of the thread context 104. That is, the thread context describes the state of its respective thread, which is unique to the thread, rather than state shared with other threads of execution executing concurrently on the microprocessor 100. A thread—also referred to herein as a thread of execution, or instruction stream—is a sequence of instructions. The microprocessor 100 is a multithreading microprocessor. That is, the microprocessor 100 is configured to concurrently execute multiple threads of execution. By storing the state of each thread in the multiple thread contexts 104, the microprocessor 100 is configured to quickly switch between threads to fetch and issue instructions. The elements of a thread context 104 of various embodiments are described below with respect to the remaining Figures. Advantageously, the present microprocessor 100 is configured to execute the MFTR instruction 300 of FIG. 3 and the MTTR instruction 400 of FIG. 4 for moving thread context 104 information between the various thread contexts 104, as described in detail herein.

The VPE context 106 includes a collection of storage elements, such as registers or latches, and/or bits in the storage elements of the microprocessor 100 that describe the state of execution of a VPE 102, which enable an operating system to manage the resources of the VPE 102, such as virtual memory, caches, exceptions, and other configuration and status information. Consequently, a microprocessor 100 with N VPEs 102 may appear to an operating system as an N-way symmetric multiprocessor. However, as also described herein, a microprocessor 100 with M thread contexts 104 may appear to an operating system as an M-way symmetric multiprocessor, such as shown with respect to FIG. 13. In particular, threads running on the thread contexts 104 may include MFTR instructions 300 and MTTR instructions 400 to read and write another thread context 104 to emulate a directed exception, such as an inter-processor interrupt, as described herein.

Figure 2:
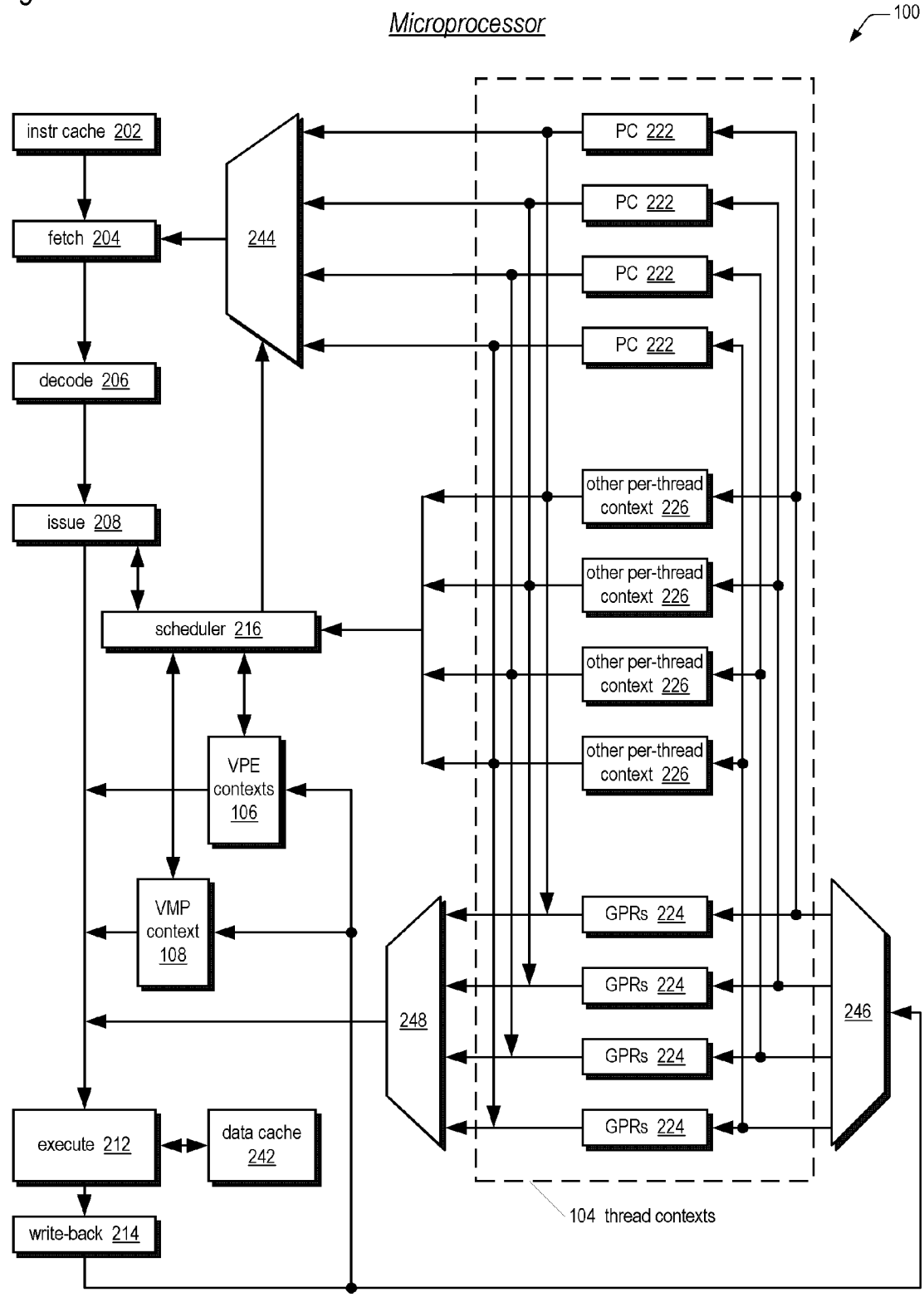
FIG. 2 is a block diagram illustrating in more detail the microprocessor of FIG. 1.

The VPEs 102 share various of the microprocessor 100 resources, such as the instruction cache 202, instruction fetcher 204, instruction decoder 206, instruction issuer 208, instruction scheduler 216, execution units 212, and data cache 242 of FIG. 2, transparently to the operating system. In one embodiment, each VPE 102 substantially conforms to a MIPS32 or MIPS64 Instruction Set Architecture (ISA) and a MIPS Privileged Resource Architecture (PRA), and the VPE context 106 includes the MIPS PRA Coprocessor 0 and system state necessary to describe one or more instantiations thereof. In one embodiment, the VPE context 106 includes the VPEControl Register 504, VPEConf0 Register 505, VPEConf1 Register 506, YQMask Register 591, VPESchedule Register 592, and VPEScheFBack Register 593 of FIGS. 5E-5H and EPC Register 598, Status Register 571, EntryHi Register 526, Context Register 527, and Cause Register 536 of FIGS. 5L-5P described below.

In one respect, a VPE 102 may be viewed as an exception domain. That is, when an asynchronous exception (such as a hardware or software interrupt) is generated, or when an instruction of one of the thread contexts 104 of a VPE 102 generates a synchronous exception (such as an address error, bus error, or invalid instruction exception), multithreading is suspended on the VPE 102 (i.e., only instructions of the instruction stream associated with the thread context 104 servicing the exception are fetched and issued), and each VPE context 106 includes the state necessary to service the exception. Once the exception is serviced, the exception handler may selectively re-enable multithreading on the VPE 102. When an asynchronous exception such as an interrupt is raised to the VPE 102, the VPE 102 selects one of the eligible (i.e., not marked as exempt from servicing asynchronous exceptions as indicated by the IXMT bit 518 of FIG. 5J) thread contexts 104 of the VPE 102 to execute the exception handler. (The manner used by the VPE 102 to select one of the eligible thread contexts is implementation-dependent, such as selecting pseudo-randomly, in a round-robin fashion, or based on the relative priorities of the thread contexts 104.) That is, the asynchronous exception itself does not specify which thread context 104 of the VPE 102 is to handle the exception. Thus, the microprocessor 100 does not provide a hardware exception mechanism for one thread context 104 to direct an asynchronous exception to another specific thread context 104. Advantageously, the present invention provides a method for operating system software to emulate one thread context 104 directing an asynchronous exception to another specific thread context 104, as described herein.

Referring now to FIG. 2, a block diagram illustrating in more detail the microprocessor 100 of FIG. 1 is shown. The microprocessor 100 is a pipelined microprocessor comprising a plurality of pipeline stages. The microprocessor 100 includes a plurality of thread contexts 104 of FIG. 1. The embodiment of FIG. 2 shows four thread contexts 104; however, it should be understood that the number of four thread contexts 104 is chosen only for illustration purposes, and the microprocessor 100 described herein embodying the present invention is susceptible to any number of thread contexts 104. In one embodiment, the number of thread contexts 104 may be up to 256. Furthermore, a microprocessor 100 may include multiple VPEs 102, each having multiple thread contexts 104. In one embodiment, each thread context 104 comprises a program counter (PC) 222 for storing an address for fetching a next instruction in the associated instruction stream, a general purpose register (GPR) set 224 for storing intermediate execution results of the instruction stream issuing from the thread context based on the program counter 222 value, and other per-thread context 226. In one embodiment, the microprocessor 100 includes a multiplier unit, and the other thread context 226 includes registers for storing results of the multiplier unit specifically associated with multiply instructions in the instruction stream. In one embodiment, the other thread context 226 includes information for uniquely identifying each thread context 104. In one embodiment, the thread identification information includes information for specifying the execution privilege level of the associated thread, such as whether the thread is a kernel, supervisor, or user level thread, such as is stored in the TKSU bits 589 of the TCStatus Register 508 of FIG. 5J. In one embodiment, the thread identification information includes information for identifying a task or process comprising the thread. In particular, the task identification information may be used as an address space identifier (ASID) for purposes of translating physical addresses into virtual addresses, such as is stored in the TASID bits 528 of the TCStatus Register 508, which are reflected in the EntryHi Register 526 of FIG. 5N. In one embodiment, the other per-thread context 226 includes the TCStatus Register 508, TCRestart Register 594, TCHalt Register 509, TCContext Register 595, TCSchedule Register 596, TCBind Register 556 and TCScheFBack Register 597 of FIGS. 5J-5L.

The microprocessor 100 includes a scheduler 216 for scheduling execution of the various threads being concurrently executed by the microprocessor 100. The scheduler 216 is coupled to the VMP context 108 and VPE contexts 106 of FIG. 1 and to the other per-thread context 226. In particular, the scheduler 216 is responsible for scheduling fetching of instructions from the program counter 222 of the various thread contexts 104 and for scheduling issuing of the fetched instructions to execution units 212 of the microprocessor 100, as described below. The scheduler 216 schedules execution of the threads based on a scheduling policy of the microprocessor 100. The scheduling policy may include, but is not limited to, any of the following scheduling policies. In one embodiment, the scheduler 216 employs a round-robin, or time-division-multiplexed, or interleaved, scheduling policy that allocates a predetermined number of clock cycles or instruction issue slots to each ready thread in a rotating order. The round-robin policy is useful in an application in which fairness is important and a minimum quality of service is required for certain threads, such as real-time application program threads. In one embodiment, the scheduler 216 employs a blocking scheduling policy wherein the scheduler 216 continues to schedule fetching and issuing of a currently running thread until an event occurs that blocks further progress of the thread, such as a cache miss, a branch misprediction, a data dependency, or a long latency instruction. In one embodiment, the microprocessor 100 comprises a superscalar pipelined microprocessor, and the scheduler 216 schedules the issue of multiple instructions per clock cycle, and in particular, the issue of instructions from multiple threads per clock cycle, commonly referred to as simultaneous multithreading.

The microprocessor 100 includes an instruction cache 202 for caching program instructions fetched from a system memory of a system including the microprocessor 100, such as the MFTR/MTTR 300/400 instructions. In one embodiment, the microprocessor 100 provides virtual memory capability, and the fetch unit 204 includes a translation lookaside buffer (TLB) for caching virtual to physical memory page translations. In one embodiment, each thread, or program, or task, executing on the microprocessor 100 is assigned a unique task ID, or address space ID (ASID), which is used to perform memory accesses and in particular memory address translations, and a thread context 104 also includes storage for an ASID associated with the thread. In one embodiment, the various threads executing on the microprocessor 100 share the instruction cache 202 and TLB, as discussed in more detail below.

The microprocessor 100 also includes a fetch unit 204, coupled to the instruction cache 202, for fetching program instructions, such as MFTR/MTTR 300/400 instructions, from the instruction cache 202 and system memory. The fetch unit 204 fetches instructions at an instruction fetch address provided by a multiplexer 244. The multiplexer 244 receives a plurality of instruction fetch addresses from the corresponding plurality of program counters 222. Each of the program counters 222 stores a current instruction fetch address for a different program thread. The embodiment of FIG. 2 illustrates four different program counters 222 associated with four different threads. The multiplexer 244 selects one of the four program counters 222 based on a selection input provided by the scheduler 216. In one embodiment, the various threads executing on the microprocessor 100 share the fetch unit 204.

The microprocessor 100 also includes a decode unit 206, coupled to the fetch unit 204, for decoding program instructions fetched by the fetch unit 204, such as MFTR/MTTR 300/400 instructions. The decode unit 206 decodes the opcode, operand, and other fields of the instructions. In one embodiment, the various threads executing on the microprocessor 100 share the decode unit 206.

The microprocessor 100 also includes execution units 212 for executing instructions. The execution units 212 may include but are not limited to one or more integer units for performing integer arithmetic, Boolean operations, shift operations, rotate operations, and the like; floating point units for performing floating point operations; load/store units for performing memory accesses and in particular accesses to a data cache 242 coupled to the execution units 212; and a branch resolution unit for resolving the outcome and target address of branch instructions. In one embodiment, the data cache 242 includes a translation lookaside buffer (TLB) for caching virtual to physical memory page translations, which is shared by the various thread contexts, as described in more detail below. In addition to the operands received from the data cache 242, the execution units 212 also receive operands from registers of the general purpose register sets 224. In particular, an execution unit 212 receives operands from a register set 224 of the thread context 104 allocated to the thread to which the instruction belongs. A multiplexer 248 selects operands from the appropriate register set 224 for provision to the execution units 212. In addition, the multiplexer 248 receives data from each of the other per-thread contexts 226 and program counters 222, for selective provision to the execution units 212 based on the thread context 104 of the instruction being executed by the execution unit 212. In one embodiment, the various execution units 212 may concurrently execute instructions from multiple concurrent threads.

The microprocessor 100 also includes an instruction issue unit 208, coupled to the scheduler 216 and coupled between the decode unit 206 and the execution units 212, for issuing instructions to the execution units 212 as instructed by the scheduler 216 and in response to information about the instructions decoded by the decode unit 206. In particular, the instruction issue unit 208 insures that instructions are not issued to the execution units 212 if they have data dependencies on other instructions previously issued to the execution units 212. In one embodiment, an instruction queue is imposed between the decode unit 206 and the instruction issue unit 208 for buffering instructions awaiting issue to the execution units 212 for reducing the likelihood of starvation of the execution units 212. In one embodiment, the various threads executing on the microprocessor 100 share the instruction issue unit 208.

The microprocessor 100 also includes a write-back unit 214, coupled to the execution units 212, for writing back results of instructions into the general purpose register sets 224, program counters 222, and other thread contexts 226. A demultiplexer 246 receives the instruction result from the write-back unit 214 and stores the instruction result into the appropriate register set 224, program counters 222, and other thread contexts 226 associated with the instruction's thread. The instruction results are also provided for storage into the VPE contexts 106 and the VMP context 108.

Figure 3A:
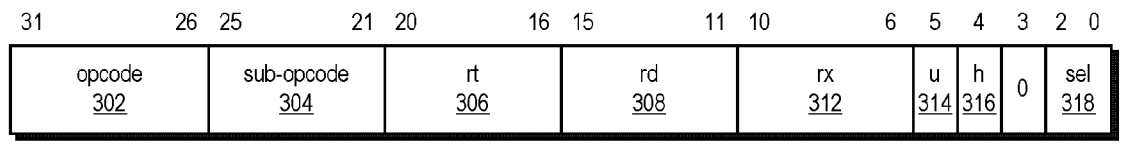
FIG. 3 is a block diagram illustrating an MFTR instruction executed by the microprocessor of FIG. 1 according to the present invention.
Figure 3A:
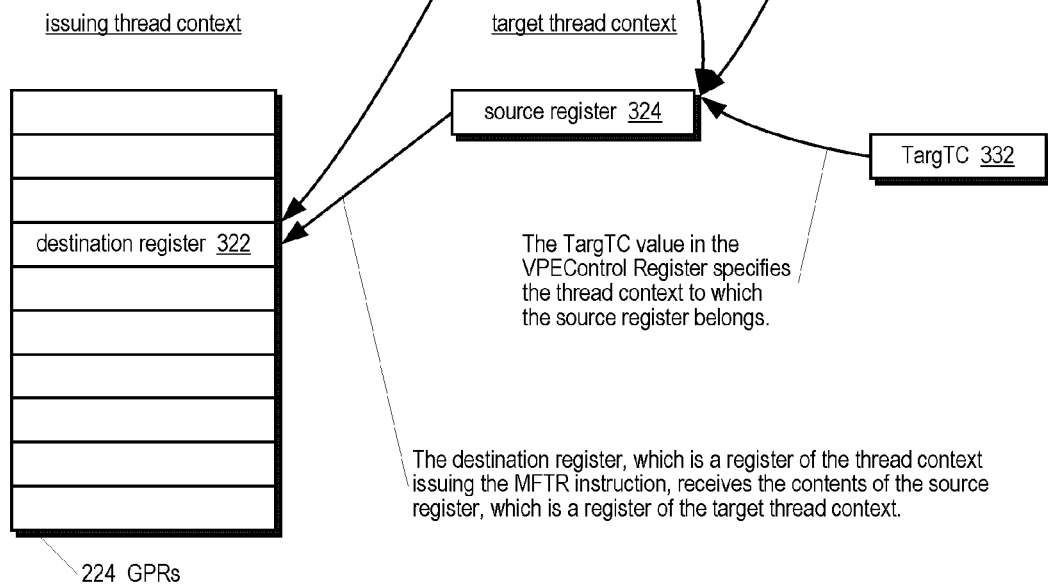

Referring now to FIG. 3, a block diagram illustrating an MFTR instruction 300 executed by the microprocessor 100 of FIG. 1 according to the present invention is shown. FIG. 3 comprises FIG. 3A illustrating the format and function of the MFTR instruction 300, and FIG. 3B illustrating a table 350 specifying selection of the MFTR instruction 300 source register 324 based on its operand values. The mnemonic for the MFTR instruction 300 is MFTR rt, rd, u, sel, h as shown. As shown in FIG. 3, the MFTR instruction 300 instructs the microprocessor 100 to copy the contents of a source register 324 of a target thread context 104 to a destination register 322 of an issuing thread context 104.

Bits 11-15 are an rd field 308, which specifies an rd register 322, or destination register 322, within the general purpose register set 224 of FIG. 2 of the thread context 104 from which the MFTR instruction 300 is issued, referred to herein as the issuing thread context. In one embodiment, the destination register 322 is one of 32 general purpose registers of the MIPS ISA.

Bits 16-20, 6-10, 5, 4, and 0-2 are an rt field 306, rx field 312, u field 314, h field 316, and sel field 318, respectively, which collectively are used to specify a source register 324 of a thread context 104 distinct from the issuing thread context, referred to herein as the target thread context 104. The use of the rt field 306, rx field 312, u field 314, h field 316, and sel field 318 to specify the source register 324 is described in detail in table 350 of FIG. 3B.

Figure 6:
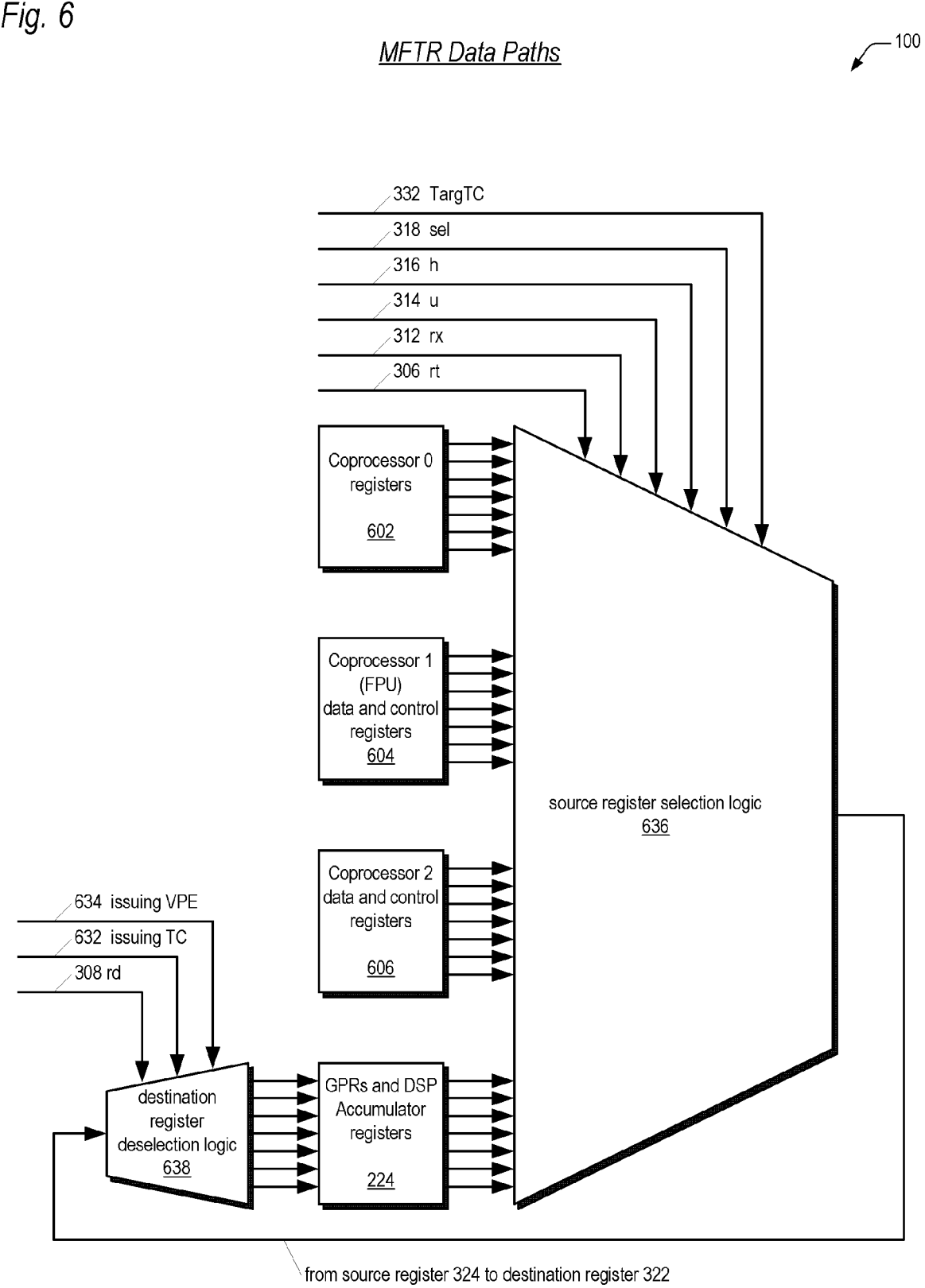
FIG. 6 is a block diagram illustrating data paths of the microprocessor for performing the MFTR instruction according to the present invention.
Figure 8:
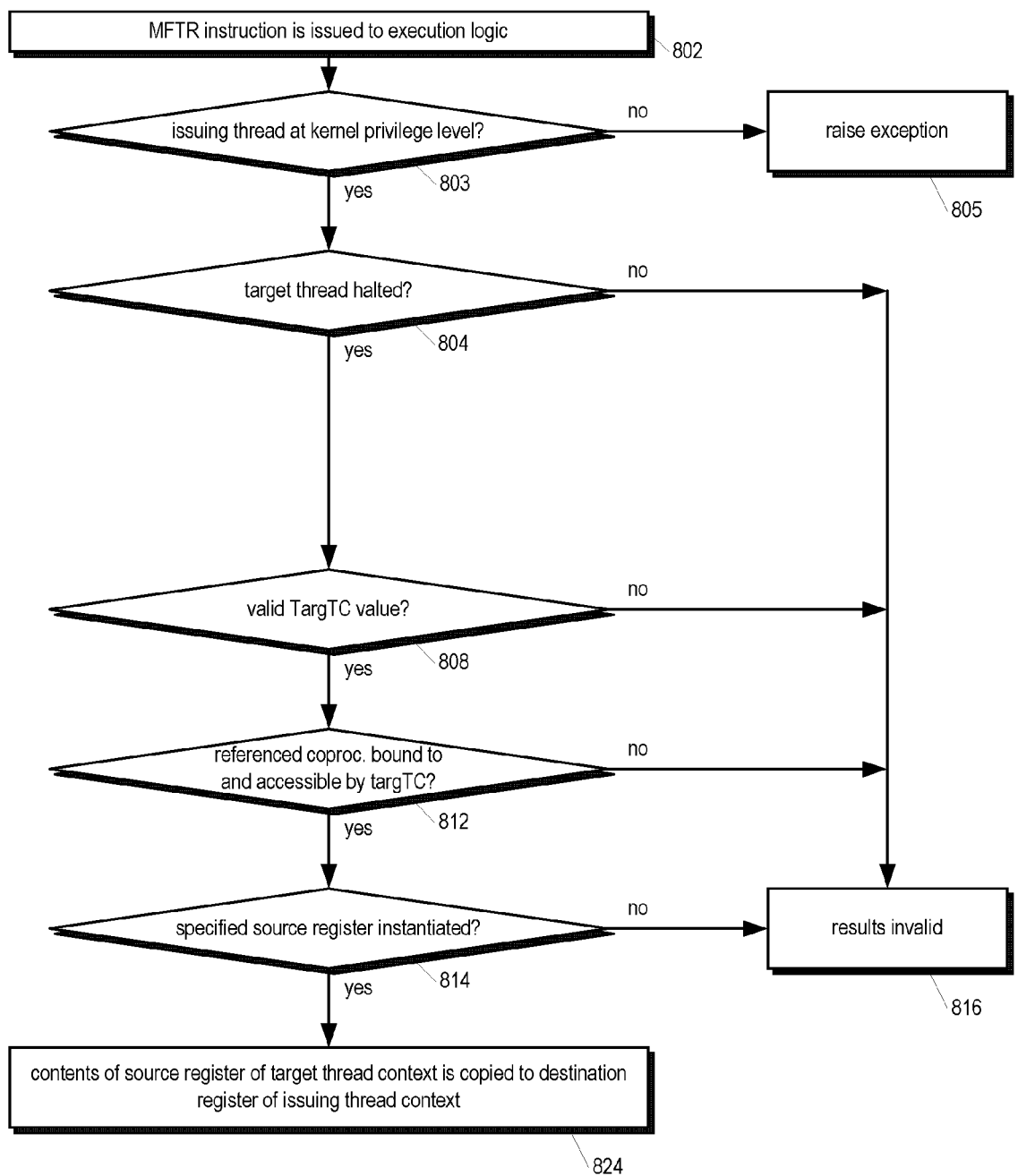
FIG. 8 is a flowchart illustrating operation of the microprocessor to execute the MFTR instruction according to the present invention.

In one embodiment, the microprocessor 100 includes one or more processor control coprocessors, referred to in the MIPS PRA as Coprocessor 0, or CP0, or Cop0, denoted 602 in FIGS. 6 and 8, which is generally used to perform various microprocessor 100 configuration and control functions, such as cache control, exception control, memory management unit control, and particularly multithreading control and configuration. As shown in Table 350, a u field 314 value of 0 selects one of the CP0 registers as the MFTR instruction 300 source register 324. Table 500 of FIG. 5A illustrates the particular rt field 306 (or rd 308 in the case of MTTR 400) and sel field 318 values used to select the various multithreading-related CP0 registers. In one embodiment, as shown in Table 350, a u field 314 value of 1 and a sel field 318 value of 0 selects one of the general purpose registers 224 of FIG. 2, selected by the rt field 306 value, as the MFTR instruction 300 source register 324. In one embodiment, the microprocessor 100 includes a digital signal processor (DSP) arithmetic unit or multiplier for performing common DSP-related arithmetic operations, and each thread context 104 includes four accumulators for storing the TC-specific results of the arithmetic operations and a DSPControl register of the DSP accumulators, denoted 224 in FIGS. 6 and 8. A u field 314 value of 1 and a sel field 318 value of 1 selects as the MFTR instruction 300 source register 324 one of the DSP accumulator registers or the DSPControl register, selected by the rt field 306 value, as shown. In one embodiment, the microprocessor 100 includes one or more floating point or multimedia coprocessors, referred to in the MIPS PRA as Coprocessor 1, or CP1, or Cop1, denoted 604 in FIGS. 6 and 8. As shown in Table 350, a u field 314 value of 1 and a sel field 318 value of 2 selects as the MFTR instruction 300 source register 324 one of the floating point unit data registers (FPR) selected by the rt field 306 value; furthermore, a sel field 318 value of 3 selects as the MFTR instruction 300 source register 324 one of the floating point unit control registers (FPCR) selected by the rt field 306 value. In one embodiment, the microprocessor 100 includes one or more implementation-specific coprocessors, referred to in the MIPS PRA as Coprocessor 2, or CP2, or Cop2, denoted 606 in FIGS. 6 and 8. As shown in Table 350, a u field 314 value of 1 and a sel field 318 value of 4 selects as the MFTR instruction 300 source register 324 one of the CP2 data registers (Cop2 Data) selected by the concatenation of the rx field 312 value and the rt field 306 value; furthermore, a sel field 318 value of 5 selects as the MFTR instruction 300 source register 324 one of the CP2 control registers (Cop2

Control) selected by the concatenation of the rx field 312 value and the rt field 306 value.

The source register 324 is further specified by a TargTC operand 332. The TargTC 332 operand specifies the target thread context 104 containing the source register 324. In one embodiment, the TargTC operand 332 is stored in the VPE-Control Register 504 of FIG. 5E. If the source register 324 is a per-VPE 102 register, the source register 324 is of the VPE 102 to which the target thread context 104 is bound, as specified by the CurVPE field 558 of the TCBind Register 556 of FIG. 5K.

Figure 4A:
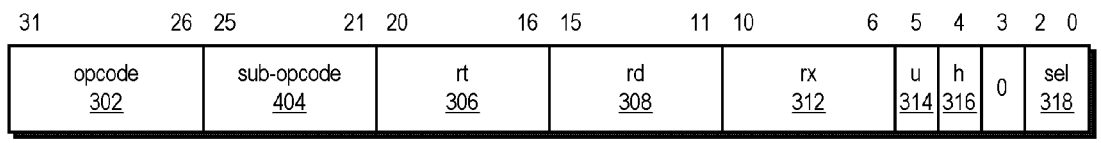
FIG. 4 is a block diagram illustrating an MTTR instruction executed by the microprocessor of FIG. 1 according to the present invention.
Figure 4A:
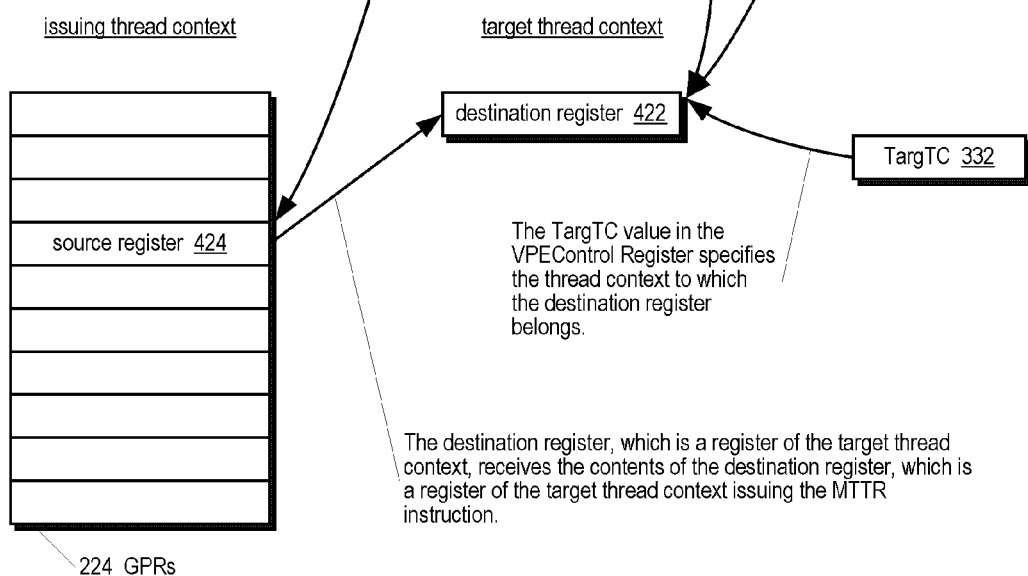

Referring now to FIG. 4, a block diagram illustrating an MTTR instruction 400 executed by the microprocessor 100 of FIG. 1 according to the present invention is shown. FIG. 4 comprises FIG. 4A illustrating the format and function of the MTTR instruction 400, and FIG. 4B illustrating a table 450 specifying selection of the MTTR instruction 400 destination register 422 based on its operand values. The various fields of the MTTR instruction 400 are identical to the fields of the MFTR instruction 300, except that the value of the sub-opcode field 404 is different, and the use of the rt field 306 and rd field 308 is reversed, i.e., the rt field 306 is used by the MTTR instruction 400 to select the source register 424 and the rd field 308 is used—along with the rx 312, u 314, h 316, and sel 318 fields—to select the destination register 422 within the thread context 104 specified by the TargTC 332 operand, as shown in FIG. 4. As shown in FIG. 4, the MTTR instruction 400 instructs the microprocessor 100 to copy the contents of a source register 424 of the issuing thread context 104 to a destination register 424 of the target thread context 104.

Referring now to FIG. 5, a series of block diagrams illustrating various multithreading-related registers of the microprocessor 100 of FIG. 1 according to one embodiment of the present invention is shown. FIG. 5 comprises FIG. 5A-5P. In one embodiment, the registers of FIG. 5 are comprised in CP0 602 of FIG. 6 and 8, and FIG. 5A is a table 500 indicating the particular rt field 306 (or rd 308 in the case of MTTR 400) and sel field 318 values used to select the various multithreading-related CP0 registers 602. As indicated in table 500, some of the registers are included in the VMP context 108 of FIG. 1 (i.e., are per-microprocessor 100 registers), some of the registers are included in the VPE contexts 106 of FIG. 1 (i.e., are per-VPE 102 registers), and some of the registers are included in the thread contexts 104 of FIG. 1 (i.e., are per-thread context 104 registers). Most of FIGS. 5B-5P include an illustration of the fields of each of the multithreading registers and a table describing the various fields. Fields of particular relevance are discussed in more detail herein. Each of the registers illustrated in FIG. 5 of one thread context (i.e., the target thread context 104) may be selectively read and/or written by another thread context 104 (i.e., the issuing thread context 104) that executes an MFTR 300 or MTTR 400 instruction, respectively, depending upon the readability or writeability of the particular register or bits thereof.

The EVP bit 513 of FIG. 5B controls whether the microprocessor 100 is executing as a virtual multiprocessor, i.e., if multiple VPEs 102 may concurrently fetch and issue instructions from distinct threads of execution. The PVPE field 524 of FIG. 5C specifies the total number of VPEs 102, i.e., the total number of VPE contexts 106, instantiated in the microprocessor 100. In the embodiment of FIG. 5, up to sixteen VPEs 102 may be instantiated in the microprocessor 100. The PTC field 525 of FIG. 5C specifies the total number of thread contexts 104 instantiated in the microprocessor 100. In the embodiment of FIG. 5, up to 256 thread contexts 104 may be instantiated in the microprocessor 100. The TE bit 543 of FIG. 5E controls whether multithreading is enabled or disabled within a VPE 102. In one embodiment, the effect of clearing the EVP bit 513 and TE bit 543 may not be instantaneous; consequently the operating system should execute a hazard barrier instruction to insure that all VPEs 102 and thread contexts 104, respectively, have been quiesced.

As discussed above, TargTC field 332 of FIG. 5E is used by an issuing thread context 104 to specify the thread context 104 that contains the source register 324 in the case of an MFTR instruction 300 or the destination register 422 in the case of an MTTR instruction 400. In one embodiment, the issuing thread context 104 executes an instruction prior to the MFTR/MTTR instruction 300/400 to populate the TargTC 332 field of the VPEControl Register 504. In one embodiment, a single TargTC 332 value per VPE 102 is sufficient since multithreading must be disabled on the VPE 102 issuing the MFTR/MTTR 300/400 instruction; hence, none of the other thread contexts 104 of the VPE 102 may be using the TargTC 332 field of the VPEControl Register 504 of the issuing VPE 102. In an alternate embodiment, the TargTC 332 value may be provided within a field of the MFTR/MTTR 300/400 instructions. The TargTC field 332 is used to specify the target thread context 104 independent of the VPE 102 to which the target thread context 104 is bound. Each thread context 104 in the microprocessor 100 has a unique number, or identifier, specified in the CurTC field 557 of the TCBind Register 556 of FIG. 5K, with values 0 through N-1, where N is the number of instantiated thread contexts 104, and N may be up to 256. If the target register (source register 324 of an MFTR instruction 300, or destination register 422 of an MTTR instruction 400) is a per-TC register, then the target register is in the thread context 104 specified by the TargTC 332 value; if the target register is a per-VPE register, then the target register is in the VPE 102 to which the thread context 104 specified in the TargTC 332 is bound.

The TCU0 . . . TCU3 bits 581 of the TCStatus Register 508 of FIG. 5J control and indicate whether the thread context 104 controls access to its VPE's 102 Coprocessor 0, 1, 2, or 3, respectively. The TCU0 . . . TCU3 bits 581 and TKSU bits 589 of the TCStatus Register 508 correspond to the CU0 . . . CU3 bits 572 and the KSU bits 574, respectively, of the Status Register 571 of FIG. 5M; and the TASID bits 528 of the TCStatus Register 508 correspond to the ASID bits 538 of the Coprocessor 0 EntryHi Register 526 of FIG. 5N described in the MIPS32® Architecture for Programmers Volume III: The MIPS32® Privileged Resource Architecture, Document Number: MD00090, Revision 2.50, Jul. 1, 2005, available from MIPS Technologies, 1225 Charleston Road, Mountain View, Calif. 94043-1353. In particular, each time the bits are written in one of the registers, the corresponding change is reflected by a read of the other register. For example, if a new value is written to the TKSU bits 589, the new value may be read from the KSU bits 574 of the Status Register 571, and vice versa. For another example, if a new value is written to the ASID bits 538 of the EntryHi Register 526, the new value may be read from the TASID bits 528 of the TCStatus Register 508, and vice versa.

Figure 5L:
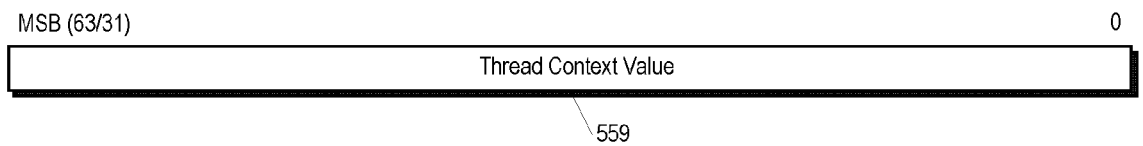
Figure 5L:
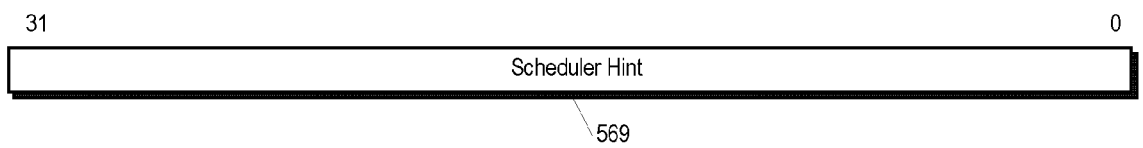
Figure 5L:
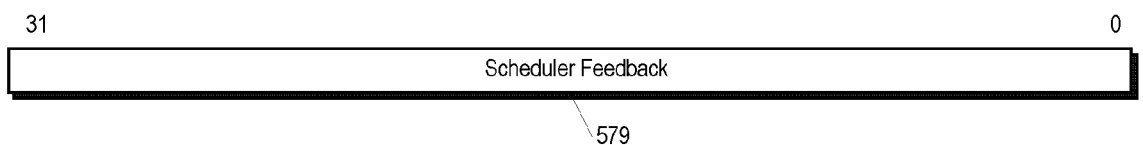
Figure 5L:
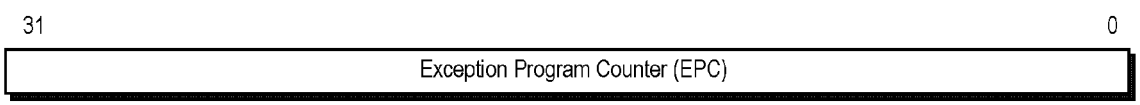

The TCContext Register 595 of FIG. 5L is a read/write register usable by the operating system as a pointer to a thread context-specific storage area in memory, such as a thread context control block. The TCContext Register 595 may be used by the operating system, for example, to save and restore state of a thread context 104 when the program thread associated with the thread context 104 must be swapped out for use by another program thread.

The RNST bits 582 of the TCStatus Register 508 indicate the state of the thread context 104, namely whether the thread context 104 is running or blocked, and if blocked the reason for blockage. The RNST 582 value is only stable when read by an MFTR instruction 300 if the target thread context 104 is in a halted state, which is described below; otherwise, the RNST 582 value may change asynchronously and unpredictably. When a thread context 104 is in the running state, the microprocessor 100 will fetch and issue instructions from the thread of execution specified by the thread context 104 program counter 222 according to the scheduler 216 scheduling policy.

Independently of whether a thread context 104 is free or activated, a thread context 104 may be halted if the H bit 599 of the TCHalt Register 509 of FIG. 5K is set. That is, a first thread context 104 running an operating system thread may halt a second thread context 104 by writing a 1 to the H bit 599 of the TCHalt Register 509 of the second thread context 104. A free thread context 104 has no valid content and the microprocessor 100 does not schedule instructions of a free thread context 104 to be fetched or issued. The microprocessor 100 schedules instructions of an activated thread context 104 to be fetched and issued from the activated thread context 104 program counter 222. The microprocessor 100 schedules only activated thread contexts 104. The microprocessor 100 allows the operating system to allocate only free thread contexts 104 to create new threads. Setting the H bit 599 of an activated thread context 104 causes the thread context 104 to cease fetching instructions and to load its restart address 549 into the TCRestart register 594 of FIG. 5K with the address of the next instruction to be issued for the thread context 104. Only a thread context 104 in a halted state is guaranteed to be stable as seen by other thread contexts 104, i.e., when examined by an MFTR instruction 300. Multithreaded execution may be temporarily inhibited on a VPE 102 due to exceptions or explicit software interventions, but activated thread contexts 104 that are inhibited in such cases are considered to be suspended, rather than implicitly halted. A suspended thread context 104 is inhibited from any action which might cause exceptions or otherwise change global VPE 102 privileged resource state, but unlike a halted thread, a suspended thread context 104 may still have instructions active in the pipeline; consequently, the suspended thread context 104, including general purpose registers 224 values, may still be unstable; therefore, the thread context 104 should not be examined by an MFTR instruction 300 until the thread context 104 is halted. In one embodiment, the effect of clearing the H bit 599 may not be instantaneous; consequently the operating system should execute a hazard barrier instruction to insure that the target thread context has been quiesced.

When a thread context 104 is in a halted state, the TCRestart Register 594 may be read to obtain the address 549 of the instruction at which the microprocessor 100 will resume execution of the thread context 104 when the thread context 104 is restarted. In the case of branch and jump instructions with architectural branch delay slots, the restart address 549 will advance beyond the address of the branch or jump instruction only after the instruction in the delay slot has been retired. If the thread context 104 is halted between the execution of a branch instruction and the associated delay slot instruction, the branch delay slot is indicated by the TDS bit 584 of the TCStatus Register 508.

Conversely, the TCRestart register 594 can be written while its thread context 104 is halted to change the address at which the thread context 104 will restart. Furthermore, a first thread context 104 running an operating system thread may restart a second thread context 104 by writing a 0 to the H bit 599 of the TCHalt Register 509 of the second thread context 104. Clearing the H bit 599 of an activated thread context 104 allows the thread context 104 to be scheduled, and begin fetching and executing instructions at its restart address 549 specified in its TCRestart register 594.

In the MIPS PRA, the Coprocessor 0 EPC Register 598 of FIG. 5L contains the address at which the exception servicing thread context 104 will resume execution after an exception has been serviced and the thread context 104 executes an ERET (exception return) instruction. That is, when the thread running on the thread context 104 executes an ERET instruction, the VPE 102 reads the EPC Register 598 to determine the address at which to begin fetching and issuing instructions. Unless the EXL bit 576 of the Status Register 571 of FIG. 5M is already set, the microprocessor 100 writes the EPC Register 598 when an exception is raised. For synchronous exceptions, the microprocessor 100 writes the address of the instruction that was the direct cause of the exception, or the address of the immediately preceding branch or jump instruction, if the exception-causing instruction is in a branch delay slot. For asynchronous exceptions, the microprocessor 100 writes the address of the instruction at which execution will be resumed.

In a MIPS MT ASE microprocessor 100, the EPC Register 598 is instantiated for each VPE 102 in the microprocessor 100. When an exception is raised to a VPE 102, the VPE 102 selects one of its thread contexts 104 to service the exception. All thread contexts 104 of the VPE 102, other than the thread context 104 selected to service the exception, are stopped and suspended until the EXL bit 576 and ERL bit 575 of the Status Register 571 are cleared. When a synchronous exception is raised due to the execution of an instruction contained in a thread of execution, the microprocessor 100 selects the thread context 104 running the thread containing the offending instruction to service the exception. That is, the general purpose registers 224, program counter 222, and other per-thread context 226 of the offending thread context 104 are used to service the synchronous exception. When an asynchronous exception is raised, such as an interrupt, the microprocessor 100 selects one of the eligible thread contexts 104 bound to the VPE 102 to service the asynchronous exception. The VPE 102 to which a thread context 104 is bound (as indicated by the CurVPE field 558 of the TCBind Register 556) is the exception domain for the thread context 104. In particular, a VPE 102 selects a thread context 104 bound to it, i.e., within its exception domain, to service an exception. Additionally, a thread context 104 utilizes the resources related to handling exceptions (such as the Coprocessor 0 EPC Register 598 and Status Register 571) of the exception domain, or VPE 102, to which the thread context 104 is bound when servicing an exception. The method for choosing the eligible thread context 104 to service an asynchronous exception is implementation-dependent and may be adapted to satisfy the particular application in which the microprocessor 100 is employed. However, as discussed herein, the MIPS MT ASE does not provide the capability for the asynchronous exception to specify which of the thread contexts 104 must service the asynchronous exception. The microprocessor 100 saves the restart address of the thread context 104 selected to service the exception in the EPC Register 598 of the VPE 102 to which the selected thread context 104 is bound. Additionally, a thread context 104 may be made ineligible for being selected to service an asynchronous exception by setting the IXMT bit 518 in its TCStatus Register 508.

In one embodiment, the program counter 222 of FIG. 2 is not an architecturally-visible register, but is affected indirectly by various events and instructions. Effectively, the program counter 222 is a virtual program counter represented by various storage elements within the microprocessor 100 pipeline, and the meaning or value of the program counter 222 depends upon the context in which it is examined or updated. For example, as a thread context 104 fetches instructions from the instruction cache 202, the program counter 222 value is the address at which the instructions are being fetched. Thus, in this context the storage element storing the current fetch address may be viewed as the program counter 222. For another example, when an exception is taken and the VPE 102 selects a thread context 104 to service the exception, the address written by the VPE 102 to the EPC Register 598 may be viewed as the program counter 222 value of the selected thread context 104 in this situation since when the selected thread context 104 executes an ERET instruction, fetching for the thread context 104 begins at the EPC Register 598 value. For another example, the TCRestart register 594 of a thread context 104 may be viewed as the program counter 222 when a thread context 104 is halted since when the thread context 104 is unhalted, fetching for the thread context 104 begins at the TCRestart register 594 value.

The Coprocessor 0 Status Register 571 of FIG. 5M is instantiated for each VPE 102 in the microprocessor 100. Only certain fields of the Status Register 571 are described herein. For a more detailed description of the other bits in the Status Register 571, the reader is referred to the document MIPS32® Architecture for Programmers Volume III: The MIPS32® Privileged Resource Architecture, Document Number: MD00090, Revision 2.50, Jul. 1, 2005, which is hereby incorporated by reference in its entirety for all purposes. As discussed above, the CU0 . . . CU3 bits 572 and the KSU bits 574 correspond to the TCU0 . . . TCU3 bits 581 and TKSU bits 589, respectively, of the TCStatus Register 508 of FIG. 5J. The ERL bit 575 is set by the microprocessor 100 hardware whenever a Reset, Soft Reset, NMI, or Cache Error exception is taken. The EXL bit 576 is set by the microprocessor 100 hardware whenever any other exception is taken. When ERL 575 or EXL 576 is set, the VPE 102 is running in kernel mode with interrupts disabled. When the IE bit 577 is set, all interrupts for the VPE 102 are disabled.

Referring now to FIG. 6, a block diagram illustrating data paths of the microprocessor 100 for performing the MFTR instruction 300 according to the present invention is shown. The microprocessor 100 includes selection logic 636 that receives the contents of each of the registers of Coprocessor 0 602, Coprocessor 1 604, Coprocessor 2 606, and the general purpose and DSP accumulator registers 224 of FIG. 2 and selects the source register 324 contents, which is one of the register contents from the target thread context 104, for provision to deselection logic 638 based on values of the rt 306 operand, the rx 312 operand, the u 314 operand, the h 316 operand, and the sel 318 operand of the MFTR instruction 300, as well as the TargTC 332 operand. The deselection logic 638 receives the source register 324 contents selected by the selection logic 636 and writes the selected contents into the destination register 322, which is one of the general purpose registers 224 of the issuing thread context 104, based on the value of the rd 308 operand of the MFTR instruction 300, as well as signals 632 and 634 indicating the issuing VPE 102 and issuing thread context 104, respectively.

Figure 7:
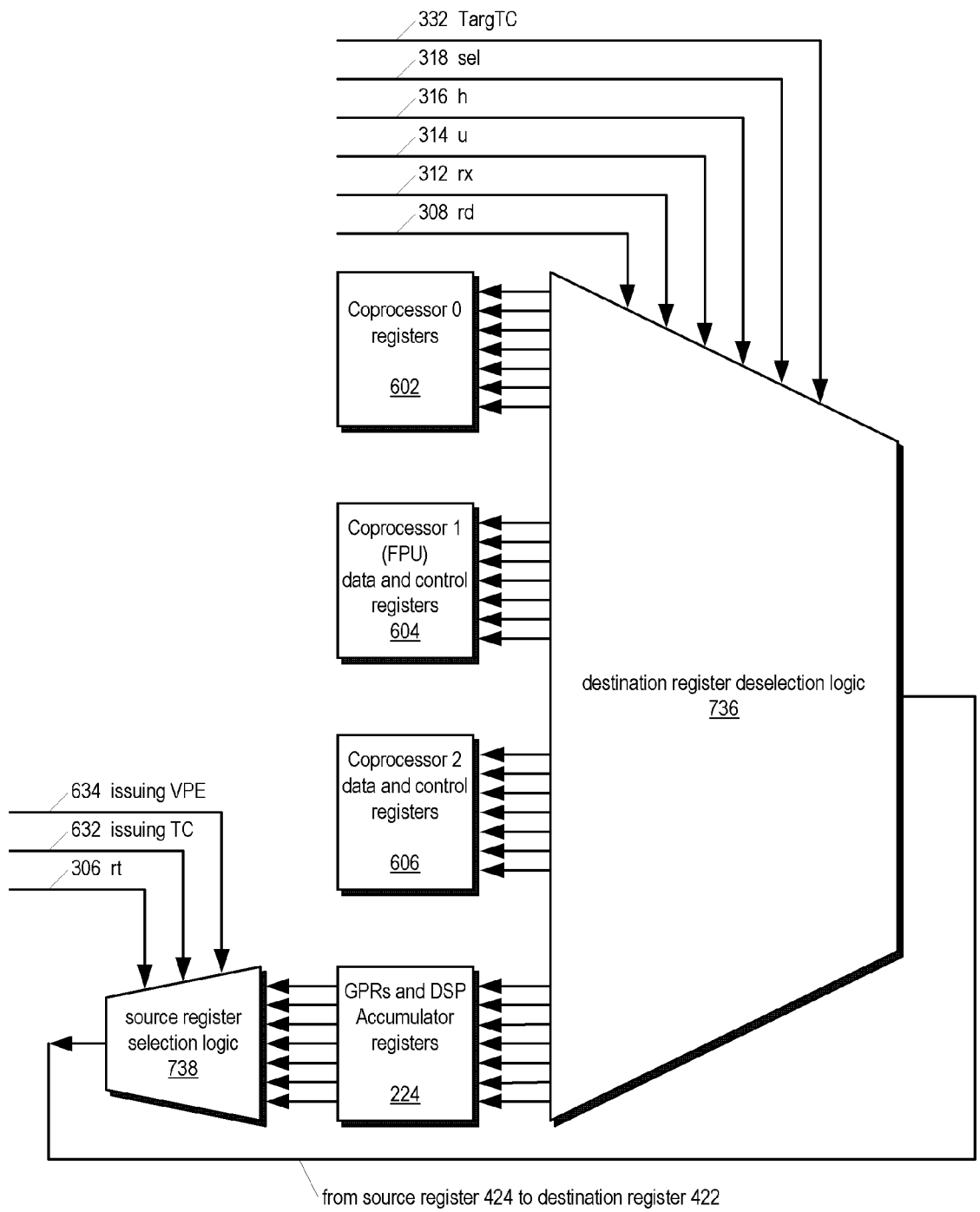
FIG. 7 is a block diagram illustrating data paths of the microprocessor for performing the MTTR instruction according to the present invention.

Referring now to FIG. 7, a block diagram illustrating data paths of the microprocessor 100 for performing the MTTR instruction 400 according to the present invention is shown. The microprocessor 100 includes selection logic 738 that receives the contents of each of the general purpose registers 224 of the issuing thread context 104 and selects the source register 424, which is one of the register contents from the issuing thread context 104, for provision to deselection logic 736 based on the value of the rt 306 operand of the MTTR instruction 400, as well as signals 632 and 634 indicating the issuing VPE 102 and issuing thread context 104, respectively. The deselection logic 736 receives the source register 424 contents selected by the selection logic 738 and writes the selected contents into the destination register 422, which is one of the registers of Coprocessor 0 602, Coprocessor 1 604, Coprocessor 2 606, or the general purpose and DSP accumulator registers 224 of FIG. 2, based on values of the rd 308 operand, the rx 312 operand, the u 314 operand, the h 316 operand, and the sel 318 operand of the MTTR instruction 400, as well as the TargTC 332 operand. In one embodiment, the selection and de-selection logic of FIGS. 6 and 7 may comprise a hierarchy of multiplexers, demultiplexers, data buses, and control logic for generating a plurality of bank and register selectors to control the multiplexers and demultiplexers for selecting the appropriate values from the specified register for provision on the data buses. In one embodiment, the data paths may also include intermediate registers for storing the values transferred between the issuing and target thread contexts over multiple clock cycles.

Referring now to FIG. 8, a flowchart illustrating operation of the microprocessor 100 to execute the MFTR instruction 300 according to the present invention is shown. Flow begins at block 802.

At block 802, the instruction issuer 208 of FIG. 2 issues an MFTR instruction 300 to the execution units 212. Flow proceeds to decision block 803.

At decision block 803, the execution unit 212 examines the TKSU bits 589 of the TCStatus Register 508 to determine whether the privilege level of the issuing thread context 104 is at kernel privilege level. If so, flow proceeds to decision block 804; otherwise, flow proceeds to block 805.

At block 805, the execution unit 212 raises an exception to the MFTR instruction 300 since the issuing thread context 104 does not have sufficient privilege level to execute the MFTR instruction 300. Flow ends at block 805.

At decision block 804, the execution unit 212 determines whether the target thread context 104 is halted by examining the value of the H bit 599 of the TCHalt Register 509 of FIG. 5K. If the target thread context 104 is halted, flow proceeds to decision block 808; otherwise flow proceeds to block 816.

At decision block 808, the execution unit 212 examines the TargTC 332 value of the issuing VPE 102 VPEControl Register 504 to determine whether the TargTC 332 value is valid. In one embodiment, the TargTC 332 value is not valid if the issuing VPE is not the master VPE 102, as indicated by a clear value in the MVP bit 553 of the VPEConf0 Register 505 of FIG. 5F. In one embodiment, the TargTC 332 value is not valid if the thread context 104 specified by TargTC 332 is not instantiated. If the TargTC 332 value is valid, flow proceeds to decision block 812; otherwise, flow proceeds to block 816.

At decision block 812, the execution unit 212 examines the TCU bits 581 in the TCStatus Register 508 of FIG. 5J to determine whether the MFTR instruction 300 references a coprocessor, and if so, whether the coprocessor is bound to and accessible by the target thread context 104 specified by the TargTC 332 value. If the MFTR instruction 300 references a coprocessor, and the coprocessor is not bound to and accessible by the target thread context 104 specified by the TargTC 332 value, flow proceeds to block 816; otherwise, flow proceeds to decision block 814.

At decision block 814, the execution unit 212 determines whether the source register 324 specified by the MFTR instruction 300 is instantiated. If so, flow proceeds to block 824; otherwise, flow proceeds to block 816.

At block 816, the results of the MFTR instruction 300 are invalid. That is, the microprocessor 100 attempts to perform block 824; however, the source, destination, and values of the data transfer are invalid. Flow ends at block 816.

At block 824, the execution unit 212 copies the contents of the source register 324 of the target thread context 104 to the destination register 322 of the issuing thread context 104. In one embodiment, the microprocessor 100, after reading the source register 324, updates the source register 324 with an update value. In one embodiment, the read/update is performed atomically. In one embodiment, the update value is provided in the GPR 224 specified by the rd field 308 in the MFTR instruction 300. Flow ends at block 824.

Figure 9:
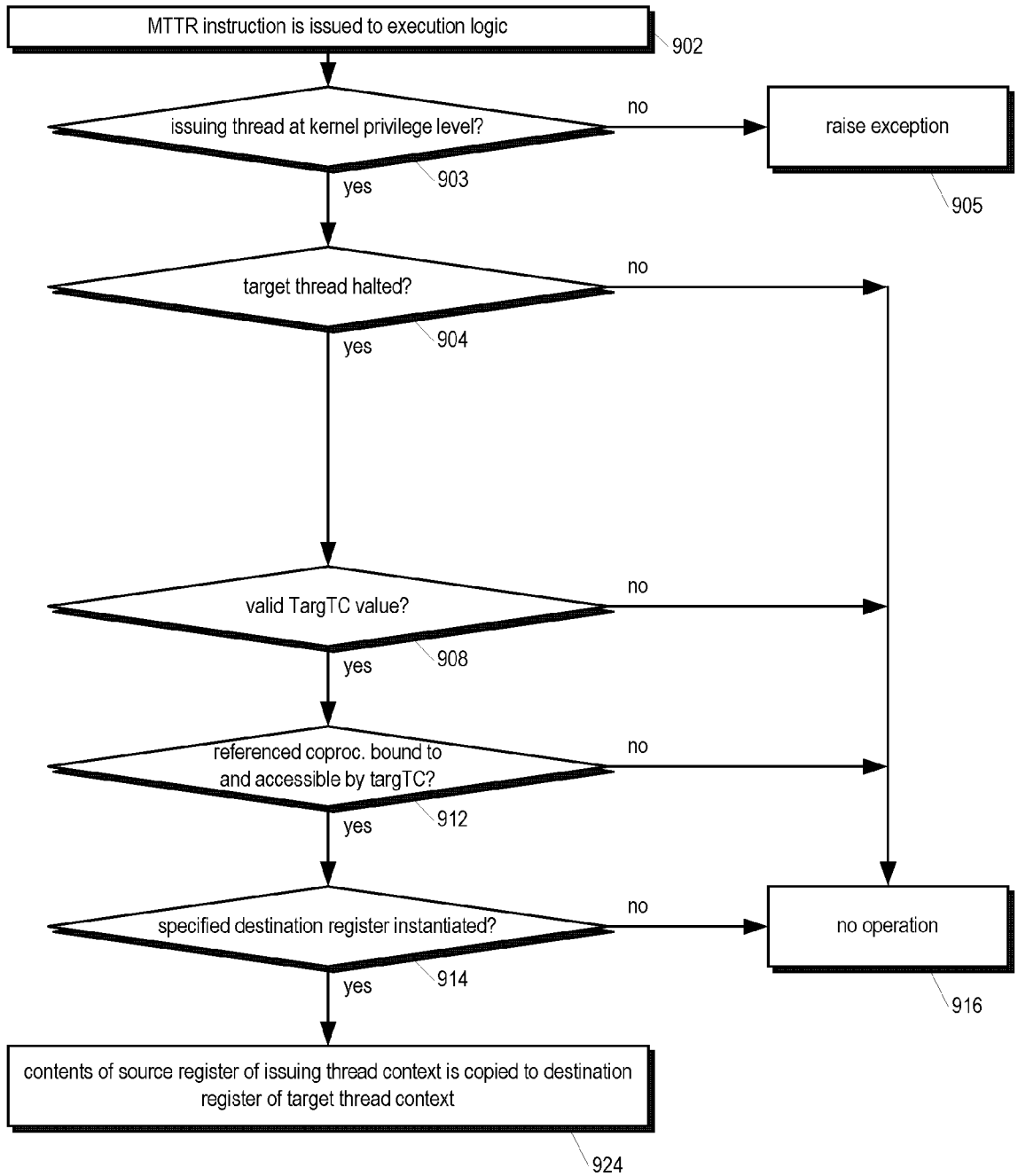
FIG. 9 is a flowchart illustrating operation of the microprocessor to execute the MTTR instruction according to the present invention.

Referring now to FIG. 9, a flowchart illustrating operation of the microprocessor 100 to execute the MTTR instruction 400 according to the present invention is shown. Flow begins a block 902.

At block 902, the instruction issuer 208 of FIG. 2 issues an MTTR instruction 400 to the execution units 212. Flow proceeds to decision block 903.

At decision block 903, the execution unit 212 examines the TKSU bits 589 of the TCStatus Register 508 to determine whether the privilege level of the issuing thread context 104 is at kernel privilege level. If so, flow proceeds to decision block 904; otherwise, flow proceeds to block 905.

At block 905, the execution unit 212 raises an exception to the MTTR instruction 400 since the issuing thread context 104 does not have sufficient privilege level to execute the MTTR instruction 400. Flow ends at block 905.

At decision block 904, the execution unit 212 determines whether the target thread context 104 is halted by examining the value of the H bit 599 of the TCHalt Register 509 of FIG. 5K. If the target thread context 104 is halted, flow proceeds to decision block 908; otherwise flow proceeds to block 916.

At decision block 908, the execution unit 212 examines the TargTC 332 value of the issuing VPE 102 VPEControl Register 504 to determine whether the TargTC 332 value is valid. In one embodiment, the TargTC 332 value is not valid if the issuing VPE is not the master VPE 102, as indicated by a clear value in the MVP bit 553 of the VPEConf0 Register 505 of FIG. 5F. In one embodiment, the TargTC 332 value is not valid if the thread context 104 specified by TargTC 332 is not instantiated. If the TargTC 332 value is valid, flow proceeds to decision block 912; otherwise, flow proceeds to block 916.

At decision block 912, the execution unit 212 examines the TCU bits 581 in the TCStatus Register 508 of FIG. 5J to determine whether the MTTR instruction 400 references a coprocessor, and if so, whether the coprocessor is bound to and accessible by the target thread context 104 specified by the TargTC 332 value. If the MTTR instruction 400 references a coprocessor, and the coprocessor is not bound to and accessible by the target thread context 104 specified by the TargTC 332 value, flow proceeds to block 916; otherwise, flow proceeds to decision block 914.

At decision block 914, the execution unit 212 determines whether the destination register 422 specified by the MTTR instruction 400 is instantiated. If so, flow proceeds to block 924; otherwise, flow proceeds to block 916.

At block 916, the microprocessor 100 performs no operation because there is no valid destination register to which the source data may be written. Flow ends at block 916.

At block 924, the execution unit 212 copies the contents of the source register 424 of the issuing thread context 104 to the destination register 422 of the target thread context 104. Flow ends at block 924.

Figure 10:
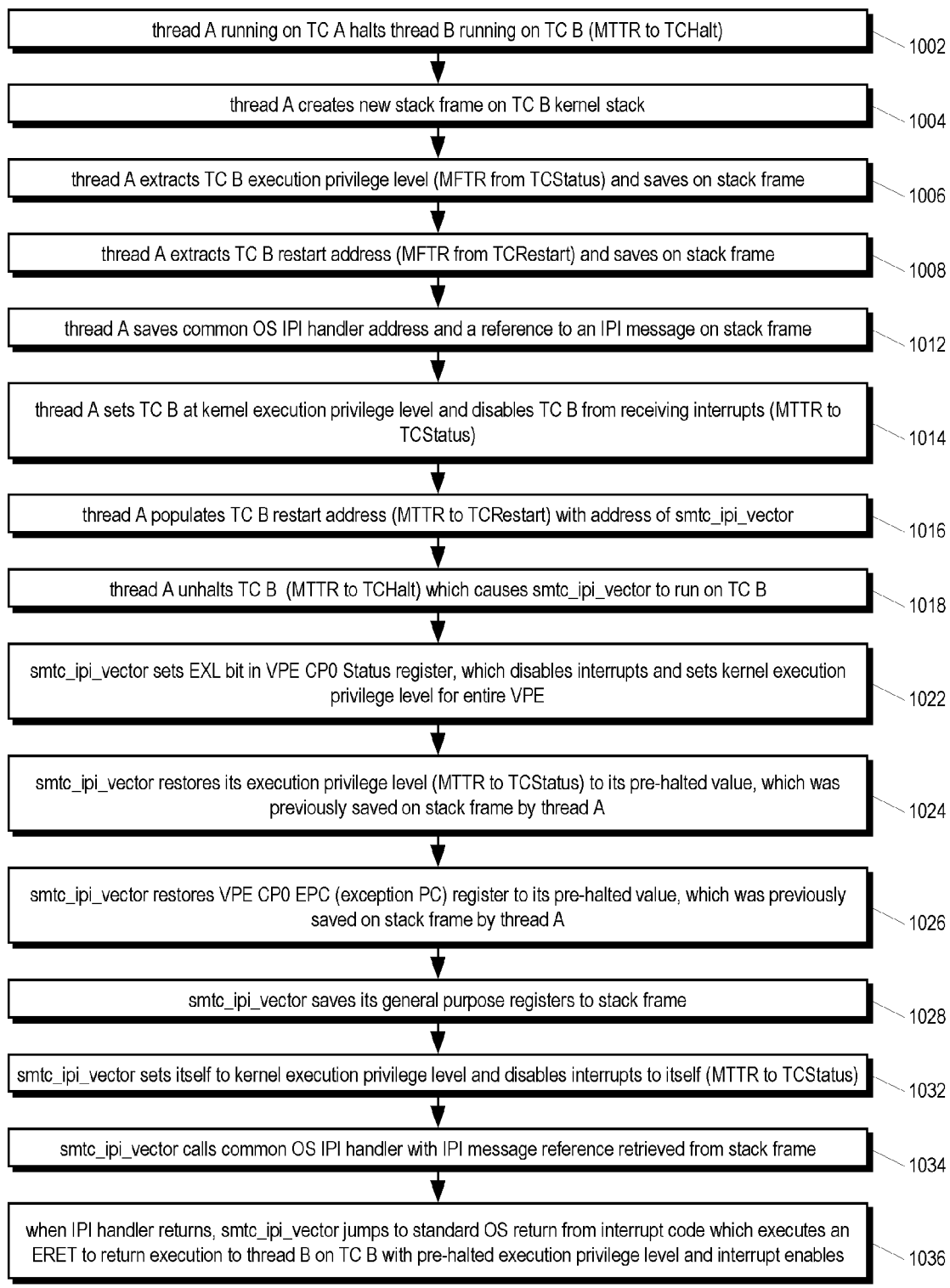
FIG. 10 is a flowchart illustrating a method for performing an inter-processor interrupt (IPI) from one thread context to another thread context within a VPE of the microprocessor of FIG. 1 according to the present invention.

Referring now to FIG. 10, a flowchart illustrating a method for performing an inter-processor interrupt (IPI) from one thread context 104 to another thread context 104 within a VPE 102 of the microprocessor 100 of FIG. 1 according to the present invention is shown. The steps of the flowchart substantially correlate to the source code listing included in the computer program listing appendix, and reference is made within the description of FIG. 10 to the source code listing. The source code listing is for a version of the Linux SMP operating system modified to view each thread context 104 of the microprocessor 100 as a separate processor, or CPU, which is referred to herein as symmetric multi-thread context (SMTC) Linux. The source code listing includes two C language functions (smtc_send_ipi and post_direct_ipi), one assembly language routine (smtc_ipi_vector), and one assembly language macro (CLI).

Within the flowchart, reference is made to a thread A running on a thread context A 104 and a thread B running on a thread context B 104. Thread A running on thread context A 104 directs a software-emulated inter-processor interrupt (IPI) to thread context B 104, by employing MFTR instructions 300 and MTTR instructions 400. In the example of the flowchart, thread context A 104 and thread context B 104 are bound to the same VPE 102. Although the flowchart of FIG. 10 illustrates only an intra-VPE IPI, the source code listing also includes instructions at lines 23-28 for directing a cross-VPE IPI, or inter-VPE IPI. A first thread context 104 is said to direct an inter-VPE IPI to a second thread context 104 if the second thread context 104 is bound to a different VPE 102 than the first thread context 104. The code performs an inter-VPE IPI by placing an IPI message on a queue associated with the target thread context 104. The message specifies the target thread context 104. In the embodiment described in the source code at lines 23-28, the message specified the target thread context 104 implicitly by being on the queue associated with the target thread context 104. The operating system samples the queue and drains it each time the operating system performs a context switch and returns from exception. After queuing the message, the code issues a MIPS PRA asynchronous software interrupt to the target VPE 102 (i.e., to the VPE 102 to which the target thread context 104 is bound) by executing an MTTR instruction 400 (within the write_vpe_c0_cause routine) to set one of the software interrupt bits in the MIPS PRA Cause Register 536 of FIG. 5P of the target VPE 102, which will cause the queue to be sampled and drained. If the thread context 104 selected by the target VPE 102 to service the software interrupt is the target of the IPI, then the selected thread context 104 will service the IPI directly; otherwise, the selected thread context 104 will direct an intra-VPE IPI to the target thread context 104 in a manner similar to the operation described in the flowchart of FIG. 10.

As described above, when an asynchronous hardware interrupt (such as a periodic timer interrupt used for operating system task scheduling purposes) is requested in a MIPS MT ASE processor, the VPE 102 that received the hardware interrupt request selects an eligible thread context (in this example, thread context A 104) to handle the exception. In the MIPS architecture, when a hardware interrupt request is made, control is transferred to a general exception vector of the operating system. The general exception vector decodes the cause of the exception and invokes the appropriate interrupt request handler (in this example, thread A), such as the timer handler.

The Linux SMP kernel for the MIPS architecture assumes that every processor, or CPU, in the SMP system will get a periodic interrupt, and divides the work performed by the timer interrupt handler into a local clock interrupt function that executes on all CPUs, and a system clock interrupt function that executes only on one CPU of the SMP system. In the MIPS processor architecture, each VPE 102 includes one timer in Coprocessor 0 shared by all thread contexts 104 bound to the VPE 102 (see the Count/Compare register pairs described in MIPS32® Architecture for Programmers Volume III: The MIPS32® Privileged Resource Architecture, Document Number: MD00090, Revision 2.50, Jul. 1, 2005). In one embodiment of SMTC Linux, only one of the timers of one of the VPEs 102 is invoked as the single timer for all CPUs of the SMP system. In another embodiment, the timer of each of the VPEs 102 is invoked for all CPUs of that VPE 102. The thread context 104 selected to service the asynchronous timer interrupt executes the system clock interrupt function and then broadcasts, or directs, an IPI to all the other thread contexts 104 of the VPE 102. The directed IPI is a local clock interrupt type IPI which instructs the receiving thread contexts 104 to execute only the local clock interrupt function. Although the SMTC Linux timer interrupt handler directs an IPI message to each thread context 104 known to the operating system as a processor, the flowchart of FIG. 10 only illustrates directing an IPI to one thread context 104, which is thread context B 104 in this example. The operation of the microprocessor 100 in response to a timer interrupt to perform preemptive task scheduling is described in more detail in FIG. 11. Flow begins at block 1002.

At block 1002, at source code line 38, thread A running on thread context A 104 halts thread B running on thread context B 104 by executing an MTTR instruction 400 instruction to clear the H bit 599 of the TCHalt Register 509 of FIG. 5K. It is noted that the C language function write_tc_c0_tchalt includes the MTTR instruction 400. The function settc at line 36 populates the TargTC field 332 of the VPEControl Register 504 of FIG. 5E with the thread context 104 identifier of the specified thread context 104 (in the example, thread context B 104) for the benefit of the MTTR instruction 400 of the write_tc_c0_tchalt function. Flow proceeds to block 1004.

At block 1004, at lines 95-100 (via the call the post_direct_ipi at line 64), thread A creates a new stack frame on the kernel stack of thread context B 104. In one embodiment, the new stack frame is effectively created by the assignment of a value to the kernel stack pointer of thread context B 104, and storing values on the new stack frame comprises storing values at predetermined offsets from the kernel stack pointer value. It is also noted that if the target thread context 104 is exempted from taking interrupts (as indicated by a set IXMT bit 518 of FIG. 5J), the code cannot spin waiting for the target thread context 104 to become non-exempted from taking interrupts because this may lead to a deadlock condition. Therefore, the code places the IPI message on the target thread context's 104 queue at lines 48-62, in a manner similar to the inter-VPE IPI issued at line 24; however, in this case no inter-VPE 102 software interrupt is necessary. Flow proceeds to block 1006.

At block 1006, at line 82, thread A reads the TCStatus Register 508 of thread context B 104 via the function read_tc_c0_tcstatus, which includes an MFTR instruction 300. The TCStatus Register 508 includes the thread context B 104 execution privilege level and interrupt exemption status, among other things. Thread A, at line 104, also saves the TCStatus Register 508 value to the stack frame created at block 1004. Flow proceeds to block 1008.

At block 1008, at line 83, thread A reads the restart address 549 of thread B from TCRestart register 594 of thread context B 104 via the function read_tc_c0_tcrestart, which includes an MFTR instruction 300. Thread A, at line 102, also saves the restart address 549 to the stack frame created at block 1004. Flow proceeds to block 1012.

At block 1012, at lines 106 and 108, thread A saves the address of the operating system IPI handler and a reference to an IPI message on the stack frame created at block 1004. In the embodiment of the source code listing, advantageously, the code manipulates the target thread context B 104 and stack frame such that a common IPI handler may be invoked to support SMTC operation. The common IPI handler is invoked to handle both software emulated interrupts described herein and actual hardware interrupts, i.e., interrupts for which target thread context 104 B is the thread context 104 selected by the VPE 102 to handle the hardware interrupt request, such as may be invoked at block 1114 of FIG. 11. Flow proceeds to block 1014.

At block 1014, at lines 110-112, thread A writes the TCStatus Register 508 of thread context B 104 via the function function write_tc_c0_tcstatus, which includes an MTTR instruction 400, to set the execution privilege level of thread context B 104 to kernel mode and disables, or exempts, thread context B 104 from receiving interrupts. Conceptually, thread A would set the EXL bit 576 in Coprocessor 0 Status Register 571 in order to emulate an exception. However, when EXL 576 is set, multithreading is disables on the VPE 102, i.e., only one thread context 104 is allowed to run when EXL 576 is set. And thread A needs thread context B 104 to run when un-halted below at block 1018. Therefore, the setting of EXL 576 must be left up to thread context B 104 by smtc_ipi_vector at block 1022 below. Thus, until then, thread A temporarily accomplishes a similar effect to setting EXL 576 by setting IXMT 518 and TKSU 589 to kernel mode in the thread context B 104 TCStatus Register 508. Flow proceeds to block 1016.

At block 1016, at line 115, thread A writes the restart address 549 of thread B in the TCRestart register 594 of thread context B 104 via the function the function write_tc_c0_tcrestart, which includes an MTTR instruction 400, with the address of smtc_ipi_vector. Flow proceeds to block 1018.

At block 1018, at line 65, thread A un-halts, or restarts, thread context B 104 to cause smtc_ipi_vector to begin running on thread context B 104. Flow proceeds to block 1022.

At block 1022, at lines 163-165, the smtc_ipi_vector sets EXL 576, which has the effect of disabling interrupts and setting the execution privilege level to kernel mode for all thread contexts 104 bound to the VPE 102. It is noted that at line 160 the smtc_ipi_vector disables multithreading on the VPE 102 before setting EXL 576. Additionally, if multithreading was enabled prior to line 160, the code restores multithreading at lines 168-170. It is also noted that if thread context B 104 was in user mode when halted at block 1002, the smtc_ipi_vector sets the CUO bit 572 of the Status Register 571. Flow proceeds to block 1024.

At block 1024, at lines 196 and 198, the smtc_ipi_vector restores the thread context B 104 pre-halted TCStatus Register 508 value that was saved at block 1006, and in particular restores its execution privilege level and interrupt exemption state. Flow proceeds to block 1026.

At block 1026, at lines 200-201, the smtc_ipi_vector loads the EPC Register 598 with the thread context B 104 pre-halted TCRestart register 594 value saved at block 1008. Consequently, when the standard Linux SMP return from interrupt code subsequently executes an ERET instruction at block 1036, thread B will be restarted on thread context B 104 at the address at which it was halted at block 1002. Thus, by setting EXL 576 at block 1022 and populating the EPC Register 598 at block 1026, the smtc_ipi_vector effectively emulates what the microprocessor 100 hardware would do if thread context B 104 had been selected to service the asynchronous interrupt (rather than thread context A 104). Flow proceeds to block 1028.

At block 1028, at line 203, the smtc_ipi_vector saves all of the general purpose registers 224 to the stack frame created at block 1004. Flow proceeds to block 1032.

At block 1032, at line 204 via the CLI macro, the smtc_ipi_vector sets itself to kernel mode execution privilege level and exempts itself from servicing interrupts. It is noted that this is performed only for thread context B 104, not for the entire VPE 102. It is noted that the CLI macro is a standard Linux macro which is modified to support SMTC by setting kernel mode execution privilege level and exempting from interrupt servicing (via the IXMT bit 518) only the invoking thread context 104, rather than the entire VPE 102 (as the non-SMTC code does by clearing the IE bit 577 of the Status Register 571 of FIG. 5M), as shown at lines 227-247. Flow proceeds to block 1034.

At block 1034, at lines 205-210, the smtc_ipi_vector calls the common IPI handler (which is ipi_decode, as populated at line 108) with the IPI message reference saved on the stack frame at block 1012 as an argument. Flow proceeds to block 1036.

At block 1036, at line 212, after the operating system IPI handler returns, the smtc_ipi_vector jumps to the standard operating system return from interrupt code (which in Linux SMP is ret_from_irq), which eventually executes an ERET instruction to return execution on thread context B 104 to thread B with its pre-halted execution privilege level and interrupt exemption state. Prior to executing the ERET instruction, the return from interrupt code restores the EPC Register 598 with the restart address value saved at block 1008 and restores the Status Register 571 KSU bits 574 with the value saved at block 1006. Flow ends at block 1036.

Figure 11:
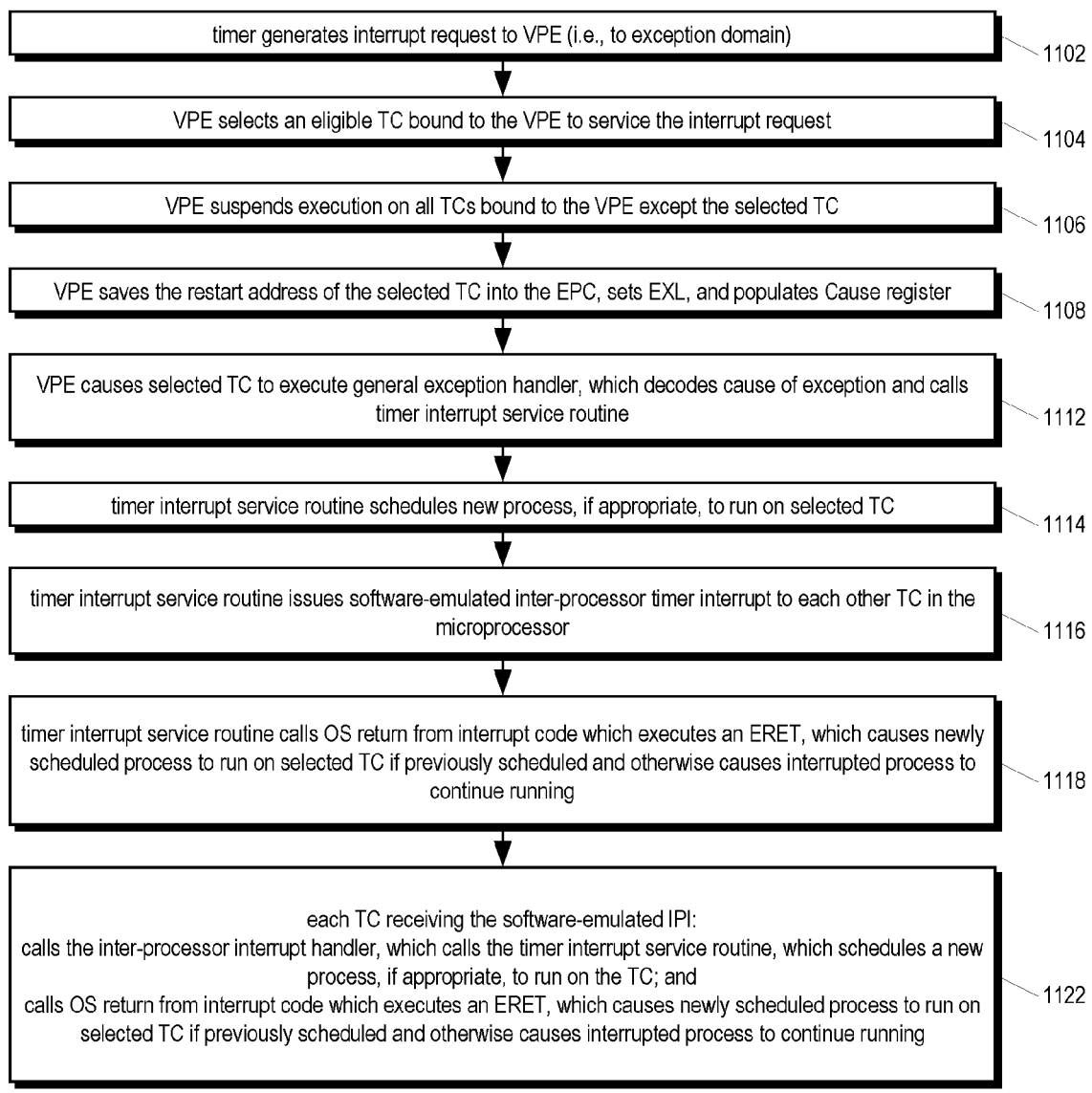
FIG. 11 is a flowchart illustrating a method for performing preemptive process scheduling by a symmetric multiprocessor operating system on the microprocessor of FIG. 1 according to the present invention.

Referring now to FIG. 11, a flowchart illustrating a method for performing preemptive process scheduling by a symmetric multiprocessor operating system (SMP OS), such as Linux SMP, on the microprocessor 100 of FIG. 1 according to the present invention is shown. Symmetric multiprocessor operating systems manage a plurality of processes, or tasks, and assign the execution of the processes to particular processors, or CPUs, of the symmetric multiprocessor system, which are thread contexts 104 in the case of microprocessor 100. Within the set of processes assigned to execute on a given CPU, or thread context 104, the preemptive SMP OS schedules the set of processes to run on the assigned thread context 104 in some time-multiplexed fashion according to the scheduling algorithm of the SMP OS. Flow begins at block 1102.

At block 1102, a timer generates an interrupt request to a VPE 102, which are the exception domains of the microprocessor 100. In one embodiment, the timer interrupt request is an asynchronous hardware interrupt generated by the MIPS PRA Count/Compare register pairs of one of the VPEs 102 of microprocessor 100, and the Count/Compare register pairs of the other VPEs 102 are all disabled. Flow proceeds to block 1104.

At block 1104, the interrupted VPE 102 selects an eligible thread context 104 bound to itself to service the timer interrupt request. As described above, in the MIPS MT ASE, a thread context 104 is eligible if its IXMT bit 518 is clear and the curVPE field 558 of the TCBind Register 556 of FIG. 5K specifies to which VPE 102 the thread context 104 is bound. In one embodiment, the method for choosing the eligible thread context 104 to service an asynchronous exception is implementation-dependent and may be adapted to satisfy the particular application in which the microprocessor 100 is employed. For example, the VPE 102 may select an eligible thread context 104 in a random fashion. For another example, the VPE 102 may select an eligible thread context 104 in a round-robin order. For another example, the VPE 102 may select a thread context 104 based on the relative priorities of the thread contexts 104, such as selecting the thread context 104 having the lowest relative instruction issue priority, or a lowest relative priority for servicing exceptions. Flow proceeds to block 1106.

At block 1106, the VPE 102 suspends execution of the threads executing on all thread contexts 104 bound to the VPE 102 except for the thread context 104 selected at block 1104. In particular, the VPE 102 ceases to issue instructions to the execution pipeline of the threads. Flow proceeds to block 1108.

At block 1108, the VPE 102 saves the restart address of the selected thread context 104 into the EPC Register 598, sets the EXL bit 576 of the Status Register 571, and populates the MIPS PRA Cause register 536, all of the VPE's 102 Coprocessor 0 VPE context 106. Flow proceeds to block 1112.

At block 1112, the VPE 102 causes the selected thread context 104 to execute a general exception handler at the general exception vector according to the MIPS PRA. The general exception handler decodes the cause of the exception via the MIPS PRA Cause register 536 and Status Register 571 and determines the exception was an asynchronous hardware interrupt generated by the timer. Consequently, the general exception handler calls the timer interrupt service routine, which among other functions, schedules processes according to the preemptive multitasking algorithm of the operating system. In one embodiment, the timer interrupt routine may call a separate routine dedicated to scheduling processes. Flow proceeds to block 1114.

At block 1114, the timer interrupt service routine determines whether a new process, or task, should be scheduled on the selected thread context 104 according to the SMP OS multitasking scheduling algorithm. If so, the timer interrupt service routine schedules a new process to run on the selected thread context 104; otherwise, the timer interrupt service routine leaves the current process to run on the selected thread context 104. It is noted that a thread and a process herein are not necessarily synonymous. A process is an entity managed by the SMP operating system, and typically comprises entire programs, such as application programs or portions of the operating system itself; whereas a thread is simply a stream of instructions, which of course may be a stream of instructions of an operating system process, or task. Flow proceeds to block 1116.

At block 1116, the timer interrupt service routine issues a software-emulated inter-processor interrupt to each other thread context 104 in the microprocessor 100, according to FIG. 10 and/or the source code listing. In particular, if the target thread context 104 is bound to the same VPE 102 as the selected thread context 104 and the target thread context 104 is not exempted from servicing exceptions (as determined by the IXMT bit 518), then the timer interrupt service routine performs a software-emulated inter-processor interrupt to the target thread context 104 according to FIG. 10; if the target thread context 104 is bound to the same VPE 102 as the selected thread context 104 but the target thread context 104 is exempted from servicing exceptions, then the timer interrupt service routine places the timer interrupt service IPI message on the target thread context's 104 queue at lines 48-62 of the source code; and if the target thread context 104 is bound to a different VPE 102 as the selected thread context 104, then the timer interrupt service routine will place an IPI message on a queue associated with the target thread context 104 and issue a MIPS PRA asynchronous software interrupt to the target VPE 102, i.e., to the VPE 102 to which the target thread context 104 is bound, according to lines 23-28 of the source code, which will cause the queue to be sampled and drained.

At block 1118, the timer interrupt service routine calls the operating system return from interrupt code, which executes an ERET instruction. If a new process was scheduled to run at block 114, then the ERET causes the newly scheduled process to run; otherwise, the ERET causes the process that was interrupted by the timer interrupt request to continue running. Flow proceeds to block 1122.

At block 1122, each thread context 104 that was the target of a software-emulated inter-processor interrupt performed at block 1116 eventually calls the inter-processor interrupt service routine, according to block 1034 of FIG. 10, after performing the other steps of FIG. 10. On each thread context 104, the inter-processor interrupt service routine calls the timer interrupt service routine, which schedules a new process to run on the thread context 104, if appropriate, similar to the manner described above with respect to block 1114. When the inter-processor interrupt handler completes, the operating system return from interrupt code is called, which executes an ERET instruction, according to block 1036 of FIG. 10. If the timer interrupt service routine scheduled a new process to run on the thread context 104, then the newly scheduled process will run on the thread context 104 when the return from interrupt code executes the ERET at block 1036 of FIG. 10, rather than thread B. i.e., rather than the thread that was halted by the software-emulated directed inter-processor interrupt. If so, thread B will eventually be scheduled to run again so that it may complete. If the timer interrupt service routine did not schedule a new process to run on the thread context 104, then thread B will continue running when the ERET is executed. Flow ends at block 1122.

As may be observed from FIG. 11, the software emulation of directed exceptions described according to FIG. 10 enables the SMP OS to treat each thread context as an operating system level CPU, in particular with regard to preemptive process scheduling.

Figure 12:
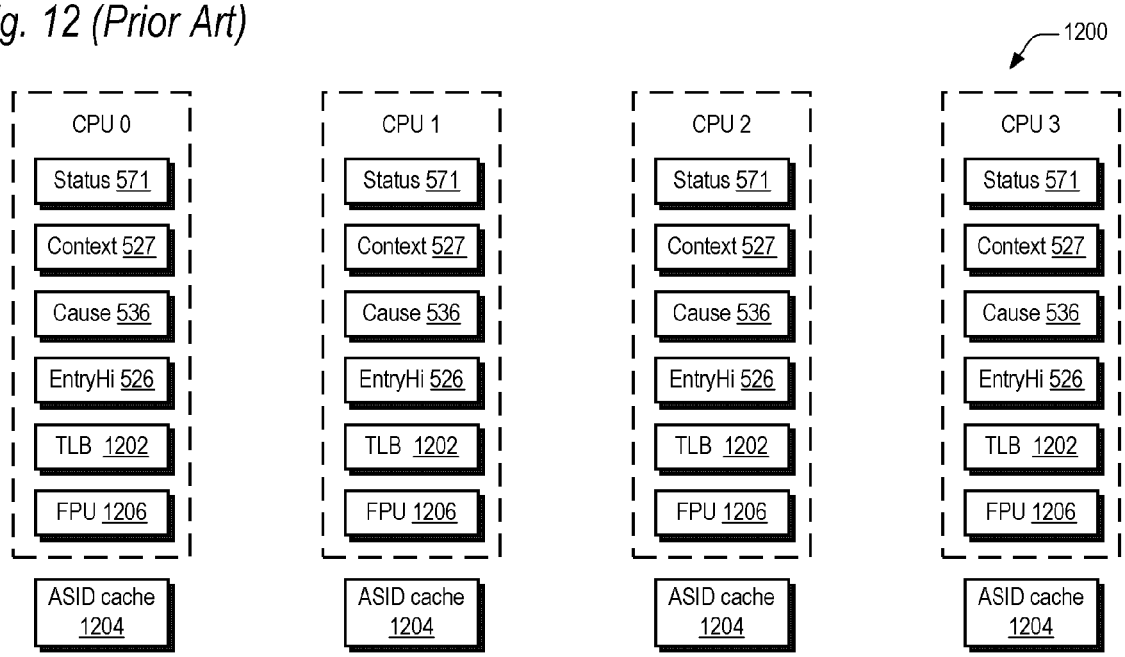
FIG. 12 is a block diagram illustrating a prior art multiprocessor system.

Referring now to FIG. 12, a block diagram illustrating a prior art multiprocessor system 1200 is shown. The multiprocessor system 1200 comprises a plurality of CPUs, denoted CPU 0 through CPU 3. Each of the CPUs is a conventional MIPS Architecture processor, i.e., without the benefit of the MIPS MT ASE. Each of the CPUs includes a MIPS PRA Coprocessor 0 Status register 571, Context Register 527, Cause Register 536, and EntryHi Register 526, substantially similar to those shown in FIGS. 5M, 5N, 5P, and 5N, respectively, and as described in the MIPS32® Architecture for Programmers Volume III: The MIPS32® Privileged Resource Architecture, Document Number: MD00090, Revision 2.50, Jul. 1, 2005. In addition, each of the CPUs comprises its own translation lookaside buffer (TLB) 1202 and floating point unit (FPU) 1206. The FPU 1206, commonly referred to as Coprocessor 1 in the MIPS PRA, is a processing unit specifically designed for expeditiously executing floating point instructions in hardware rather than emulating execution of the floating point instruction in software. The TLB 1202 is a relatively small cache memory used to cache recently used virtual to physical address translations. The TLB 1302 is part of a memory management unit (MMU) of each CPU that enables the CPU to provide virtual memory functionality to programs executing thereon. The MIPS32® Architecture for Programmers Volume III: The MIPS32® Privileged Resource Architecture, Document Number: MD00090, Revision 2.50, Jul. 1, 2005 describes in more detail the organization and operation of the TLB 1202 and MMU. As described in the MIPS PRA document, the TLB 1202 and Coprocessor 0 Registers (including the interrupt control registers) are privileged resources, as are the shared TLB 1302 and shared Coprocessor 0 Registers of each VPE 102 (including the interrupt control registers) of FIG. 13. In one aspect, the MIPS ISA includes privileged instructions (e.g., tlbr, tlbwr, tlbwi, tlbp, mfc0, mtc0) for accessing the TLB 1202/1302 and Coprocessor 0 Registers (including the interrupt control registers) that may not be executed by user privilege level threads, but may only be accessed by threads with kernel privilege level; otherwise, an exception is generated. Finally, as shown in FIG. 12, the operating system, such as SMP Linux, maintains an ASID cache 1204 for each CPU.

An ASID is an address space identifier, which identifies a unique memory map. A memory map comprises a mapping, or association, or binding, between a virtual address space and a set of physical page addresses. Most commonly, the operating system creates a memory map when it creates a new process, or task. Each process created by the operating system has a memory map. Additionally, the operating system has its own memory map. Multiple processes may share a memory map. Consequently, two CPUs using a shared memory map will result in the same virtual address accessing the same physical memory, or generating identical page fault exceptions. An example in a UNIX-like operating system of two processes sharing a memory map is when a process makes a fork( ) system call (not to be confused with the MIPS MT ASE FORK instruction). In this case, a new process is created which shares the same memory map as its parent process until such time as one of the processes performs a store to memory which would change the contents of the memory. Additionally, and perhaps more commonly, a multithreaded process may have multiple threads running in the same address space using the same memory map. Still further, multiple processes may specifically designate particular memory pages that they share.

In some embodiments, a memory map comprises a simple contiguous array of page table entries, with each entry specifying a virtual to physical page address translation and other relevant page attribute information. However, because a linear page table may require a significant amount of contiguous memory per process (such as in an embedded application with relatively small pages such as 4 KB pages with a relatively large address space), other memory map schemes may be employed. For example, a multi-level page/segment table structure may be employed in which a memory map is described by a segment table which in turn points to a set of page table entries, some of which (in particular, those which correspond to unpopulated parts of the address space) may be common to multiple memory maps.

The ASID cache 1204 is a kernel variable maintained in the system memory for each of the CPUs. The operating system uses the ASID cache 1204 to assign a new ASID to a newly created memory map, or to assign a new ASID for the respective CPU to an existing memory map that was previously used on another CPU. The operating system initializes each ASID cache 1204 value to zero. Each time the instance of the operating system executing on a respective CPU assigns a new ASID value from the ASID cache 1204, the operating system monotonically increments the ASID cache 1204 value of the respective CPU. This process continues until the ASID cache 1204 value wraps back to zero and the cycle continues.

Generally speaking, the TLB 1202 is a small cache memory in which each entry includes a tag portion and a data portion. The tag portion includes a virtual page address, or virtual page number (VPN), portion that is concatenated with an ASID portion. When the CPU generates a virtual memory address to make a memory access, such as when a load or store instruction is executed, the virtual memory address is concatenated with the ASID of the process making the memory access, and the result is compared with the TLB 1202 tags to see if a match occurs. The ASID of the process making the memory access is supplied by the ASID field 538 of the EntryHi Register 526 of FIG. 5N of the CPU executing the process. Each time the conventional operating system schedules a process to run on a CPU, i.e., swaps the process in to the CPU, the operating system loads the ASID identifying the memory map of the thread into the EntryHi Register 526 so that the ASID of the process making the memory access is supplied by the ASID field 538 of the EntryHi Register 526. If a match does not occur (a TLB miss), the CPU generates a TLB miss exception, and the operating system responsively fetches the missing page address translation information from the appropriate memory map, allocates an entry in the TLB 1202, and fills the entry with the fetched page address translation information. If a match does occur, the TLB 1202 outputs the data portion of the matching entry, which includes a physical page address, or physical frame number (PFN), and attributes of the memory page. Advantageously, because the TLB 1202 tag includes the ASID, the TLB 1202 can simultaneously cache address translations for multiple memory maps. It is noted that because each CPU in the conventional system 1200 has its own ASID cache 1204, the ASID name spaces of each of the CPUs overlap. However, this overlap of the ASID name space in the conventional system 1200 functions properly since each CPU in the system 1200 has its own TLB 1202. However, as discussed below, the present invention modifies the operating system to employ a common ASID cache 1304 of FIG. 13 since the CPUs (thread contexts 104) share a common TLB 1302 in the system 100 of the present invention.

In the prior art system 1200 of FIG. 12, each CPU comprises the entire architectural state of a MIPS Architecture processor, and in particular, includes all the state expected by a conventional SMP operating system, such as SMP Linux for MIPS, to be a MIPS CPU. In other words, the operating system views the system 1200 of FIG. 12 as having a number of CPUs equal to the number of actual full architectural state CPUs, which in FIG. 12 is four. In contrast, the operating system views the system 100 of FIG. 13 of the present invention as having a number of CPUs equal to the number of thread contexts 104, which in FIG. 13 is M+1, each of which is a lightweight, highly scalable set of state that comprises far less than the full architectural state of a MIPS Architecture processor.

Figure 13:
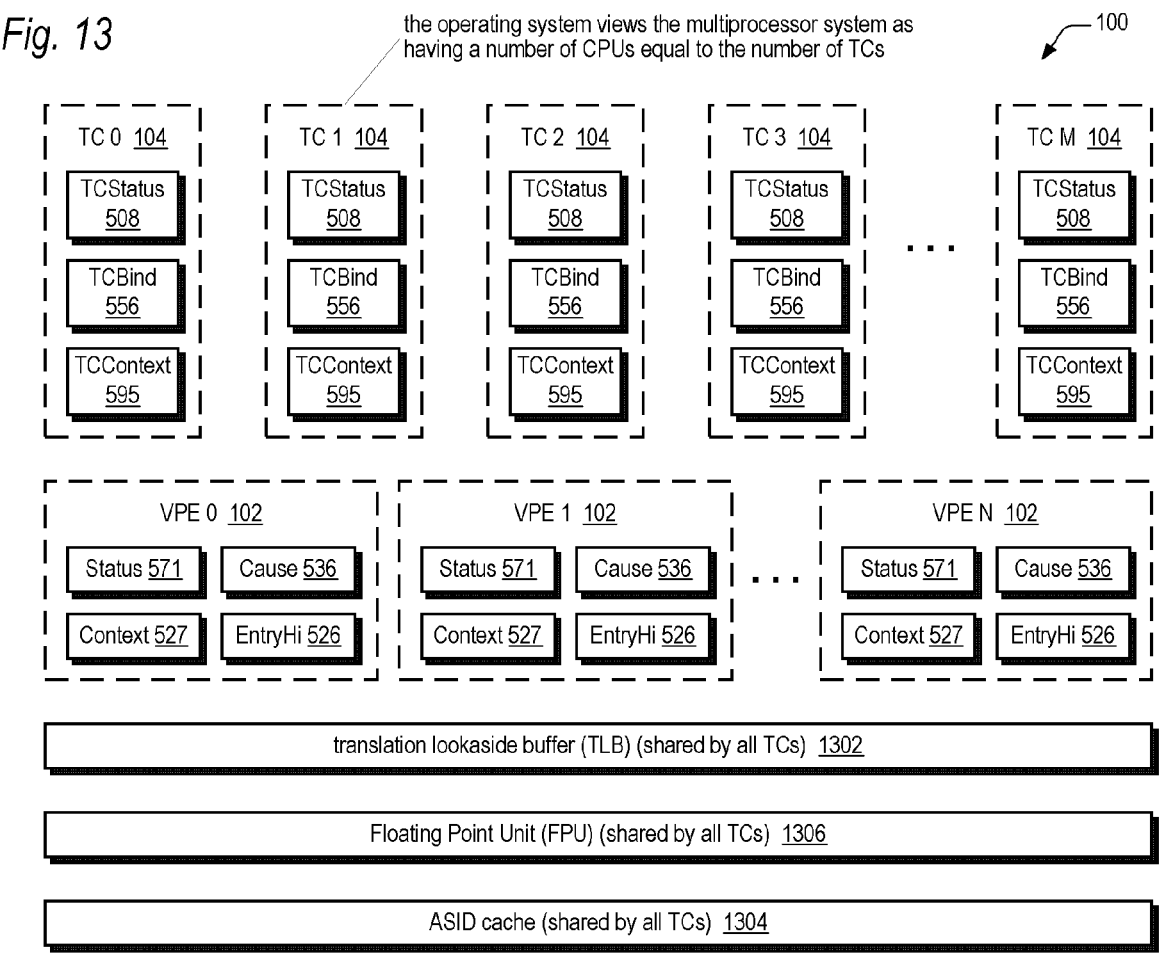
FIG. 13 is a block diagram illustrating a multiprocessor system according to the present invention.

Referring now to FIG. 13, a block diagram illustrating a multiprocessor system 100 according to the present invention is shown. The multiprocessor system 100 of FIG. 13 is similar to the multiprocessor system 100 of FIG. 1; however, the operating system running on the system 100 of FIG. 13 views each thread context 104 as a separate CPU, or processor. This is in contrast to the conventional system 1200 of FIG. 12, and is also in contrast to a MIPS MT ASE processor-based system in which the operating system is configured to view each VPE 102 as a CPU.

The system 100 of FIG. 13 includes a plurality of thread contexts 104, denoted TC 0 104 through TC M 104. The system 100 includes a plurality of VPEs 102 denoted VPE 0 102 through VPE N 102. Each TC 104 includes a TCStatus register 508 of FIG. 5J, a TCBind register 556 of FIG. 5K, and a TCContext register 595 of FIG. 5L. Each VPE 102 includes a Status Register 571 of FIG. 5M, a Context register 527 of FIG. 5N, a Cause Register 536 of FIG. 5P, and an EntryHi Register 526 of FIG. 5N. The thread contexts 104 and VPEs 102 of the system 100 comprise more state than shown in FIG. 13, an in particular, include all the state as described above with respect to FIGS. 1 through 11; however, the state shown in FIG. 13 is included for its relevance to the remaining Figures.

The system 100 of FIG. 13 also includes a TLB 1302, ASID cache 1304, and FPU 1306 that are shared by all of the thread contexts 104 in the system 100. Additionally, as described in detail above, multiple thread contexts 104 bound to a VPE 102 share interrupt control logic with the VPE's 102 exception domain. Consequently, conventional MP operating systems, such as Linux SMP, must be modified according to the present invention to accommodate the sharing of the TLB 1302, ASID cache 1304, interrupt control logic, and FPU 1306 by the multiple thread contexts 104, as described herein. Embodiments are contemplated in which multiple FPU contexts 1306 are shared among the CPUs/TCs 104. One embodiment of the shared TLB 1302 is described in co-pending U.S. patent application Ser. No. 11/075,041 (MIPS.0203-00-US), having a common assignee, which is hereby incorporated by reference in its entirety. SMTC Linux sets the STLB bit 511 of the MVPControl Register 501 of FIG. 5B to enable all of the VPEs 102 to share the TLB 1302. Other embodiments are contemplated in which a TLB 1302 is present for each VPE 102 and the TLB 1302 is shared by all of the thread contexts 104 bound to the VPE 102. In contrast to the system 1200 of FIG. 12, when a processor or thread performs a memory access, the ASID of the thread making the memory access is supplied by the TASID field 528 of the TCStatus Register 508 of the thread context 104 executing the thread, rather than by the ASID field 538 of the EntryHi Register 526, since the EntryHi Register 526 of FIG. 5N is only instantiated on a per-VPE 102 basis, not a per-TC 104 basis. Each time the SMTC-aware operating system schedules a thread to run on a CPU/TC 104, i.e., swaps the process in to the CPU/TC 104, the operating system loads the ASID identifying the memory map of the thread into the TASID field 528 of the TCStatus Register 508 of the thread context 104 so that the ASID of the process making the memory access is supplied by the TASID field 528. In one embodiment, the operating system writes the ASID into the ASID field 538 of the EntryHi Register 526, which propagates through to the TASID field 528.

Figure 14:
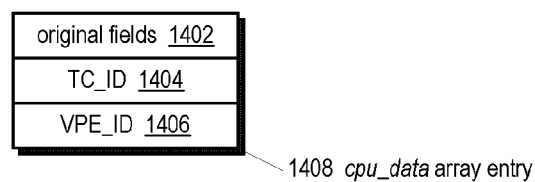
FIG. 14 is a block diagram of a cpu_data array entry in an SMTC Linux operating system according to the present invention.

Each of the CPUs in the system 1200 of FIG. 12 executes an instance of the Linux kernel and has a distinct value being returned from the smp_processor_id( ) function that can be used to access facilities that are instantiated for each CPU, such as local run queues and inter-processor interrupts. Similarly, each thread context 104 in the system 100 of FIG. 13 executes an instance of the SMTC Linux kernel and has a distinct value being returned from the smp_processor_id( ) function that can be used to access facilities that are instantiated for each CPU, such as local run queues and inter-processor interrupts. That is, each thread context 104 comprises a set of hardware storage elements that store sufficient state to execute a Linux thread, either a thread of the operating system or a user thread. In addition, the system 1200 of FIG. 12 includes one of the CPUs which is designated the first, or primary, Linux CPU that is used during the SMP Linux for MIPS boot sequence to perform low-level, system wide initialization, and contrive for all other CPUs to begin executing their instances of the Linux kernel at the SMP start_secondary( ) entry point. Similarly, the system 100 of FIG. 13 includes one of the thread contexts 104, namely the thread context 104 which has a value of zero in the CurTC field 557 of the TCBind Register 556 of FIG. 5K, which is designated the primary Linux CPU, is used during the SMTC Linux boot sequence to perform low-level, system wide initialization, and contrive for all other CPUs/TCs 104 to begin executing their instances of the Linux kernel at the SMP start_secondary( ) entry point. In particular, each CPU/TC 104 executes an instance of the SMP Linux process scheduler which schedules the processes, or threads, to execute on the CPU/TC 104. That is, each instance of the process scheduler determines the particular thread that will be allowed to employ the thread context 104 resources (e.g., program counter 222, general purpose registers 224, integer multiplier, etc) to execute the thread during a particular time slice. In one embodiment, the Linux process scheduler running on each CPU/TC 104 maintains its own run queue of threads to execute. Still further, each CPU in the system 1200 of FIG. 12 has an entry in the SMP Linux for MIPS cpu_data array, an entry 1408 of which is shown in FIG. 14. Similarly, each thread context 104 in the system 100 of FIG. 13 has an entry 1408 in the SMTC Linux cpu_data array.

Referring now to FIG. 14, a block diagram of a cpu_data array entry 1408 in an SMTC Linux operating system according to the present invention is shown. The conventional SMP Linux operating system maintains a cpu_data array that includes one entry for each CPU recognized by SMP Linux. The array is indexed by a CPU number assigned to each individual CPU. Each entry stores information, referred to in FIG. 14 as original fields 1402, about the CPU, such as the CPU type, information about the FPU 1306, the size of the TLB 1302, pre-emption timer-related information, and cache-related information. The original fields 1402 of conventional SMP Linux also include the ASID cache 1204 for each CPU, denoted asid_cache in the source code listing at line 447. As discussed below with respect to FIG. 21, although SMTC Linux shares a single ASID cache 1304 among all CPUs/TCs 104 of the system 100 of FIG. 13, in one embodiment SMTC Linux uses the asid_cache storage space in the original fields 1402 effectively as a single ASID cache 1304 by updating each asid_cache field in each cpu_data array entry 1408 even when generating a new ASID value for only a single CPU/TC 104. The SMTC Linux entry 1408 includes two additional fields: the TC_ID field 1404 and the VPE_ID field 1406. The TC_ID field 1404 identifies the thread context 104 of the Linux CPU associated with the cpu_data entry 1408. In particular, the operating system populates the TC_ID field 1404 with the value stored in the CurTC field 557 of the TCBind Register 556 of FIG. 5K of the thread context 104. The value used to index the cpu_data array is referred to as the CPU number. The VPE_ID field 1406 identifies the VPE 102 to which is bound the thread context 104 of the Linux CPU associated with the cpu_data entry 1408. In particular, the operating system populates the VPE_ID field 1406 with the value stored in the CurVPE field 558 of the TCBind Register 556 of FIG. 5K of the thread context 104.

Figure 15:
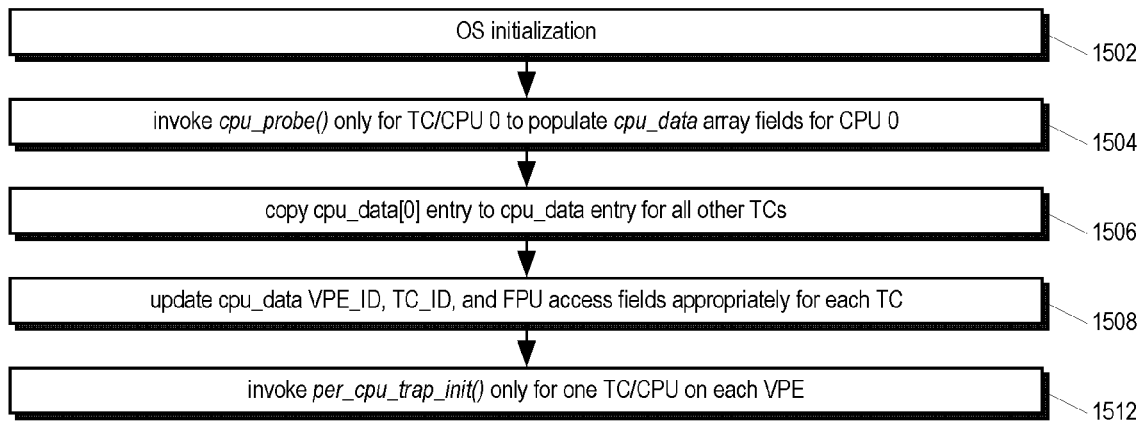
FIG. 15 is a flowchart illustrating operation of the SMTC operating system on a system of FIG. 13 according to the present invention.

Referring now to FIG. 15, a flowchart illustrating operation of the SMTC operating system on a system 100 of FIG. 13 according to the present invention is shown. The flowchart illustrates modifications to the conventional SMP Linux to accommodate the fact that the thread contexts 104 share common resources of the system, such as the FPU 1306, TLB 1302, and caches. Flow begins at block 1502.

At block 1502, the operating system begins its initialization sequence. Flow proceeds to block 1504.

At block 1504, the initialization sequence invokes the SMP Linux cpu_probe( ) routine only for TC 0 104, which corresponds to SMTC Linux CPU number 0 (the primary, or boot, CPU/TC 104), in order to populate the cpu_data array entry 1408 at index 0. Flow proceeds to block 1506.

At block 1506, the initialization sequence copies the cpu_data array entry 1408 at index 0 to all the other entries in the cpu_data array, i.e., to the entry for each of the other CPUs/TCs 104. Flow proceeds to block 1508.

At block 1508, the initialization sequence updates the TC_ID field 1404 and VPE_ID field 1406 of the cpu_data array entry 1408 for each of the CPUs/TCs 104 based on their CurTC field 557 and CurVPE field 558 values, respectively. It is noted that prior to the step at block 1508, the binding of thread contexts 104 to VPEs 102 has been performed, i.e., the CurVPE field 558 for each thread context 104 has been populated. In one embodiment, the operating system performs the binding of thread contexts 104 to VPEs 102. In another embodiment, the binding of thread contexts 104 to VPEs 102 may be performed when the microprocessor 100 is synthesized or fabricated. Additionally, the initialization sequence updates the cpu_data array entry 1408 for each of the CPUs/TCs 104 to indicate whether it has permission to access the FPU 1306. The TCU1 bit 581 of the TCStatus Register 508 of FIG. 5J indicates whether a CPU/TC 104 has permission to access the FPU 1306. It is noted that only a single invocation of the cpu_probe( ) routine is necessary since each of the CPUs/TCs 104 share the same set of resources, namely the FPU 1306, TLB 1302, and caches. Flow proceeds to block 1512.

At block 1512, the initialization sequence invokes the per_cpu_trap_init( ) routine only for one thread context 104 for each VPE 102 since the VPE 102 is the exception domain for the thread contexts 104 bound to it; that is, each thread context 104 is not its own exception domain, particularly since asynchronous exceptions may not be directed specifically to a particular thread context 104, as discussed above. This is in contrast to conventional SMP Linux in which the per_cpu_trap_init( ) routine is invoked once per CPU, since each CPU in the conventional system 1200 is an exception domain. Flow ends at block 1512.

Figure 16:
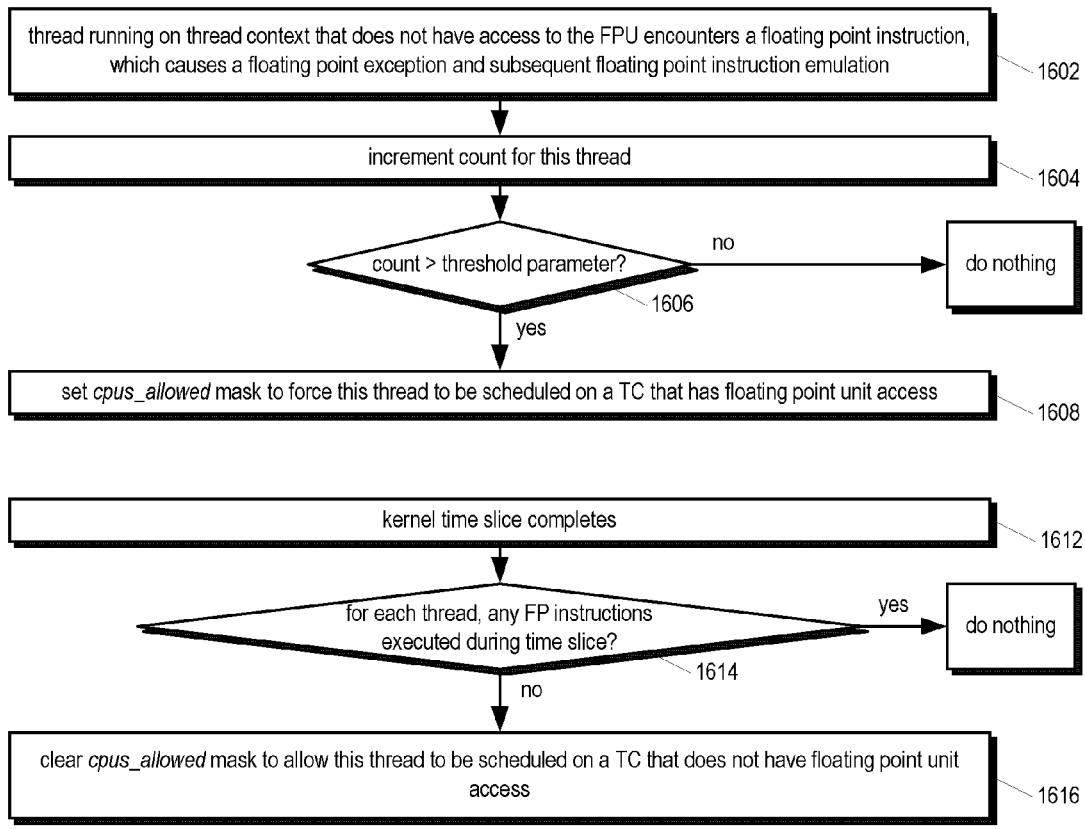
FIG. 16 is two flowcharts illustrating operation of the SMTC operating system on a system of FIG. 13 according to the present invention.

Referring now to FIG. 16, two flowcharts illustrating operation of the SMTC operating system on a system 100 of FIG. 13 according to the present invention are shown. The flowcharts illustrate modifications to the conventional SMP Linux to accommodate the sharing of the FPU 1306 by the thread contexts 104 of the system 100 of FIG. 13. Flow begins at block 1602.

At block 1602, a thread executing on one of the thread contexts 104 includes a floating point instruction. However, the thread context 104 does not have permission to access the FPU 1306. Therefore, a floating point exception is taken so that a floating point instruction emulation may be performed. Flow proceeds to block 1604.

At block 1604, the operating system increments a count associated with the thread for which the floating point emulation was performed. Flow proceeds to decision block 1606.

At decision block 1606, the operating system determines whether the count has exceeded a threshold parameter. If not, flow ends; otherwise, flow proceeds to block 1608.

At block 1608, the operating system sets a cpus_allowed mask, which is a kernel variable, to cause the operating system to schedule the thread on a thread context 104 that has permission to access the FPU 1306 during a subsequent time slice. A time slice is a time quantum used by the operating system to schedule processes or threads and is typically an integer multiple of the timer interrupt time quantum. Flow ends at block 1608.

Flow of the second flowchart of FIG. 16 begins at block 1612.

At block 1612, a time slice of the operating system completes and the operating system performs its thread scheduling. Flow proceeds to decision block 1614.

At decision block 1614, for each running thread, the operating system determines whether the thread executed any floating point instructions during the time slice. In one embodiment, the thread has not executed any floating point instructions during the time slice if the CUI bit 572 in the Status Register 571 of FIG. 5M is clear. If the thread has executed any floating point instructions during the time slice, flow ends; otherwise, flow proceeds to block 1616.

At block 1616, the operating system clears the cpus_allowed mask to enable the operating system to schedule the thread on a thread context 104 that does not have permission to access the FPU 1306 during a subsequent time slice. Flow ends at block 1616.

Advantageously, the method described in the flowcharts of FIG. 16 provides less variability in the execution times of floating-point intensive programs in an SMTC system 100. It is noted an alternative to the operation of FIG. 16 is to allow the SMP Linux cpu_has_fpu macro to evaluate true only for one CPU/TC 104. However, this alternative would cause extreme variability in the execution times of floating point-intensive programs, depending upon the percentage of their execution time that is scheduled by the operating system on a thread context 104 that does not have permission to access the FPU 1306.

Figure 17:
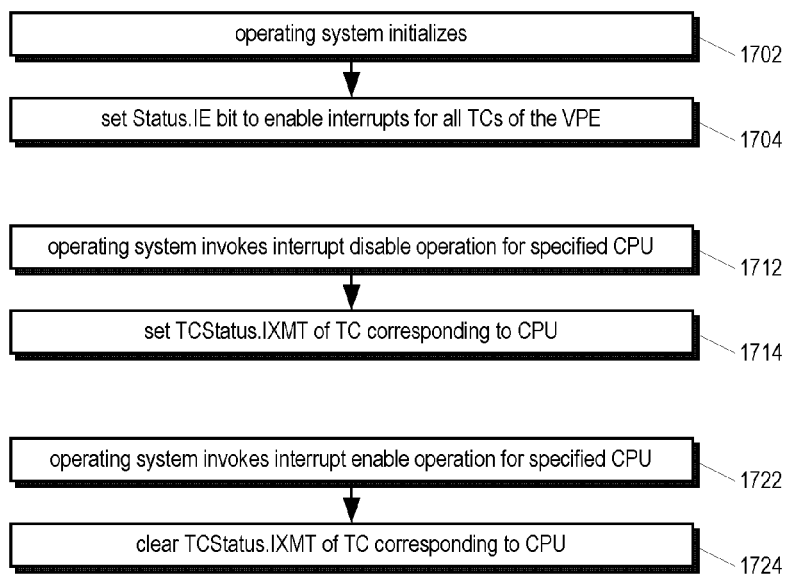
FIG. 17 is three flowcharts illustrating operation of the SMTC operating system on a system of FIG. 13 according to the present invention.

Referring now to FIG. 17, three flowcharts illustrating operation of the SMTC operating system on a system 100 of FIG. 13 according to the present invention are shown. The flowcharts illustrate modifications to the conventional SMP Linux interrupt enable and interrupt disable routines to accommodate the fact that although each thread context 104 is a Linux CPU, the interrupt control logic is not replicated for each thread context 104, i.e., each thread context 104 does not have its own interrupt control logic and is thus not its own exception domain; rather, each thread context's 104 exception domain is the VPE 102 to which the thread context 104 is bound, i.e., each VPE 102 comprises interrupt control logic that is a resource shared by each of the thread contexts 104 bound to the VPE 102, as indicated by the CurVPE bits 558 of the TCBind Register 556 of FIG. 5K. Flow begins at block 1702.

At block 1702, the operating system begins its initialization sequence. Flow proceeds to block 1704.

At block 1704, the operating system sets the IE bit 577 in the Status Register 571 of FIG. 5M in order to enable interrupts globally for all thread contexts 104 of the VPE 102. The operating system performs the step at block 1704 near the end of its initialization sequence, in particular, after each of the interrupt service routines have been set up and the operating system is ready to begin servicing interrupts. Flow ends at block 1704.

Flow of the second flowchart of FIG. 17 begins at block 1712.

At block 1712, a thread executing on a thread context 104 invokes an interrupt disable routine, such as the CLI macro at source code lines 215-250, on a CPU/TC 104 executing the thread. Flow proceeds to block 1714.

At block 1714, the interrupt disable routine sets the IXMT bit 518 of the TCStatus Register 508 of FIG. 5J of the thread context 104 executing the thread, such as is performed in the source code lines 233-240. Advantageously, this disables interrupts only for the CPU/TC 104 executing the interrupt disable routine, rather than for all thread contexts 104 of the VPE 102. Flow ends at block 1714.

Flow of the third flowchart of FIG. 16 begins at block 1722.

At block 1722, a thread executing on a thread context 104 invokes an interrupt enable routine, for example a Linux STI macro, on a CPU/TC 104 executing the thread. Flow proceeds to block 1724.

At block 1724, the interrupt enable routine clears the IXMT bit 518 of the TCStatus Register 508 of FIG. 5J of the thread context 104 executing the thread, similar to, but an inverse operation of, the instructions in the CLI macro. Advantageously, this enables interrupts only for the CPU/TC 104 executing the interrupt enable routine, rather than for all thread contexts 104 of the VPE 102. Flow ends at block 1724.

Figure 18:
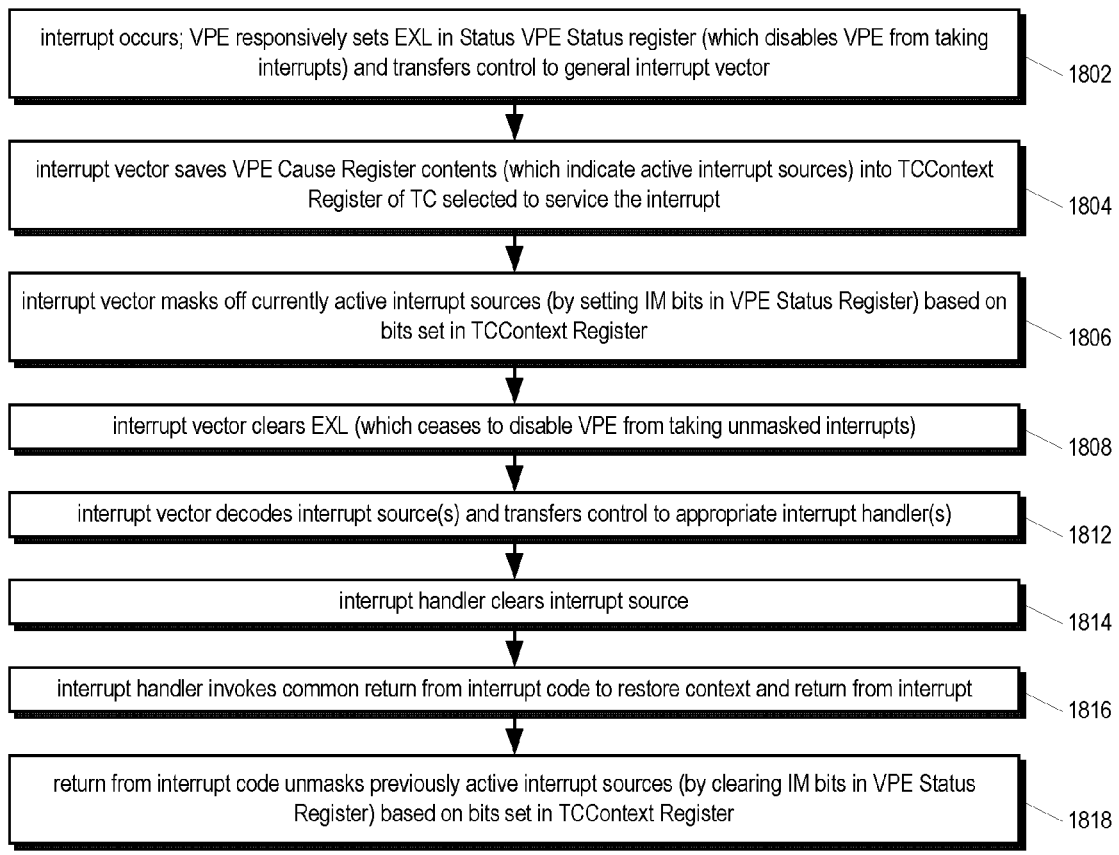
FIG. 18 is a flowchart illustrating operation of the SMTC operating system on a system of FIG. 13 according to the present invention.

Referring now to FIG. 18, a flowchart illustrating operation of the SMTC operating system on a system 100 of FIG. 13 according to the present invention is shown. The flowchart of FIG. 18 illustrates modifications to the conventional SMP Linux general interrupt vector and common return from interrupt code to accommodate the fact that although each thread context 104 is a Linux CPU, each thread context 104 is not its own exception domain, but rather each thread context's 104 exception domain is the VPE 102 to which the thread context 104 is bound. In particular, the modifications advantageously prevent the undesirable situation in which multiple thread contexts 104 of a VPE 102 would otherwise service the same interrupt request instance. Flow begins at block 1802.

At block 1802, an interrupt request is activated. In response, the VPE 102 receiving the interrupt request sets the EXL bit 576 in the Status Register 571 of FIG. 5M, which has the effect of disabling the VPE 102 from taking subsequent interrupts. Setting the EXL bit 576 also has the advantageous effect of suspending the instruction scheduler 216 from issuing for execution instructions of the various other thread contexts 104 of the VPE 102 taking the interrupt request. The VPE 102 then selects an eligible thread context 104 to service the interrupt request and causes the general interrupt vector code to commence running on the selected thread context 104. Flow proceeds to block 1804.

At block 1804, the interrupt vector code saves the contents of the Cause Register 536 of FIG. 5P to the TCContext Register 595 of FIG. 5L of the thread context 104 executing the interrupt vector code. The IP bits 547/548 of the Cause Register 536 of FIG. 5P indicate which interrupt request sources are currently active. In an alternate embodiment, the interrupt vector code saves the contents of the Cause Register 536 to an entry in a table similar to the page table origin or kernel stack pointer tables of FIG. 19 that is indexed by a shifted version of the TCBind Register 556 of FIG. 5K, as described below with respect to FIG. 19. Flow proceeds to block 1806.

At block 1806, the interrupt vector code masks off the currently active interrupt sources indicated in the Cause Register 536 by setting the corresponding IM bits 573 in the Status Register 571 of FIG. 5M of the VPE 102. Flow proceeds to block 1808.

At block 1808, the interrupt vector code clears the EXL bit 576, which ceases to disable the VPE 102 from taking interrupts which were activated at block 1802. Flow proceeds to block 1812.

At block 1812, the interrupt vector code decodes the interrupt sources based on the Cause Register 536 contents and transfers control to the appropriate interrupt handlers registered to handle interrupts for the specific types of active interrupt sources. Flow proceeds to block 1814.

At block 1814, the interrupt source-specific interrupt handler clears the interrupt source and services the interrupt source. Flow proceeds to block 1816.

At block 1816, the interrupt handler invokes the common return from interrupt code to restore the context and return from the interrupt. Flow proceeds to block 1818.

At block 1818, the return from interrupt code reads the TCContext Register 595 and unmasks the interrupt sources indicated therein as previously having been active by clearing the corresponding IM bits 573 in the Status Register 571. Flow ends at block 1818.

It is noted that a kernel variable in memory could be used instead of the TCContext Register 595 to save the Cause Register 536 contents. However, using the TCContext Register 595 is more efficient, and is particularly appropriate in an embodiment in which the value must be saved and restored on a context switch.

In addition to the modifications described in FIG. 18, SMTC Linux also provides an SMTC-specific setup_irq( ) routine that SMTC-aware device drivers may invoke to set up their interrupt handlers by passing an additional mask parameter that specifies interrupt sources that the interrupt handler will re-enable explicitly during the servicing of the exception. In particular, the clock timer device driver in SMTC Linux is SMTC-aware and invokes the SMTC-specific setup_irq( ) routine.

Figure 19:
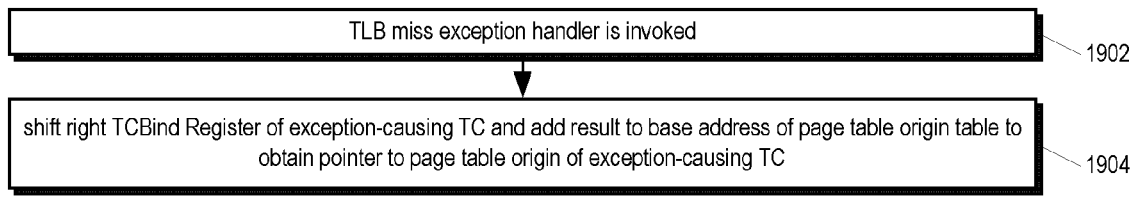
FIG. 19 is two flowcharts and two block diagrams illustrating operation of the SMTC operating system on a system of FIG. 13 according to the present invention.
Figure 19:
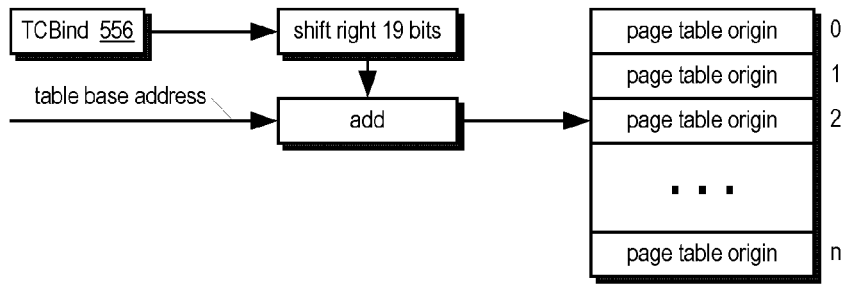
Figure 19:
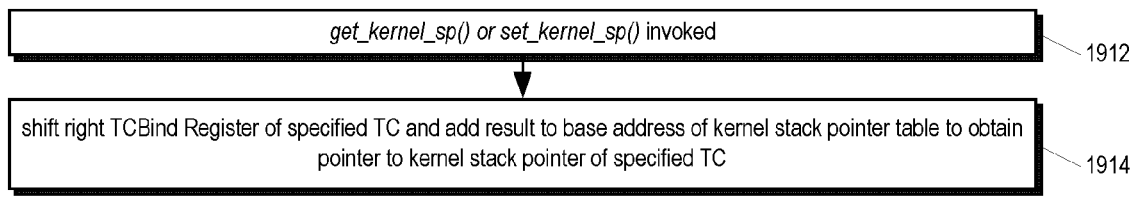
Figure 19:
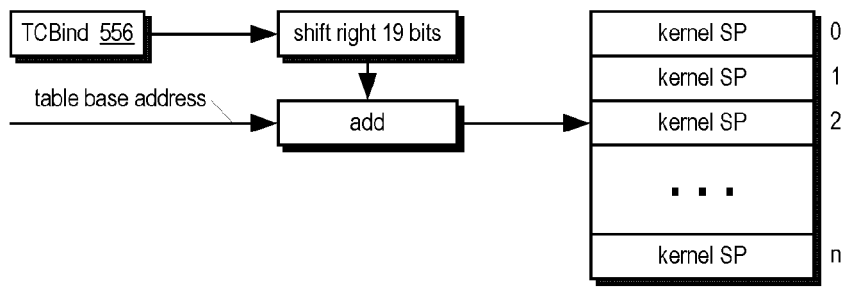

Referring now to FIG. 19, two flowcharts and two block diagrams illustrating operation of the SMTC operating system on a system 100 of FIG. 13 according to the present invention are shown. The flowcharts and block diagrams of FIG. 19 illustrate modifications to the conventional SMP Linux TLB miss handler, get_kernel_sp( ), and set_kernel_sp( ) routines, to accommodate the fact that the Context Register 527 of FIG. 5N, used by the conventional SMP Linux TLB miss handler get_kernel_sp( ), and set_kernel_sp( ) routines, is instantiated on a per-VPE 102 basis, rather than a per-TC 104 basis. Flow begins at block 1902.

At block 1902, the VPE 102 invokes the operating system TLB miss handler in response to a TLB miss exception. It is noted that in a MIPS Architecture processor, the operating system is responsible for handling TLB 1302 misses. That is, the operating system is responsible for updating the TLB 1302 with the appropriate virtual to physical page translation information if the information is missing in the TLB 1302. This is in contrast to some processor architectures in which the processor hardware automatically fills the TLB on a TLB miss. Flow proceeds to block 1904.

At block 1904, the TLB miss handler reads the TCBind Register 556 of FIG. 5K of the exception causing thread context 104 (which the VPE 102 selects to service the TLB miss exception) and shifts the value right by 19 bits (or 18 bits if dealing with 64-bit quantities) to obtain an offset into a table of 32-bit page table origin values, or page table base address values, and adds the offset to the base address of the table to obtain a pointer to the page table origin of the thread context 104 executing the thread that caused the TLB miss exception, as shown in the corresponding block diagram. In one embodiment, the base address of the table is fixed at compile time of the operating system. Flow ends at block 1904.

Flow of the second flowchart of FIG. 19 begins at block 1912.

At block 1912, a thread invokes the operating system get_kernel_sp( ) or set_kernel_sp( ) routine to get or set, respectively, the kernel stack pointer value for the CPU/TC 104 executing the thread. Flow proceeds to block 1914.

At block 1914, the invoked routine reads the TCBind Register 556 of FIG. 5K of the invoking thread context 104 and shifts the value right by 19 bits (or 18 bits if dealing with 64-bit quantities) to obtain an offset into a table of 32-bit kernel stack pointer values, and adds the offset to the base address of the table to obtain a pointer to the kernel stack pointer, as shown in the corresponding block diagram. In one embodiment, the base address of the table is fixed at compile time of the operating system. Flow ends at block 1914.

It is noted that conventional SMP Linux for MIPS uses the PTEBase field 542 of the Coprocessor 0 Context Register 527 of FIG. 5N to store a value that may be used as a pointer to CPU-unique values in a system such as the system 1200 of FIG. 12. However, SMTC operating systems require a per-TC storage location such as TCBind 556 which is provided in system 100 of FIG. 13 for each thread context 104, rather than a per-VPE 102 storage location, since SMTC operating systems view each thread context 104 as a CPU.

Figure 20:
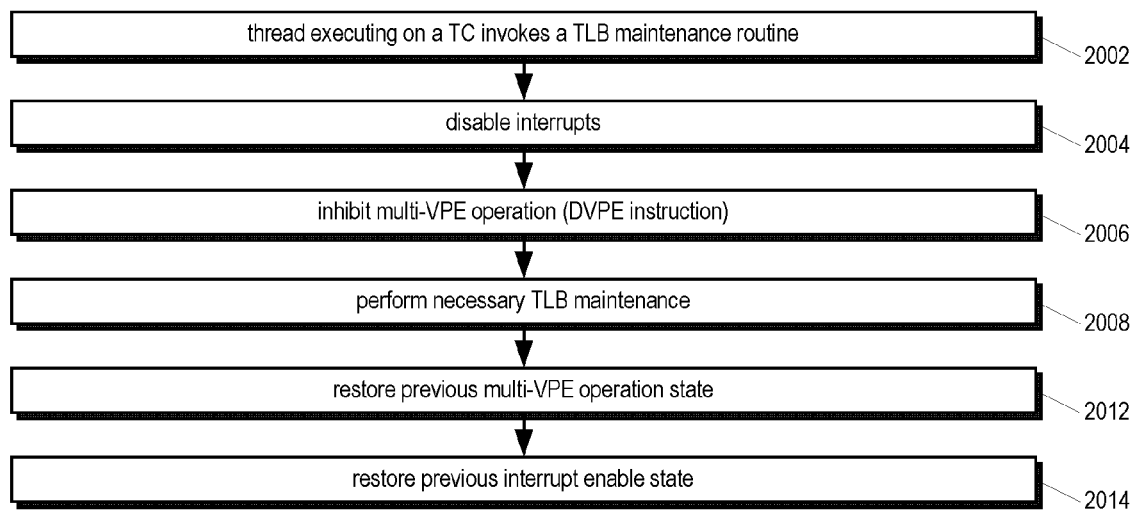
FIG. 20 is a flowchart illustrating operation of the SMTC operating system on a system of FIG. 13 according to the present invention.

Referring now to FIG. 20, a flowchart illustrating operation of the SMTC operating system on a system 100 of FIG. 13 according to the present invention is shown. The flowchart illustrates modifications to the conventional SMP Linux to accommodate the fact that the thread contexts 104 share a common TLB 1302. In particular, TLB 1302 maintenance routines may read and write entries in the shared TLB 1302; therefore, the operating system prevents multiple CPU/TCs 104 from maintaining the shared TLB 1302 at the same time. In particular, the second-level TLB page fault handler performs a TLB probe and re-write sequence and may be invoked at any time due to a user-mode access. Consequently, a software spin-lock is an insufficient arbiter of access to the TLB 1302 management resources. Flow begins at block 2002.

At block 2002, a thread executing on a CPU/TC 104 invokes a TLB 1302 maintenance routine. Flow proceeds to block 2004.

At block 2004, the routine disables interrupts. In one embodiment, the routine disables interrupts only on the executing thread context 104, such as via a CLI described above. In another embodiment, the routine disables interrupts on the entire VPE 102 to which the thread context 104 is bound by clearing the IE bit 577 of the Status Register 571 of FIG. 5M to disable VPE 102 interrupts. Flow proceeds to block 2006.

At block 2006, the routine inhibits multi-VPE 102 operation, i.e., inhibits concurrent execution of threads other than the thread executing the routine. That is, the routine prevents the instruction scheduler 216 from dispatching to the execution units 212 instructions from any of the VPEs 102 of the system 100 other than the VPE 102 to which the thread context 104 executing the routine is bound and from dispatching from any of the thread contexts 104 bound to the VPE 102 except the thread context 104 executing the routine. In one embodiment, the routine executes a MIPS MT ASE DVPE instruction to disable multi-VPE operation. Flow proceeds to block 2008.

At block 2008, the routine performs the specified TLB 1302 maintenance required by the TLB 1302 maintenance routine. Flow proceeds to block 2012.

At block 2012, the routine restores the multi-VPE operation state that existed on the system 100 prior to performing the step at block 2006. In one embodiment, the routine executes a MIPS MT ASE EVPE instruction to enable multi-VPE operation if that was the previous state. Flow proceeds to block 2014.

At block 2014, the routine restores the interrupt enable state that existed on the VPE 102 prior to performing the step at block 2004. In one embodiment, the routine clears the IXMT bit 518 in the TCStatus Register 508 of FIG. 5J to enable interrupts for the thread context 104 if that was the previous state. In another embodiment, the routine sets the IE bit 577 in the Status Register 571 of FIG. 5M to enable VPE 102 interrupts if that was the previous state. Flow ends at block 2014.

Figure 21:
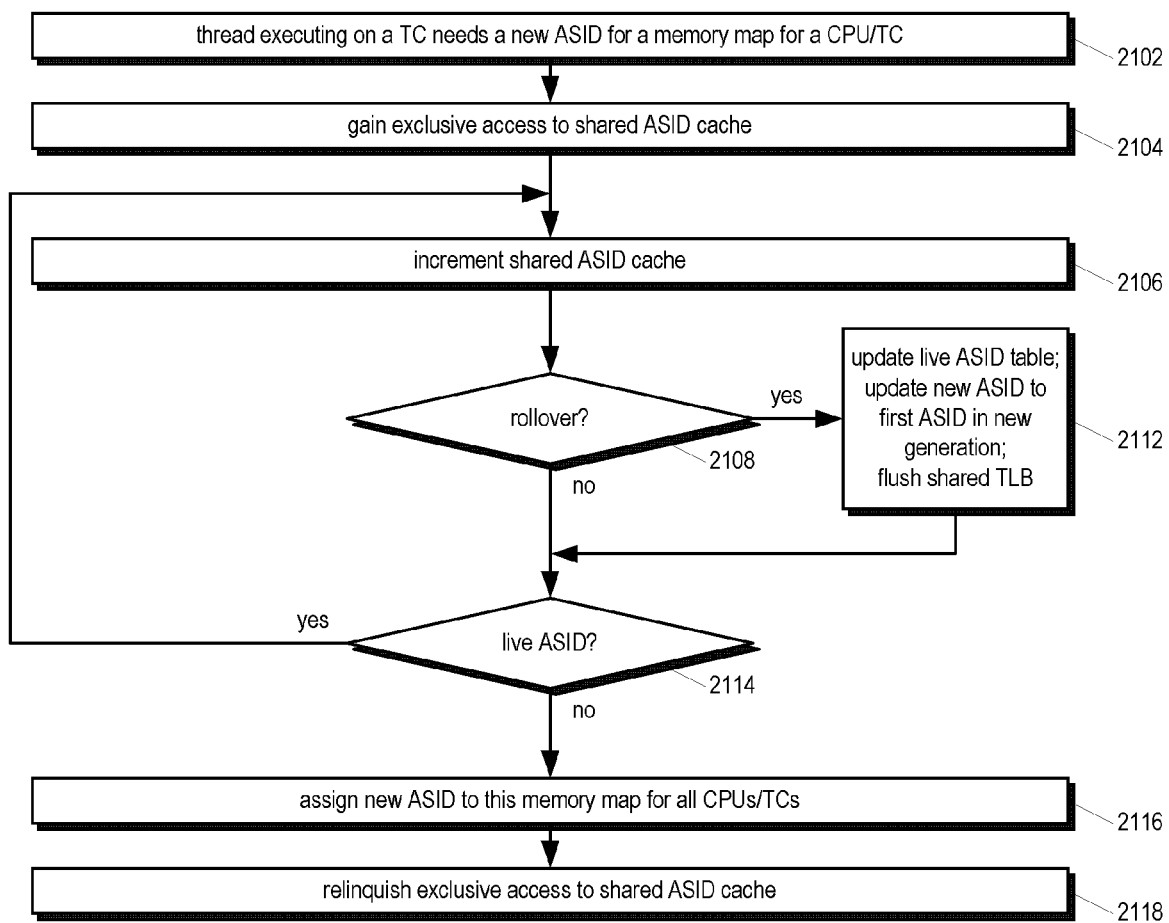
FIG. 21 is a flowchart illustrating operation of the SMTC operating system on a system of FIG. 13 according to the present invention.

Referring now to FIG. 21, a flowchart illustrating operation of the SMTC operating system on a system 100 of FIG. 13 according to the present invention is shown. The flowchart illustrates modifications to conventional SMP Linux to accommodate the fact that the thread contexts 104 share a common ASID cache 1304.

As mentioned above, in a conventional MIPS SMP Linux system 1200 of FIG. 12, each CPU has its own TLB 1202 and its own ASID cache 1204; however, in an SMTC Linux system 100, all of the CPUs/TCs 104 share a common TLB 1302. Therefore, SMTC Linux must ensure that the same ASID is not assigned to two different memory maps concurrently in use on two different CPUs/TCs 104. Otherwise, the shared TLB 1302 might return the incorrect address translation information for the thread executing on one of the CPUs/TCs 104. This is because, as discussed above, the tags in the TLB 1302 are a concatenation of the ASID and the virtual page number being accessed. Thus, if two different threads running on two different CPUs/TCs 104 using two different memory maps generated the same virtual page address and same ASID, then they would match the same entry in the TLB 1302 and receive the same physical page address; however, this is incorrect since they are using different memory maps, which would be accessing different physical pages. In other words, when the second thread accessed the TLB 1302, the TLB 1302 would return a hit and output the physical page translation for the memory map of the first thread, since the entry would have been allocated and filled when the first thread caused a TLB 1302 miss.

To ensure that the same ASID is not assigned to two different memory maps concurrently in use on two different CPUs/TCs 104, SMTC Linux shares a common ASID cache 1304 across all CPUs/TCs 104, and serializes use and update of the shared ASID cache 1304 by suspending thread scheduling during the read-modify-write operation of the ASID cache 1304 that is performed when obtaining a new ASID value from the ASID cache 1304. Flow begins at block 2102.

At block 2102, a thread executing on a thread context 104 requires a new ASID for a memory map for a particular CPU/TC 104. The most common situations in which a new ASID is required for a memory map are when a new memory map is being created or when an ASID generation rollover occurs, as described below. In particular, a thread is being scheduled to run on a CPU/TC 104, i.e., the thread is being swapped in to the CPU/TC 104 by the operating system. Among other things, the operating system loads the general purpose registers 224 of FIG. 2 with the previously saved or initial GPR 224 values and loads the program counter 222 of FIG. 2 of the CPU/TC 104 with the previously saved or initial address of the thread. Furthermore, the operating system looks at which process is associated with the thread being schedule and which memory map is associated with the process. The operating system data structure describing the memory map contains an array of ASID values. Normally, the operating system takes the ASID value from the data structure entry indexed by the CPU number of the CPU/TC 104 scheduling the thread and loads the ASID value into the EntryHi Register 526 of FIG. 5N. However, if the operating system detects that the ASID value obtained from the data structure entry belongs to a previous generation, then the operating system obtains a new ASID for the memory map for the CPU/TC 104 according to FIG. 21, and programs the EntryHi Register 526 with the new ASID instead of the ASID obtained from the data structure. Flow proceeds to block 2104.

At block 2104, the operating system gains exclusive access to the shared ASID cache 1304. In one embodiment, the step at block 2104 is performed by disabling interrupts and disabling multi-VPE operation as described with respect to blocks 2004 and 2006, respectively, of FIG. 20. An example of the step performed at block 2104 is found at lines 274-281 of the source code listing. Flow proceeds to block 2106.

At block 2106, the operating system increments the current ASID cache 1304 value to obtain the new ASID value. An example of the step performed at block 2106 is found at lines 282 and 285 of the source code listing. Flow proceeds to decision block 2108.

At decision block 2108, the operating system determines whether the ASID cache 1304 value rolled over to a new generation when it was incremented at block 2106. The ASID cache 1304 rolls over to a new generation as follows. The ASID cache 1304 value is maintained as a 32-bit value. However, the TASID bits 528 of the TCStatus Register 508 of FIG. 5J and the ASID bits 538 of the Coprocessor 0 EntryHi Register 526 of FIG. 5N are physically only 8 bits. When the 32-bit ASID cache 1304 value is incremented to a new value that modulo 256 is zero, an ASID generation rollover has occurred, since the new 8-bit ASID physical values written to the TASID bits 528 and the ASID bits 538 will be of a new ASID generation. That is, the 8-bit physical ASID values are re-used for each possible value of the upper 24 bits of a 32-bit ASID value. However, the same physical ASID value may not be used to identify two different memory maps, or else the TLB 1302 will produce incorrect page translations, as discussed above. Therefore, the operating system performs the ASID generation rollover condition check. An example of the step performed at decision block 2108 is found at line 285 of the source code listing. If the ASID cache 1304 value rolled over, flow proceeds to block 2112; otherwise, flow proceeds to decision block 2114.

At block 2112, the operating system updates a live ASID table. In addition, when an ASID generation rollover occurs, the operating system updates the new ASID to the first ASID generation value and flushes the shared TLB 1302. A live ASID is an ASID that is in use by another CPU/TC 104. The live ASID table indicates, for each ASID, which CPUs/TCs 104, if any, are currently using the ASID. The operating system updates the live ASID table by reading the TASID field 528 of the TCStatus Register 508 of FIG. 5J to determine the ASID currently being used by each CPU/TC 104, which may advantageously be performed by a series of MFTR instructions 300 in the operating system thread that updates the live ASID table. The operating system avoids obtaining a new ASID that is the same as a live ASID in order to avoid potentially using the same physical ASID value to identify two different memory maps, which might cause the TLB 1302 to produce incorrect page translations, as discussed above. In particular, although the operating system flushes the shared TLB 1302 when an ASID generation rollover occurs, the TASID field 528 of the TCStatus Register 508 of the various thread contexts 104 may still be populated with old generation ASIDs, and could therefore generate new TLB 1302 entry allocations/fills that have old generation ASIDs in their tags. An example of the step of updating the live ASID table performed at block 2112 is found at lines 304-305 of the source code listing. An example of the step of updating the new ASID to the first ASID generation value performed at block 2112 is found at line 310 of the source code listing. An example of the step of flushing the shared TLB 1302 performed at block 2112 is found at line 311 of the source code listing. Flow proceeds to block 2116.

At decision block 2114, the operating system determines whether the new ASID is equal to a live ASID. An example of the step performed at decision block 2114 is found at line 313 of the source code listing. If the new ASID is equal to a live ASID, flow returns to block 2106 so that the operating system can attempt to obtain a new non-live ASID; otherwise, flow proceeds to block 2116.

At block 2116, the operating system assigns the new ASID to the memory map for all CPUs/TCs 104 in the system 100. As discussed above, in one embodiment, SMTC Linux uses the asid_cache storage space in the original fields 1402 effectively as a single ASID cache 1304 by updating each asid_cache field in each cpu_data array entry 1408 even when generating a new ASID value for only a single CPU/TC 104; however, other embodiments are contemplated in which a single kernel variable is used to store the single ASID cache 1304. The operating system advantageously assigns the new ASID to the memory map for all CPUs/TCs 104 in order to make more efficient use of the shared TLB 1302, i.e., to avoid the following situation. Assume two processes share a common memory map and execute on different CPUs/TCs 104. In a conventional SMP Linux system 1200, the memory map would be assigned a different ASID for each CPU, since each CPU has its own ASID cache 1204. However, in the shared TLB 1302 system 100, the first time each CPU/TC 104 accessed a shared memory page, the operating system would allocate an entry in the shared TLB 1302 for the page translation since the ASID value differed for each CPU/TC 104, i.e., two TLB 1302 entries would be consumed for the same shared physical page, which would be an inefficient use of the shared TLB 1302 entries. A similar inefficiency could occur when a process was migrated from one CPU/TC 104 to another. Thus, to avoid this situation and make more efficient use of the shared TLB 1302, SMTC Linux assigns the new ASID to the memory map not only for the CPU/TC 104 for which it was obtained, but also causes the new ASID to be assigned to and used by all CPUs/TCs 104 that reference the memory map. Stated alternatively, when the operating system assigns a new ASID to a memory map, if a process uses the memory map, then all threads of the process which use the memory map use the new ASID on all CPUs/TCs 104 that execute the threads. In particular, when a thread using a memory map is swapped into any thread context 104 after a new ASID is assigned to the memory map, the new ASID, rather than an old ASID identifying the memory map, gets loaded into the TASID field 528 of the TCStatus Register 508 of FIG. 5J of the thread context 104. Thus advantageously, any TLB 1302 entries that were loaded as a result of the thread executing on one CPU/TC 104 will be valid and usable on any other CPU/TC 104 to which the thread subsequently migrates, which would not be the case if the operating system maintained a distinct ASID cache per CPU, as in conventional SMP Linux. An example of the step performed at block 2116 is found at line 320 of the source code listing. Flow proceeds to block 2118.

At block 2118, the operating system relinquishes exclusive access to the shared ASID cache 1304. In one embodiment, the step at block 2118 is performed by restoring interrupts and multi-VPE operation to their previous states, as described with respect to blocks 2012 and 2014, respectively, of FIG. 20. An example of the step performed at block 2118 is found at lines 324-329 of the source code listing. Flow ends at block 2118.

Although the present invention and its objects, features, and advantages have been described in detail, other embodiments are encompassed by the invention. For example, although embodiments have been described in which the modified SMP OS is Linux, other SMP operating systems are contemplated for adaptation to run on a multithreading microprocessor having non-independent lightweight thread contexts that share processor state with one another, such as MIPS MT ASE thread contexts, each of which is an independent CPU to the SMP OS. For example, other variants of the UNIX operating system, such as SUN Solaris, HP UX, Mac OS X, Open VMS, and others may be adapted to view the thread contexts as a CPU. Still further, other SMP operating systems such as SMP-capable variants of the Microsoft Windows operating system may be adapted to view the thread contexts as a CPU. Furthermore, although the invention has been described with respect to modifications to an existing SMP operating system, the invention is not limited to existing operating systems, but rather new operating systems may be developed which employ the steps described to employ non-independent lightweight thread contexts that share processor state with one another, such as MIPS MT ASE thread contexts, as independent CPUs to the new SMP OS.

Figure 22:
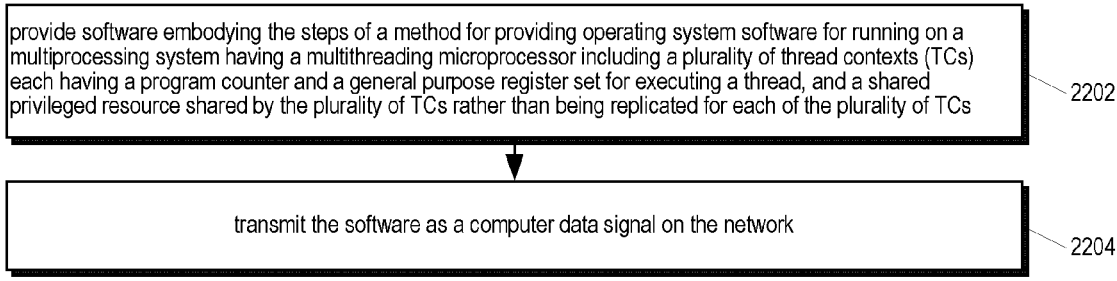
FIGS. 22 through 24 are flowcharts illustrating a method for providing software for performing the steps of the present invention and subsequently transmitting the software as a computer data signal over a communication network.
Figure 23:
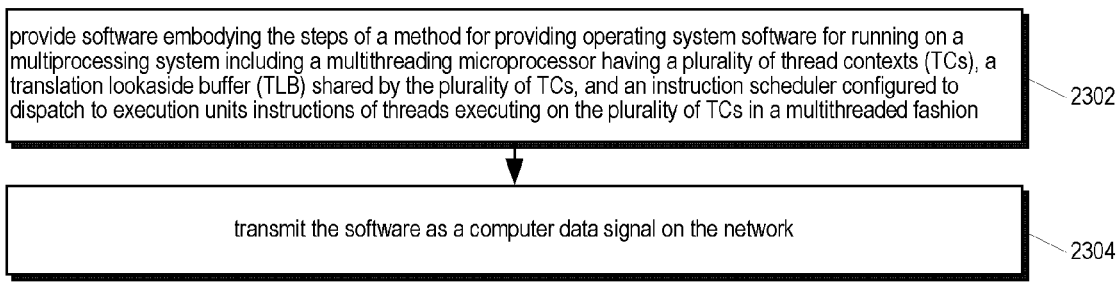
Figure 24:
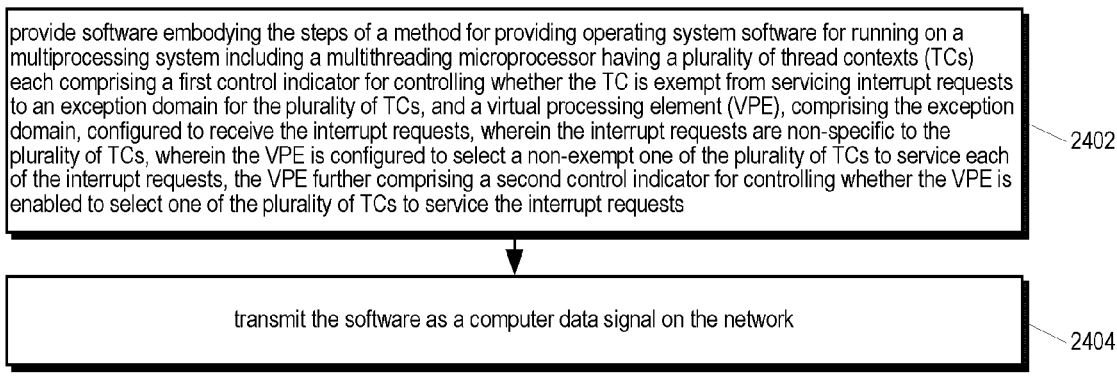

While various embodiments of the present invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), GDSII databases, hardware description languages (HDL) including Verilog HDL, VHDL, and so on, or other available programs and databases. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing operating system software described herein by providing the software and subsequently transmitting the software as a computer data signal over a communication network including the Internet and intranets, such as shown in FIGS. 22 through 24. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

I claim:

1. A multiprocessing system, comprising:

a multithreading microprocessor, comprising:

a plurality of hardware thread contexts (TCs), each configured to store an execution state of a respective thread, each TC having a program counter register and a general purpose register set;

a set of hardware execution units, shared by said plurality of TCs, configured to concurrently execute instructions of said threads having execution states stored in said plurality of TCs; and a set of exception state storage hardware, configured to store an exception state of an exception raised to the microprocessor, shared by said plurality of TCs rather than being replicated for each of said plurality of TCs such that a ratio of said plurality of TCs to said set of exception state storage hardware is greater than one; and wherein said microprocessor is configured to suspend issuing to the shared set of hardware execution units instructions of said threads executing on said plurality of TCs in response to receiving an exception; and a multiprocessor operating system (OS), configured to view each of said plurality of TCs as a distinct CPU, even though said set of exception state storage hardware is shared by said plurality of TCs rather than being replicated for each of said plurality of TCs such that a ratio of said plurality of TCs to said set of exception state storage hardware is greater than one.

2. The system as recited in claim 1, wherein said microprocessor further comprises a translation lookaside buffer (TLB) shared by said plurality of TCs rather than being replicated for each of said plurality of TCs, and privileged to be managed only by operating system-privileged threads rather than by user-privileged threads, wherein said OS is further configured to manage said TLB.

3. The system as recited in claim 2, wherein said microprocessor further comprises interrupt control logic shared by said plurality of TCs rather than being replicated for each of said plurality of TCs, and privileged to be managed only by operating system-privileged threads rather than by user-privileged threads, wherein said OS is further configured to manage said interrupt control logic.

4. The system as recited in claim 1, wherein said microprocessor further comprises:

a second plurality of hardware thread contexts (TCs), each configured to store an execution state of a respective thread, each TC having a program counter register and a general purpose register set; and a second set of exception state storage hardware, configured to store an exception state of a second exception raised to the microprocessor, shared by said second plurality of TCs rather than being replicated for each of said second plurality of TCs such that a ratio of said second plurality of TCs to said second set of exception state storage hardware is greater than one.

5. The system as recited in claim 4, wherein said microprocessor further comprises a translation lookaside buffer (TLB) shared by said first and second plurality of TCs rather than being replicated for each of said first and second plurality of TCs, and privileged to be managed only by operating system-privileged threads rather than by user-privileged threads, wherein said OS is further configured to manage said TLB.

6. The system as recited in claim 1, wherein said set of exception state storage hardware comprises a control register programmable by said OS for controlling enablement and disablement of interrupt requests globally to all of said plurality of TCs.

7. The system as recited in claim 1, wherein said set of exception state storage hardware comprises a status register readable by said OS for determining a source of interrupt requests, wherein said interrupt requests are non-specific to said plurality of TCs, wherein said set of exception state storage hardware is configured to select one of said plurality of TCs to execute a thread to service an active one of said interrupt requests.

8. The system as recited in claim 1, wherein said OS is configured execute a thread on a first of said plurality of TCs for directing an exception to a second of said plurality of TCs by writing an address of an interrupt handler to said program counter of said second of said plurality of TCs.

9. The system as recited in claim 8, wherein each of said plurality of TCs further comprises a control indicator for controlling whether said TC is halted from execution, wherein said thread executing on said first of said plurality of TCs is further configured to write to said control indicator of said second of said plurality of TCs to halt execution of a second thread executing thereon, prior to said writing said address of said interrupt handler to said program counter of said second of said plurality of TCs.

10. The system as recited in claim 9, wherein said thread executing on said first of said plurality of TCs is further configured to write to said control indicator of said second of said plurality of TCs to commence execution of said interrupt handler on said second of said plurality of TCs, after said writing said address of said interrupt handler to said program counter of said second of said plurality of TCs.

11. The system as recited in claim 1, wherein said OS comprises a data structure having an entry for each of said plurality of TCs, each said entry containing information describing capabilities of said corresponding one of said plurality of TCs, wherein each said entry further comprises a TC identifier field for identifying a corresponding one of said plurality of TCs, wherein said OS is further configured to populate said TC identifier field for each of said entries with a unique identifier value.

12. The system as recited in claim 11, wherein said unique identifier value is stored in a current thread context (CurTC) field in a TCBind Register.

13. The system as recited in claim 11, wherein said OS is configured to invoke a CPU probe routine only for a first of said plurality of TCs, and in response, to populate a first entry of said data structure with information describing said first of said plurality of TCs, and to subsequently copy said first entry to each remaining entry of said data structure without invoking said CPU probe routine for said remaining plurality of TCs.

14. The system as recited in claim 11, wherein said multithreading microprocessor further comprises:

one or more virtual processing elements (VPEs), wherein each of said one or more VPEs is an exception domain for a mutually exclusive subset of one or more of said plurality of TCs;

wherein each said entry further comprises a VPE identifier field for identifying one of said VPEs is bound to said corresponding one of said plurality of TCs;

wherein said OS is further configured to populate said VPE identifier field for each of said entries with an identifier value identifying one of said VPEs to which said corresponding one of said plurality of TCs is bound.

15. The system as recited in claim 14, wherein said VPE identifier value is stored in a current VPE (CurVPE) field in a TCBind Register.

16. The system as recited in claim 14, wherein said OS is configured to invoke a per-CPU trap initialization routine only for one of said subset of TCs per one of said VPEs.

17. The system as recited in claim 1, wherein said plurality of TCs is configured as an array of thread contexts (TCs), wherein each of said plurality of TCs further comprises a register for storing an index of said TC within said array, wherein said OS is further configured to maintain a table of entries, each said entry for storing a CPU-unique value for a respective one of said TCs, wherein said OS comprises a thread configured to execute on each of said respective TCs and to read said index from said register of said respective one of said TCs and to read said respective CPU-unique value for said respective one of said TCs using said index.

18. The system as recited in claim 17, wherein said CPU-unique value comprises a kernel stack pointer.

19. The system as recited in claim 17, wherein said CPU-unique value comprises a page table origin.

20. The system as recited in claim 17, wherein said set of exception state storage hardware comprises a register for indicating which of a plurality of interrupt requests is active, wherein said CPU-unique value comprises a storage location for saving and restoring said contents of said register indicating which of a plurality of interrupt requests is active.

21. The system as recited in claim 17, wherein said thread is further configured to shift said index value a predetermined number of bits and add said shifted index value to a base address of said table to obtain an address from which to read said respective CPU-unique value for said one of said TCs.

22. The system as recited in claim 1, wherein said OS comprises program instructions configured to cause each of said plurality of TCs to execute an instance of said OS.

23. The system as recited in claim 1, wherein said multithreading microprocessor further comprises:
an instruction scheduler, coupled to said plurality of TCs, configured to dispatch to said shared set of hardware execution units, in a multithreaded fashion, instructions of both operating system-privileged and user-privileged threads whose execution state is stored in said plurality of TCs.

24. The system as recited in claim 6, wherein each of said plurality of TCs further comprises:
a control register programmable to cause said multithreading microprocessor to refrain from selecting said TC to handle an exception.

25. The system as recited in claim 1, wherein said set of exception state storage hardware comprises one or more storage elements for said multiprocessor OS to service an exception.

26. The system as recited in claim 25, wherein said one or more storage elements comprise:
a register readable by said multiprocessor OS specifying a cause of said exception.

27. The system as recited in claim 25, wherein said one or more storage elements comprise:
a register readable by said multiprocessor OS specifying an address of a memory access causing said exception.

28. The system as recited in claim 25, wherein said one or more storage elements comprise:
a register writeable by said multiprocessor OS to specify an operating mode of said multithreading microprocessor.

29. The system as recited in claim 25, wherein said one or more storage elements comprise:
a register writeable by said multiprocessor OS to selectively disable or enable interrupts globally within said multithreading microprocessor.

30. The system as recited in claim 25, wherein said one or more storage elements comprise:
a register writeable by said multiprocessor OS to individually mask interrupt sources to said multithreading microprocessor.

31. A multiprocessing system, comprising:
a multithreading microprocessor, comprising:
a plurality of hardware thread contexts (TCs), each configured to store an execution state of a respective thread, each TC having a program counter register and a general purpose register;
a set of hardware execution units, shared by said plurality of TCs, configured to concurrently execute instructions of said threads having execution states stored in said plurality of TCs; and
a set of exception state storage hardware, configured to store an exception state of an exception raised to the microprocessor, shared by said plurality of TCs rather than being replicated for each of said plurality of TCs such that a ratio of said plurality of TCs to said set of exception state storage hardware is greater than one;
wherein said microprocessor is configured to suspend issuing to the shared set of hardware execution units instructions of said threads executing on all of said plurality of TCs in response to receiving an active interrupt request, and to subsequently select one of said plurality of TCs to execute interrupt handling code; and
a multiprocessor operating system (OS), comprising said interrupt handling code, configured to program said set of exception state storage hardware to mask off all currently active interrupt requests prior to enabling said set of exception state storage hardware to subsequently service unmasked ones of said active interrupt requests, thereby preventing more than one of said TCs from servicing said active interrupt request.

32. The system as recited in claim 31, wherein said multiprocessor OS is further configured to unmask said currently active interrupt requests after clearing a source of said active interrupt request.

33. A multiprocessing system, comprising:
a multithreading microprocessor, comprising:
a plurality of hardware thread contexts (TCs), each configured to store an execution state of a respective thread, each TC having a program counter register and a general purpose register set;
a set of hardware execution units, shared by said plurality of TCs, configured to concurrently execute instructions of said threads having execution states stored in said plurality of TCs; and
a set of exception state storage hardware, configured to store an exception state of an exception raised to the microprocessor, shared by said plurality of TCs rather than being replicated for each of said plurality of TCs such that a ratio of said plurality of TCs to said set of exception state storage hardware is greater than one;
wherein said microprocessor is configured to receive a plurality of interrupt requests from a plurality of interrupt sources globally for all of said plurality of TCs rather than said plurality of interrupt requests being received individually by said plurality of TCs, configured to suspend issuing to the shared set of hardware execution units instructions of said threads executing on all of said plurality of TCs in response to activation of one of said interrupt requests, and to select one of said plurality of TCs to execute interrupt handling code; and a multiprocessor operating system (OS), comprising said interrupt handling code, configured to program said set of exception state storage hardware to mask off all currently active ones of said plurality of interrupt sources prior to enabling said set of exception state storage hardware to subsequently service unmasked ones of said plurality of interrupt requests, thereby preventing more than one of said TCs from servicing said active interrupt request.

34. The system as recited in claim 33, wherein said multiprocessor OS is further configured to unmask said currently active ones of said plurality of interrupt sources after clearing the source of said active interrupt request.

35. A method for running a multiprocessor operating system (OS) on a multithreading microprocessor, the method comprising:
   storing an execution state of a plurality of threads on each of a respective plurality of hardware thread contexts (TCs) of the multithreading microprocessor;
   concurrently executing instructions of said threads issued to a set of hardware execution units of the multithreading microprocessor shared by said plurality of TCs;
   receiving an interrupt request, wherein said interrupt request is received by said multithreading microprocessor;
   storing an exception state of the interrupt request to a set of exception state storage hardware, wherein said set of exception state storage hardware is shared by said plurality of TCs rather than being replicated for each of said plurality of TCs such that a ratio of said plurality of TCs to said set of exception state storage hardware is greater than one, wherein said storing an exception state is performed by the multithreading microprocessor in response to said receiving said interrupt request;
   suspending issuing to the shared set of hardware execution units instructions of said threads, wherein said suspending issuing instructions is performed by the multithreading microprocessor in response to said receiving said interrupt request;
   selecting one of said plurality of TCs to execute exception handling code of the multiprocessor OS, wherein said selecting one of said plurality of TCs is performed by the multithreading microprocessor in response to said receiving said interrupt request; and
   programming said set of exception state storage hardware to mask off all currently active interrupt requests, wherein said programming said set of exception state storage hardware to mask off all currently active interrupt requests is performed by the exception handling code executing on said selected one of said plurality of TCs prior to enabling said set of exception state storage hardware to subsequently service unmasked ones of said active interrupt requests, thereby preventing more than one of said plurality of TCs from servicing said interrupt request.

36. The method as recited in claim 35, further comprising:
   executing an instance of said multiprocessing OS on each of said plurality of TCs each viewed by said multiprocessing OS as a distinct CPU, even though said set of exception state storage hardware is shared by said plurality of TCs rather than being replicated for each of said plurality of TCs such that a ratio of said plurality of TCs to said set of exception state storage hardware is greater than one.

37. The method as recited in claim 35, further comprising:
   storing an execution state of a second plurality of threads on each of a respective second plurality of hardware thread contexts (TCs) of the multithreading microprocessor;
   concurrently executing instructions of said first and said second threads issued to said set of hardware execution units shared by said first and said second plurality of TCs;
   receiving a second interrupt request;
   storing an exception state of the second interrupt request to a second set of exception state storage hardware, wherein said second set of exception state storage hardware is shared by said second plurality of TCs rather than being replicated for each of said second plurality of TCs such that a ratio of said second plurality of TCs to said second set of exception state storage hardware is greater than one, wherein said storing an exception state of the second interrupt request is performed by the multithreading microprocessor in response to said receiving said second interrupt request;
   suspending issuing to the shared set of hardware execution units instructions of said second threads, wherein said suspending issuing instructions of said second threads is performed by the multithreading microprocessor in response to said receiving said second interrupt request;
   selecting one of said second plurality of TCs to execute exception handling code of the multiprocessor OS, wherein said selecting one of said second plurality of TCs is performed by the multithreading microprocessor in response to said receiving said second interrupt request; and
   programming said second set of exception state storage hardware to mask off all currently active interrupt requests, wherein said programming said second set of exception state storage hardware to mask off all currently active interrupt requests is performed by the exception handling code executing on said selected one of said second plurality of TCs prior to enabling said second set of exception state storage hardware to subsequently service unmasked ones of said active interrupt requests, thereby preventing more than one of said second plurality of TCs from servicing said second interrupt request.

38. The method as recited in claim 35, further comprising:
   programming said set of exception state storage hardware to enable interrupt requests to all of the plurality of TCs, wherein said programming set of exception state storage hardware to enable interrupt requests globally is performed by the exception handling code after said programming said set of exception state storage hardware to mask off all currently active interrupt requests.

39. The method as recited in claim 35, further comprising:
   reading said set of exception state storage hardware to determine said currently active interrupt requests, wherein the interrupt requests are non-specific to the plurality of TCs, wherein said reading is performed by the exception handling code prior to said programming said set of exception state storage hardware to mask off all currently active interrupt requests.

40. The method as recited in claim 39, further comprising:
   saving said currently active interrupt requests, wherein said saving is performed by the exception handling code after said reading.

41. The method as recited in claim 40, further comprising:
   programming said set of exception state storage hardware to unmask off said currently active interrupt requests, wherein said programming said set of exception state storage hardware to unmask off said currently active interrupt requests is performed by the exception handling code after said saving said currently active interrupt requests.

42. The method as recited in claim 40, wherein said saving comprises:
   saving said currently active interrupt requests to a register of said selected one of said plurality of TCs.

43. The method as recited in claim 40, wherein said saving comprises:
   saving said currently active interrupt requests to an entry in a table in system memory associated with said selected one of said plurality of TCs.

44. The method as recited in claim 35, further comprising:
   updating said set of exception state storage hardware to disable the multithreading microprocessor from taking interrupts, wherein said updating is performed by the multithreading microprocessor in response to said receiving said interrupt request and prior to said programming said set of exception state storage hardware to mask off all currently active interrupt requests.

* * * * *